(12) United States Patent
Raleigh

(10) Patent No.: US 9,942,796 B2
(45) Date of Patent: *Apr. 10, 2018

(54) QUALITY OF SERVICE FOR DEVICE ASSISTED SERVICES

(71) Applicant: Headwater Partners I LLC, Redwood City, CA (US)

(72) Inventor: Gregory G. Raleigh, Woodside, CA (US)

(73) Assignee: Headwater Research LLC, Tyler, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/960,284

(22) Filed: Dec. 4, 2015

(65) Prior Publication Data

US 2016/0323771 A1 Nov. 3, 2016

Related U.S. Application Data

(63) Continuation of application No. 13/718,917, filed on Dec. 18, 2012, now Pat. No. 9,247,450, which is a
(Continued)

(51) Int. Cl.
*H04W 28/02* (2009.01)
*H04L 12/24* (2006.01)
(Continued)

(52) U.S. Cl.
CPC ..... *H04W 28/0268* (2013.01); *H04L 41/0806* (2013.01); *H04L 41/0893* (2013.01);
(Continued)

(58) Field of Classification Search
CPC . H04W 28/0268; H04W 12/08; H04W 28/24; H04W 28/00; H04L 41/0806;
(Continued)

(56) References Cited

U.S. PATENT DOCUMENTS 5,131,020 A * 7/1992 Liebesny ............ G08G 1/0104
340/905
5,283,904 A 2/1994 Carson et al.
(Continued)

FOREIGN PATENT DOCUMENTS

CA 2688553 12/2008
CN 1310401 A 2/2000
(Continued)

OTHER PUBLICATIONS

3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
(Continued)

*Primary Examiner* — Andrew Lai
*Assistant Examiner* — Sumitra Ganguly
(74) *Attorney, Agent, or Firm* — James E. Harris

(57) ABSTRACT

A wireless end-user device contains a processor configured to maintain a quality of service (QoS) activity map that is based on at least two criteria: a device application associated with a given wireless network service usage activity, and a wireless network type for a current selected wireless network, where the types include a home wireless network type and a roaming wireless network type. The processor determines an application associated with the given wireless network service usage activity, and then determines an applicable QoS policy from the associated application and an indication of the current wireless network type. The processor applies the applicable QoS policy to the service usage activity.

12 Claims, 15 Drawing Sheets

Related U.S. Application Data continuation of application No. 12/695,021, filed on Jan. 27, 2010, now Pat. No. 8,346,225, which is a continuation-in-part of application No. 12/380,780, filed on Mar. 2, 2009, now Pat. No. 8,839,388.

(60) Provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009, provisional application No. 61/252,151, filed on Oct. 15, 2009, provisional application No. 61/252,153, filed on Oct. 15, 2009.

(51) Int. Cl.
  *H04W 12/08* (2009.01)
  *H04W 28/24* (2009.01)
  *H04W 24/00* (2009.01)

(52) U.S. Cl.
  CPC ......... *H04L 41/5054* (2013.01); *H04W 12/08* (2013.01); *H04W 28/24* (2013.01); *H04W 24/00* (2013.01)

(58) Field of Classification Search
  CPC . H04L 41/5054; H04L 41/0893; H04L 41/00; H04L 12/00
  See application file for complete search history.

(56) References Cited

U.S. PATENT DOCUMENTS

| | | | |
|---|---|---|---|
| 5,325,532 A | 6/1994 | Crosswy et al. |
| 5,572,528 A | 11/1996 | Shuen |
| 5,577,100 A | 11/1996 | McGregor et al. |
| 5,594,777 A | 1/1997 | Makkonen et al. |
| 5,617,539 A | 4/1997 | Ludwig et al. |
| 5,630,159 A | 5/1997 | Zancho |
| 5,633,484 A | 5/1997 | Zancho et al. |
| 5,633,868 A | 5/1997 | Baldwin et al. |
| 5,754,953 A | 5/1998 | Briancon et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,933,778 A | 8/1999 | Buhrmann et al. |
| 5,940,472 A | 8/1999 | Newman et al. |
| 5,974,439 A | 10/1999 | Bollella |
| 5,983,270 A | 11/1999 | Abraham et al. |
| 6,035,281 A | 3/2000 | Crosskey et al. |
| 6,038,452 A | 3/2000 | Strawczynski et al. |
| 6,038,540 A | 3/2000 | Krist et al. |
| 6,047,268 A | 4/2000 | Bartoli et al. |
| 6,058,434 A | 5/2000 | Wilt et al. |
| 6,061,571 A | 5/2000 | Tamura |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,115,823 A | 9/2000 | Velasco et al. |
| 6,119,933 A | 9/2000 | Wong et al. |
| 6,125,391 A | 9/2000 | Meltzer et al. |
| 6,141,565 A | 10/2000 | Feuerstein et al. |
| 6,141,686 A | 10/2000 | Jackowski et al. |
| 6,148,336 A | 11/2000 | Thomas et al. |
| 6,154,738 A | 11/2000 | Call |
| 6,157,636 A | 12/2000 | Voit et al. |
| 6,185,576 B1 | 2/2001 | McIntosh |
| 6,198,915 B1 | 3/2001 | McGregor et al. |
| 6,219,786 B1 | 4/2001 | Cunningham et al. |
| 6,226,277 B1 | 5/2001 | Chuah |
| 6,263,055 B1 | 7/2001 | Garland et al. |
| 6,292,828 B1 | 9/2001 | Williams |
| 6,317,584 B1 | 11/2001 | Abu-Amara et al. |
| 6,381,316 B2 | 4/2002 | Joyce et al. |
| 6,393,014 B1 | 5/2002 | Daly et al. |
| 6,397,259 B1 | 5/2002 | Lincke et al. |
| 6,401,113 B2 | 6/2002 | Lazaridis et al. |
| 6,418,147 B1 | 7/2002 | Wiedeman |
| 6,438,575 B1 | 8/2002 | Khan et al. |
| 6,445,777 B1 | 9/2002 | Clark |
| 6,449,479 B1 | 9/2002 | Sanchez |
| 6,466,984 B1 | 10/2002 | Naveh et al. |
| 6,477,670 B1 | 11/2002 | Ahmadvand |
| 6,502,131 B1 | 12/2002 | Vaid et al. |
| 6,505,114 B2 | 1/2003 | Luciani |
| 6,510,152 B1 | 1/2003 | Gerszberg et al. |
| 6,522,629 B1 | 2/2003 | Anderson, Sr. |
| 6,532,235 B1 | 3/2003 | Benson et al. |
| 6,532,579 B2 | 3/2003 | Sato et al. |
| 6,535,855 B1 | 3/2003 | Cahill et al. |
| 6,535,949 B1 | 3/2003 | Parker |
| 6,539,082 B1 | 3/2003 | Lowe et al. |
| 6,542,500 B1 | 4/2003 | Gerszberg et al. |
| 6,542,992 B1 | 4/2003 | Peirce et al. |
| 6,546,016 B1 | 4/2003 | Gerszberg et al. |
| 6,563,806 B1 | 5/2003 | Yano et al. |
| 6,570,974 B1 | 5/2003 | Gerszberg et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama |
| 6,598,034 B1 | 7/2003 | Kloth |
| 6,601,040 B1 | 7/2003 | Kolls |
| 6,603,969 B1 | 8/2003 | Vuoristo et al. |
| 6,606,744 B1 | 8/2003 | Mikurak |
| 6,628,934 B2 | 9/2003 | Rosenberg et al. |
| 6,631,122 B1 | 10/2003 | Arunachalam et al. |
| 6,636,721 B2 | 10/2003 | Threadgill et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,786 B1 | 11/2003 | Fox et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,690,918 B2 | 2/2004 | Evans et al. |
| 6,697,821 B2 | 2/2004 | Ziff et al. |
| 6,725,031 B2 | 4/2004 | Watler et al. |
| 6,725,256 B1 | 4/2004 | Albal et al. |
| 6,735,206 B1 | 5/2004 | Oki et al. |
| 6,748,195 B1 | 6/2004 | Phillips |
| 6,748,437 B1 | 6/2004 | Mankude et al. |
| 6,751,296 B1 | 6/2004 | Albal et al. |
| 6,754,470 B2 | 6/2004 | Hendrickson et al. |
| 6,757,717 B1 | 6/2004 | Goldstein |
| 6,760,417 B1 | 7/2004 | Wallenius |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,792,461 B1 | 9/2004 | Hericourt |
| 6,829,596 B1 | 12/2004 | Frazee |
| 6,829,696 B1 | 12/2004 | Balmer et al. |
| 6,839,340 B1 | 1/2005 | Voit et al. |
| 6,873,988 B2 | 3/2005 | Herrmann et al. |
| 6,876,653 B2 | 4/2005 | Ambe et al. |
| 6,879,825 B1 | 4/2005 | Daly |
| 6,882,718 B1 | 4/2005 | Smith |
| 6,885,997 B1 | 4/2005 | Roberts |
| 6,901,440 B1 | 5/2005 | Bimm et al. |

(56) References Cited

U.S. PATENT DOCUMENTS

| | | |
|---|---|---|
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,934,751 B2 | 8/2005 | Jayapalan et al. |
| 6,947,723 B1 | 9/2005 | Gumani et al. |
| 6,947,985 B2 | 9/2005 | Hegli et al. |
| 6,952,428 B1 | 10/2005 | Necka et al. |
| 6,957,067 B1 | 10/2005 | Iyer et al. |
| 6,959,393 B2 | 10/2005 | Hollis et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,970,692 B2 | 11/2005 | Tysor |
| 6,982,733 B1 | 1/2006 | McNally et al. |
| 6,983,370 B2 | 1/2006 | Eaton et al. |
| 6,996,062 B1 | 2/2006 | Freed et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,017,189 B1 | 3/2006 | DeMello et al. |
| 7,024,200 B2 | 4/2006 | McKenna et al. |
| 7,024,460 B2 | 4/2006 | Koopmas et al. |
| 7,027,055 B2 | 4/2006 | Anderson et al. |
| 7,027,408 B2 | 4/2006 | Nabkel et al. |
| 7,032,072 B1 | 4/2006 | Quinn et al. |
| 7,039,027 B2 | 5/2006 | Bridgelall |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,225 B1 | 5/2006 | Patel et al. |
| 7,043,226 B2 | 5/2006 | Yamauchi |
| 7,043,268 B2 | 5/2006 | Yukie et al. |
| 7,047,276 B2 | 5/2006 | Liu et al. |
| 7,058,022 B1 | 6/2006 | Carolan et al. |
| 7,058,968 B2 | 6/2006 | Rowland et al. |
| 7,068,600 B2 | 6/2006 | Cain |
| 7,069,248 B2 | 6/2006 | Huber |
| 7,082,422 B1 | 7/2006 | Zirngibl et al. |
| 7,084,775 B1 | 8/2006 | Smith |
| 7,092,696 B1 | 8/2006 | Hosain et al. |
| 7,095,754 B2 | 8/2006 | Benveniste |
| 7,102,620 B2 | 9/2006 | Harries et al. |
| 7,110,753 B2 | 9/2006 | Campen |
| 7,113,780 B2 | 9/2006 | McKenna et al. |
| 7,113,997 B2 | 9/2006 | Jayapalan et al. |
| 7,133,386 B2 | 11/2006 | Holur et al. |
| 7,133,695 B2 | 11/2006 | Beyda |
| 7,136,361 B2 | 11/2006 | Benveniste |
| 7,139,569 B2 | 11/2006 | Kato |
| 7,142,876 B2 | 11/2006 | Trossen et al. |
| 7,149,229 B1 | 12/2006 | Leung |
| 7,149,521 B2 | 12/2006 | Sundar et al. |
| 7,151,764 B1 | 12/2006 | Heinonen et al. |
| 7,158,792 B1 | 1/2007 | Cook et al. |
| 7,162,237 B1 | 1/2007 | Silver et al. |
| 7,165,040 B2 | 1/2007 | Ehrman et al. |
| 7,167,078 B2 | 1/2007 | Pourchot |
| 7,174,156 B1 | 2/2007 | Mangal |
| 7,174,174 B2 | 2/2007 | Boris et al. |
| 7,177,919 B1 | 2/2007 | Truong et al. |
| 7,180,855 B1 | 2/2007 | Lin |
| 7,181,017 B1 | 2/2007 | Nagel et al. |
| 7,191,248 B2 | 3/2007 | Chattopadhyay et al. |
| 7,197,321 B2 | 3/2007 | Erskine et al. |
| 7,200,112 B2 | 4/2007 | Sundar et al. |
| 7,203,169 B1 | 4/2007 | Okholm et al. |
| 7,203,721 B1 | 4/2007 | Ben-Efraim et al. |
| 7,203,752 B2 | 4/2007 | Rice et al. |
| 7,212,491 B2 | 5/2007 | Koga |
| 7,219,123 B1 | 5/2007 | Fiechter et al. |
| 7,222,190 B2 | 5/2007 | Klinker et al. |
| 7,222,304 B2 | 5/2007 | Beaton et al. |
| 7,224,968 B2 | 5/2007 | Dobson et al. |
| 7,228,354 B2 | 6/2007 | Chambliss et al. |
| 7,236,780 B2 | 6/2007 | Benco |
| 7,242,668 B2 | 7/2007 | Kan et al. |
| 7,242,920 B2 | 7/2007 | Morris |
| 7,245,901 B2 | 7/2007 | McGregor et al. |
| 7,248,570 B2 | 7/2007 | Bahl et al. |
| 7,251,218 B2 | 7/2007 | Jorgensen |
| 7,260,382 B1 | 8/2007 | Lamb et al. |
| 7,266,371 B1 | 9/2007 | Amin et al. |
| 7,269,157 B2 | 9/2007 | Klinker et al. |
| 7,271,765 B2 | 9/2007 | Stilp et al. |
| 7,272,660 B1 | 9/2007 | Powers et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,317,699 B2 | 1/2008 | Godfrey et al. |
| 7,318,111 B2 | 1/2008 | Zhao |
| 7,320,029 B2 | 1/2008 | Rinne et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,340,772 B2 | 3/2008 | Panasyuk et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,366,654 B2 | 4/2008 | Moore |
| 7,369,848 B2 | 5/2008 | Jiang |
| 7,369,856 B2 | 5/2008 | Ovadia |
| 7,373,136 B2 | 5/2008 | Watler et al. |
| 7,373,179 B2 | 5/2008 | Stine et al. |
| 7,379,731 B2 | 5/2008 | Natsuno et al. |
| 7,388,950 B2 | 6/2008 | Elsey et al. |
| 7,389,412 B2 | 6/2008 | Sharma et al. |
| 7,391,724 B2 | 6/2008 | Alakoski et al. |
| 7,395,244 B1 | 7/2008 | Kingsford |
| 7,401,338 B1 | 7/2008 | Bowen et al. |
| 7,403,763 B2 | 7/2008 | Maes |
| 7,409,447 B1 | 8/2008 | Assadzadeh |
| 7,409,569 B2 | 8/2008 | Illowsky et al. |
| 7,411,930 B2 | 8/2008 | Montojo et al. |
| 7,418,253 B2 | 8/2008 | Kavanah |
| 7,418,257 B2 | 8/2008 | Kim |
| 7,421,004 B2 | 9/2008 | Feher |
| 7,423,971 B1 | 9/2008 | Mohaban et al. |
| 7,428,750 B1 | 9/2008 | Dunn et al. |
| 7,440,433 B2 | 10/2008 | Rink et al. |
| 7,444,669 B1 | 10/2008 | Bahl et al. |
| 7,450,591 B2 | 11/2008 | Korling et al. |
| 7,450,927 B1 | 11/2008 | Creswell et al. |
| 7,454,191 B2 | 11/2008 | Dawson et al. |
| 7,457,265 B2 | 11/2008 | Julka et al. |
| 7,457,870 B1 | 11/2008 | Lownsbrough et al. |
| 7,460,837 B2 | 12/2008 | Diener |
| 7,466,652 B2 | 12/2008 | Lau et al. |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,486,658 B2 | 2/2009 | Kumar |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,505,795 B1 | 3/2009 | Lim et al. |
| 7,508,799 B2 | 3/2009 | Sumner et al. |

(56) References Cited

U.S. PATENT DOCUMENTS

| | | |
|---|---|---|
| 7,512,128 B2 | 3/2009 | DiMambro et al. |
| 7,512,131 B2 | 3/2009 | Svensson et al. |
| 7,515,608 B2 | 4/2009 | Yuan et al. |
| 7,515,926 B2 | 4/2009 | Bu et al. |
| 7,516,219 B2 | 4/2009 | Moghaddam et al. |
| 7,522,576 B2 | 4/2009 | Du et al. |
| 7,526,541 B2 | 4/2009 | Roese et al. |
| 7,529,204 B2 | 5/2009 | Bourlas et al. |
| 7,535,880 B1 | 5/2009 | Hinman et al. |
| 7,536,695 B2 | 5/2009 | Alam et al. |
| 7,539,132 B2 | 5/2009 | Werner et al. |
| 7,539,862 B2 | 5/2009 | Edgett et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,976 B2 | 6/2009 | Bahl et al. |
| 7,551,922 B2 | 6/2009 | Roskowski et al. |
| 7,554,983 B1 | 6/2009 | Muppala |
| 7,555,757 B2 | 6/2009 | Smith et al. |
| 7,561,899 B2 | 7/2009 | Lee |
| 7,562,213 B1 | 7/2009 | Timms |
| 7,564,799 B2 | 7/2009 | Holland et al. |
| 7,565,141 B2 | 7/2009 | Macaluso |
| 7,574,509 B2 | 8/2009 | Nixon et al. |
| 7,574,731 B2 | 8/2009 | Fascenda |
| 7,577,431 B2 | 8/2009 | Jiang |
| 7,580,356 B1 | 8/2009 | Mishra et al. |
| 7,580,857 B2 | 8/2009 | VanFleet et al. |
| 7,583,964 B2 | 9/2009 | Wong |
| 7,586,871 B2 | 9/2009 | Hamilton et al. |
| 7,593,417 B2 | 9/2009 | Wang et al. |
| 7,593,730 B2 | 9/2009 | Khandelwal et al. |
| 7,599,288 B2 | 10/2009 | Cole et al. |
| 7,599,714 B2 | 10/2009 | Kuzminskiy |
| 7,602,746 B2 | 10/2009 | Calhoun et al. |
| 7,609,650 B2 | 10/2009 | Roskowski et al. |
| 7,609,700 B1 | 10/2009 | Ying et al. |
| 7,610,047 B2 | 10/2009 | Hicks, III et al. |
| 7,610,328 B2 | 10/2009 | Haase et al. |
| 7,610,396 B2 | 10/2009 | Taglienti et al. |
| 7,614,051 B2 | 11/2009 | Glaum et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,627,314 B2 | 12/2009 | Carlson et al. |
| 7,627,767 B2 | 12/2009 | Sherman et al. |
| 7,627,872 B2 | 12/2009 | Hebeler et al. |
| 7,633,438 B2 | 12/2009 | Tysowski |
| 7,634,388 B2 | 12/2009 | Archer et al. |
| 7,636,574 B2 | 12/2009 | Poosala |
| 7,636,626 B2 | 12/2009 | Oesterling et al. |
| 7,643,411 B2 | 1/2010 | Andreasen et al. |
| 7,644,151 B2 | 1/2010 | Jerrim et al. |
| 7,644,267 B2 | 1/2010 | Ylikoski et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,656,271 B2 | 2/2010 | Ehrman et al. |
| 7,657,920 B2 | 2/2010 | Arseneau et al. |
| 7,660,419 B1 | 2/2010 | Ho |
| 7,661,124 B2 | 2/2010 | Ramanathan et al. |
| 7,664,494 B2 | 2/2010 | Jiang |
| 7,668,176 B2 | 2/2010 | Chuah |
| 7,668,612 B1 | 2/2010 | Okkonen |
| 7,668,903 B2 | 2/2010 | Edwards et al. |
| 7,676,673 B2 | 3/2010 | Weller et al. |
| 7,680,086 B2 | 3/2010 | Eglin |
| 7,684,370 B2 | 3/2010 | Kezys |
| 7,685,131 B2 | 3/2010 | Batra et al. |
| 7,685,254 B2 | 3/2010 | Pandya |
| 7,685,530 B2 | 3/2010 | Sherrard et al. |
| 7,693,720 B2 | 4/2010 | Kennewick et al. |
| 7,697,540 B2 | 4/2010 | Haddad et al. |
| 7,710,932 B2 | 5/2010 | Muthuswamy |
| 7,711,848 B2 | 5/2010 | Maes |
| 7,719,966 B2 | 5/2010 | Luft et al. |
| 7,720,206 B2 | 5/2010 | Devolites et al. |
| 7,720,464 B2 | 5/2010 | Batta |
| 7,720,505 B2 | 5/2010 | Gopi et al. |
| 7,720,960 B2 | 5/2010 | Pruss et al. |
| 7,721,296 B2 | 5/2010 | Ricagni |
| 7,724,716 B2 | 5/2010 | Fadell |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,752,330 B2 | 7/2010 | Olsen et al. |
| 7,756,056 B2 | 7/2010 | Kim et al. |
| 7,756,534 B2 | 7/2010 | Anupam et al. |
| 7,756,757 B1 | 7/2010 | Oakes, III |
| 7,760,137 B2 | 7/2010 | Martucci et al. |
| 7,760,711 B1 | 7/2010 | Kung et al. |
| 7,760,861 B1 | 7/2010 | Croak et al. |
| 7,765,294 B2 | 7/2010 | Edwards et al. |
| 7,769,397 B2 | 8/2010 | Funato et al. |
| 7,770,785 B2 | 8/2010 | Jha et al. |
| 7,774,323 B2 | 8/2010 | Helfman |
| 7,774,456 B1 | 8/2010 | Lownsbrough et al. |
| 7,778,176 B2 | 8/2010 | Morford |
| 7,778,643 B2 | 8/2010 | Laroia et al. |
| 7,792,257 B1 | 9/2010 | Vanier et al. |
| 7,792,538 B2 | 9/2010 | Kozisek |
| 7,792,708 B2 | 9/2010 | Alva |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,783 B2 | 9/2010 | Kende et al. |
| 7,801,985 B1 | 9/2010 | Pitkow et al. |
| 7,802,724 B1 | 9/2010 | Nohr |
| 7,805,140 B2 | 9/2010 | Friday et al. |
| 7,805,606 B2 | 9/2010 | Birger et al. |
| 7,809,351 B1 | 10/2010 | Panda et al. |
| 7,809,372 B2 | 10/2010 | Rajaniemi |
| 7,817,615 B1 | 10/2010 | Breau et al. |
| 7,817,983 B2 | 10/2010 | Cassett et al. |
| 7,822,837 B1 | 10/2010 | Urban et al. |
| 7,826,427 B2 | 11/2010 | Sood et al. |
| 7,826,607 B1 | 11/2010 | de Carvalho Resende et al. |
| 7,843,831 B2 | 11/2010 | Morrill et al. |
| 7,843,843 B1 | 11/2010 | Papp, III et al. |
| 7,844,034 B1 | 11/2010 | Oh et al. |
| 7,844,728 B2 | 11/2010 | Anderson et al. |
| 7,848,768 B2 | 12/2010 | Omori et al. |
| 7,849,161 B2 | 12/2010 | Koch et al. |
| 7,849,477 B2 | 12/2010 | Cristofalo et al. |
| 7,853,255 B2 | 12/2010 | Karaoguz et al. |
| 7,856,226 B2 | 12/2010 | Wong et al. |
| 7,860,088 B2 | 12/2010 | Lioy |
| 7,865,182 B2 | 1/2011 | Macaluso |
| 7,865,187 B2 | 1/2011 | Ramer et al. |
| 7,868,778 B2 | 1/2011 | Kenwright |
| 7,873,001 B2 | 1/2011 | Silver |
| 7,873,344 B2 | 1/2011 | Bowser et al. |
| 7,873,346 B2 | 1/2011 | Petersson et al. |
| 7,873,540 B2 | 1/2011 | Arumugam |
| 7,873,705 B2 | 1/2011 | Kalish |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,882,247 B2 | 2/2011 | Sturniolo et al. |
| 7,886,047 B1 | 2/2011 | Potluri |
| 7,889,384 B2 | 2/2011 | Armentrout et al. |
| 7,890,084 B1 | 2/2011 | Dudziak et al. |
| 7,890,111 B2 | 2/2011 | Bugenhagen |
| 7,894,431 B2 | 2/2011 | Goring et al. |

(56) References Cited

U.S. PATENT DOCUMENTS

| | | |
|---|---|---|
| 7,899,039 B2 | 3/2011 | Andreasen et al. |
| 7,899,438 B2 | 3/2011 | Baker et al. |
| 7,903,553 B2 | 3/2011 | Liu |
| 7,907,970 B2 | 3/2011 | Park et al. |
| 7,911,975 B2 | 3/2011 | Droz |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |
| 7,925,740 B2 | 4/2011 | Nath et al. |
| 7,925,778 B1 | 4/2011 | Wijnands et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |
| 7,933,274 B2 | 4/2011 | Verma et al. |
| 7,936,736 B2 | 5/2011 | Proctor, Jr. et al. |
| 7,937,069 B2 | 5/2011 | Rassam |
| 7,937,450 B2 | 5/2011 | Janik |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,966,405 B2 | 6/2011 | Sundaresan et al. |
| 7,969,950 B2 | 6/2011 | Iyer et al. |
| 7,970,350 B2 | 6/2011 | Sheynman |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,979,069 B2 | 7/2011 | Hupp et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,496 B2 | 7/2011 | Bryce et al. |
| 7,987,510 B2 | 7/2011 | Kocher et al. |
| 7,990,049 B2 | 8/2011 | Shioya |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,726 B1 | 8/2011 | Bao |
| 8,005,913 B1 | 8/2011 | Carlander |
| 8,005,988 B2 | 8/2011 | Maes |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,010,990 B2 | 8/2011 | Ferguson et al. |
| 8,015,133 B1 | 9/2011 | Wu et al. |
| 8,015,234 B2 | 9/2011 | Lum et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,027,339 B2 | 9/2011 | Short et al. |
| 8,031,601 B2 | 10/2011 | Feroz et al. |
| 8,032,168 B2 | 10/2011 | Ikaheimo |
| 8,032,409 B1 | 10/2011 | Mikurak |
| 8,032,899 B2 | 10/2011 | Archer et al. |
| 8,036,387 B2 | 10/2011 | Kudelski et al. |
| 8,036,600 B2 | 10/2011 | Garrett et al. |
| 8,044,792 B2 | 10/2011 | Orr et al. |
| 8,045,973 B2 | 10/2011 | Chambers |
| 8,046,449 B2 | 10/2011 | Yoshiuchi |
| 8,050,275 B1 | 11/2011 | Iyer |
| 8,050,690 B2 | 11/2011 | Neeraj |
| 8,050,705 B2 | 11/2011 | Sicher et al. |
| 8,059,530 B1 | 11/2011 | Cole |
| 8,060,463 B1 | 11/2011 | Spiegel |
| 8,064,418 B2 | 11/2011 | Maki |
| 8,064,896 B2 | 11/2011 | Bell et al. |
| 8,065,365 B2 | 11/2011 | Saxena et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,085,808 B2 | 12/2011 | Brusca et al. |
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,616 B2 | 1/2012 | Proctor, Jr. et al. |
| 8,091,087 B2 | 1/2012 | Ali et al. |
| 8,094,551 B2 | 1/2012 | Huber et al. |
| 8,095,112 B2 | 1/2012 | Chow et al. |
| 8,095,124 B2 | 1/2012 | Balia |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,122,128 B2 | 2/2012 | Burke, II et al. |
| 8,122,249 B2 | 2/2012 | Falk et al. |
| 8,125,897 B2 | 2/2012 | Ray et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,840 B1 | 3/2012 | Denker |
| 8,131,858 B2 | 3/2012 | Agulnik et al. |
| 8,132,256 B2 | 3/2012 | Bari |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,140,690 B2 | 3/2012 | Ly et al. |
| 8,144,591 B2 | 3/2012 | Ghai et al. |
| 8,145,194 B2 | 3/2012 | Yoshikawa et al. |
| 8,146,142 B2 | 3/2012 | Lortz et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,151,205 B2 | 4/2012 | Follmann et al. |
| 8,155,155 B1 | 4/2012 | Chow et al. |
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,159,520 B1 | 4/2012 | Dhanoa et al. |
| 8,160,015 B2 | 4/2012 | Rashid et al. |

(56) References Cited

U.S. PATENT DOCUMENTS

| | | |
|---|---|---|
| 8,160,056 B2 | 4/2012 | Van der Merwe et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,180,333 B1 | 5/2012 | Wells et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,087 B2 | 5/2012 | Fisher et al. |
| 8,190,122 B1 | 5/2012 | Alexander et al. |
| 8,190,675 B2 | 5/2012 | Tribbett |
| 8,191,106 B2 | 5/2012 | Choyi et al. |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,194,581 B1 | 6/2012 | Schroeder et al. |
| 8,195,093 B2 | 6/2012 | Garrett et al. |
| 8,195,153 B1 | 6/2012 | Frencel et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |
| 8,204,190 B2 | 6/2012 | Bang et al. |
| 8,204,505 B2 | 6/2012 | Jin et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,214,890 B2 | 7/2012 | Kirovski et al. |
| 8,219,134 B2 | 7/2012 | Maharajh et al. |
| 8,223,655 B2 | 7/2012 | Heinz et al. |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,233,433 B2 | 7/2012 | Kalhan |
| 8,233,883 B2 | 7/2012 | De Froment |
| 8,233,895 B2 | 7/2012 | Tysowski |
| 8,238,287 B1 | 8/2012 | Gopi et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,259,692 B2 | 9/2012 | Bajko |
| 8,264,965 B2 | 9/2012 | Dolganow et al. |
| 8,265,004 B2 | 9/2012 | Toutonghi |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,025 B2 | 9/2012 | Brisebois et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,279,067 B2 | 10/2012 | Berger et al. |
| 8,279,864 B2 | 10/2012 | Wood |
| 8,280,354 B2 | 10/2012 | Smith et al. |
| 8,284,740 B2 | 10/2012 | O'Connor |
| 8,285,249 B2 | 10/2012 | Baker et al. |
| 8,285,992 B2 | 10/2012 | Mathur et al. |
| 8,291,238 B2 | 10/2012 | Ginter et al. |
| 8,291,439 B2 | 10/2012 | Jethi et al. |
| 8,296,404 B2 | 10/2012 | McDysan et al. |
| 8,300,575 B2 | 10/2012 | Willars |
| 8,306,518 B1 | 11/2012 | Gailloux |
| 8,307,067 B2 | 11/2012 | Ryan |
| 8,315,198 B2 | 11/2012 | Corneille et al. |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,949 B2 | 11/2012 | Matta |
| 8,325,638 B2 | 12/2012 | Jin et al. |
| 8,325,906 B2 | 12/2012 | Fullarton et al. |
| 8,326,319 B2 | 12/2012 | Davis |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,339,991 B2 | 12/2012 | Biswas et al. |
| 8,340,628 B2 | 12/2012 | Taylor et al. |
| 8,340,678 B1 | 12/2012 | Pandey |
| 8,340,718 B2 | 12/2012 | Colonna et al. |
| 8,346,210 B2 | 1/2013 | Balsan et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,980 B2 | 1/2013 | Howcroft |
| 8,353,001 B2 | 1/2013 | Herrod |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,363,799 B2 | 1/2013 | Gruchala et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,592 B2 | 2/2013 | Proctor, Jr. et al. |
| 8,375,128 B2 | 2/2013 | Tofighbakhsh |
| 8,375,136 B2 | 2/2013 | Roman et al. |
| 8,380,247 B2 | 2/2013 | Engstrom |
| 8,385,199 B1 | 2/2013 | Coward et al. |
| 8,385,896 B2 | 2/2013 | Proctor, Jr. et al. |
| 8,385,964 B2 | 2/2013 | Haney |
| 8,385,975 B2 | 2/2013 | Forutanpour |
| 8,386,386 B1 | 2/2013 | Zhu |
| 8,391,262 B2 | 3/2013 | Maki et al. |
| 8,396,458 B2 | 3/2013 | Raleigh |
| 8,396,929 B2 | 3/2013 | Helfman et al. |
| 8,401,968 B1 | 3/2013 | Schattauer et al. |
| 8,402,165 B2 | 3/2013 | Deu-Ngoc et al. |
| 8,402,540 B2 | 3/2013 | Kapoor et al. |
| 8,406,427 B2 | 3/2013 | Chand et al. |
| 8,406,736 B2 | 3/2013 | Das et al. |
| 8,407,763 B2 | 3/2013 | Weller et al. |
| 8,411,587 B2 | 4/2013 | Curtis et al. |
| 8,411,691 B2 | 4/2013 | Aggarwal |
| 8,412,798 B1 | 4/2013 | Wang |
| 8,418,168 B2 | 4/2013 | Tyhurst et al. |
| 8,422,988 B1 | 4/2013 | Keshav |

(56) References Cited

U.S. PATENT DOCUMENTS

| | | |
|---|---|---|
| 8,423,016 B2 | 4/2013 | Buckley et al. |
| 8,429,403 B2 | 4/2013 | Moret et al. |
| 8,437,734 B2 | 5/2013 | Ray et al. |
| 8,442,015 B2 | 5/2013 | Behzad et al. |
| 8,446,831 B2 | 5/2013 | Kwan et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,448,015 B2 | 5/2013 | Gerhart |
| 8,452,858 B2 | 5/2013 | Wu et al. |
| 8,461,958 B2 | 6/2013 | Saenz et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,483,135 B2 | 7/2013 | Cai et al. |
| 8,483,694 B2 | 7/2013 | Lewis et al. |
| 8,484,327 B2 | 7/2013 | Werner et al. |
| 8,488,597 B2 | 7/2013 | Nie et al. |
| 8,489,110 B2 | 7/2013 | Frank et al. |
| 8,489,720 B1 | 7/2013 | Morford et al. |
| 8,494,559 B1 | 7/2013 | Malmi |
| 8,495,181 B2 | 7/2013 | Venkatraman et al. |
| 8,495,227 B2 | 7/2013 | Kaminsky et al. |
| 8,495,360 B2 | 7/2013 | Falk et al. |
| 8,495,700 B2 | 7/2013 | Shahbazi |
| 8,499,087 B2 | 7/2013 | Hu |
| 8,571,598 B2 | 7/2013 | Valavi |
| RE44,412 E | 8/2013 | Naqvi et al. |
| 8,503,358 B2 | 8/2013 | Hanson et al. |
| 8,503,455 B2 | 8/2013 | Heikens |
| 8,504,032 B2 | 8/2013 | Lott et al. |
| 8,504,687 B2 | 8/2013 | Maffione et al. |
| 8,504,690 B2 | 8/2013 | Shah et al. |
| 8,504,729 B2 | 8/2013 | Pezzutti |
| 8,505,073 B2 | 8/2013 | Taglienti et al. |
| 8,509,082 B2 | 8/2013 | Heinz et al. |
| 8,514,927 B2 | 8/2013 | Sundararajan et al. |
| 8,516,552 B2 | 8/2013 | Raleigh |
| 8,520,589 B2 | 8/2013 | Bhatt et al. |
| 8,520,595 B2 | 8/2013 | Yadav et al. |
| 8,521,110 B2 | 8/2013 | Rofougaran |
| 8,521,775 B1 | 8/2013 | Poh et al. |
| 8,522,039 B2 | 8/2013 | Hyndman et al. |
| 8,522,249 B2 | 8/2013 | Beaule |
| 8,522,337 B2 | 8/2013 | Adusumilli et al. |
| 8,523,547 B2 | 9/2013 | Pekrul |
| 8,526,329 B2 | 9/2013 | Mahany et al. |
| 8,527,410 B2 | 9/2013 | Markki et al. |
| 8,527,662 B2 | 9/2013 | Biswas et al. |
| 8,528,068 B1 | 9/2013 | Weglein et al. |
| 8,531,954 B2 | 9/2013 | McNaughton et al. |
| 8,532,610 B2 | 9/2013 | Manning Cassett et al. |
| 8,533,775 B2 | 9/2013 | Alcorn et al. |
| 8,538,394 B2 | 9/2013 | Zimmerman et al. |
| 8,538,421 B2 | 9/2013 | Brisebois et al. |
| 8,538,458 B2 | 9/2013 | Haney |
| 8,539,544 B2 | 9/2013 | Garimella et al. |
| 8,543,265 B2 | 9/2013 | Ekhaguere et al. |
| 8,543,814 B2 | 9/2013 | Laitinen et al. |
| 8,544,105 B2 | 9/2013 | Mclean et al. |
| 8,548,427 B2 | 10/2013 | Chow et al. |
| 8,554,876 B2 | 10/2013 | Winsor |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,588,240 B2 | 11/2013 | Ramankutty et al. |
| 8,589,955 B2 | 11/2013 | Roundtree et al. |
| 8,600,895 B2 | 12/2013 | Felsher |
| 8,601,125 B2 | 12/2013 | Huang et al. |
| 8,605,691 B2 | 12/2013 | Soomro et al. |
| 8,619,735 B2 | 12/2013 | Montemurro et al. |
| 8,631,428 B2 | 1/2014 | Scott et al. |
| 8,634,425 B2 | 1/2014 | Gorti et al. |
| 8,635,164 B2 | 1/2014 | Rosenhaft et al. |
| 8,639,215 B2 | 1/2014 | McGregor et al. |
| 8,644,702 B1 | 2/2014 | Kalajan |
| 8,644,813 B1 | 2/2014 | Gailloux et al. |
| 8,645,518 B2 | 2/2014 | David |
| 8,655,357 B1 | 2/2014 | Gazzard et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,675,852 B2 | 3/2014 | Maes |
| 8,676,682 B2 | 3/2014 | Kalliola |
| 8,676,925 B1 | 3/2014 | Liu et al. |
| 8,693,323 B1 | 4/2014 | McDysan |
| 8,694,772 B2 | 4/2014 | Kao et al. |
| 8,700,729 B2 | 4/2014 | Dua |
| 8,701,015 B2 | 4/2014 | Bonnat |
| 8,705,361 B2 | 4/2014 | Venkataraman et al. |
| 8,706,863 B2 | 4/2014 | Fadell |
| 8,713,535 B2 | 4/2014 | Malhotra et al. |
| 8,713,641 B1 | 4/2014 | Pagan et al. |
| 8,719,397 B2 | 5/2014 | Levi et al. |
| 8,719,423 B2 | 5/2014 | Wyld |
| 8,725,899 B2 | 5/2014 | Short et al. |
| 8,730,842 B2 | 5/2014 | Collins et al. |
| 8,731,519 B2 | 5/2014 | Flynn et al. |
| 8,732,808 B2 | 5/2014 | Sewall et al. |
| 8,739,035 B2 | 5/2014 | Trethewey |
| 8,744,339 B2 | 6/2014 | Halfmann et al. |
| 8,761,711 B2 | 6/2014 | Grignani et al. |
| 8,780,857 B2 | 7/2014 | Balasubramanian et al. |
| 8,787,249 B2 | 7/2014 | Giaretta et al. |
| 8,793,304 B2 | 7/2014 | Lu et al. |
| 8,811,338 B2 | 8/2014 | Jin et al. |
| 8,811,991 B2 | 8/2014 | Jain et al. |
| 8,818,394 B2 | 8/2014 | Bienas et al. |
| 8,819,253 B2 | 8/2014 | Simeloff et al. |
| 8,825,109 B2 | 9/2014 | Montemurro et al. |
| 8,826,411 B2 | 9/2014 | Moen et al. |
| 8,831,561 B2 | 9/2014 | Sutaria et al. |
| 8,838,752 B2 | 9/2014 | Lor et al. |
| 8,855,620 B2 | 10/2014 | Sievers et al. |
| 8,862,751 B2 | 10/2014 | Faccin et al. |
| 8,863,111 B2 | 10/2014 | Selitser et al. |
| 8,875,042 B2 | 10/2014 | Lejeune et al. |
| 8,880,047 B2 | 11/2014 | Konicek et al. |
| 8,898,748 B2 | 11/2014 | Burks et al. |
| 8,908,516 B2 | 12/2014 | Tzamaloukas et al. |
| 8,930,238 B2 | 1/2015 | Coffman et al. |
| 8,943,551 B2 | 1/2015 | Ganapathy et al. |
| 8,948,726 B2 | 2/2015 | Smith et al. |
| 8,949,597 B1 | 2/2015 | Reeves et al. |
| 8,966,018 B2 | 2/2015 | Bugwadia et al. |
| 8,971,912 B2 | 3/2015 | Chou et al. |
| 8,977,284 B2 | 3/2015 | Reed |
| 8,995,952 B1 | 3/2015 | Baker et al. |
| 9,002,342 B2 | 4/2015 | Tenhunen et al. |
| 9,014,973 B2 | 4/2015 | Ruckart |
| 9,015,331 B2 | 4/2015 | Lai et al. |
| 9,030,934 B2 | 5/2015 | Shah et al. |
| 9,049,010 B2 | 6/2015 | Jueneman et al. |
| 9,064,275 B1 | 6/2015 | Lu et al. |
| 9,111,088 B2 | 8/2015 | Ghai et al. |
| 9,172,553 B2 | 10/2015 | Dawes et al. |
| 9,177,455 B2 | 11/2015 | Remer |
| 9,247,450 B2* | 1/2016 | Raleigh .............. H04L 41/0806 |
| 9,282,460 B2 | 3/2016 | Souissi |
| 9,286,604 B2 | 3/2016 | Aabye et al. |
| 9,325,737 B2 | 4/2016 | Gutowski et al. |
| 9,326,173 B2 | 4/2016 | Luft |
| 9,344,557 B2 | 5/2016 | Gruchala et al. |
| 9,367,680 B2 | 6/2016 | Mahaffey et al. |
| 9,413,546 B2 | 8/2016 | Meier et al. |
| 9,589,117 B2 | 3/2017 | Ali et al. |
| 2001/0048738 A1 | 12/2001 | Baniak et al. |

(56) References Cited

U.S. PATENT DOCUMENTS

| | | |
|---|---|---|
| 2001/0053694 A1 | 12/2001 | Igarashi et al. |
| 2002/0022472 A1 | 2/2002 | Watler et al. |
| 2002/0049074 A1 | 4/2002 | Eisinger et al. |
| 2002/0099848 A1 | 7/2002 | Lee |
| 2002/0116338 A1 | 8/2002 | Gonthier et al. |
| 2002/0120370 A1 | 8/2002 | Parupudi et al. |
| 2002/0120540 A1 | 8/2002 | Kende et al. |
| 2002/0131404 A1 | 9/2002 | Mehta et al. |
| 2002/0138599 A1 | 9/2002 | Dilman et al. |
| 2002/0138601 A1 | 9/2002 | Piponius et al. |
| 2002/0154751 A1 | 10/2002 | Thompson et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0188732 A1 | 12/2002 | Buckman et al. |
| 2002/0191573 A1 | 12/2002 | Whitehill et al. |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0028623 A1 | 2/2003 | Hennessey et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0084321 A1 | 5/2003 | Tarquini et al. |
| 2003/0088671 A1 | 5/2003 | Klinker et al. |
| 2003/0133408 A1* | 7/2003 | Cheng .................... H04L 12/66 370/230 |
| 2003/0134650 A1 | 7/2003 | Sundar et al. |
| 2003/0159030 A1 | 8/2003 | Evans |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0184793 A1 | 10/2003 | Pineau |
| 2003/0188006 A1 | 10/2003 | Bard |
| 2003/0188117 A1 | 10/2003 | Yoshino et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0021697 A1 | 2/2004 | Beaton et al. |
| 2004/0030705 A1 | 2/2004 | Bowman-Amuah |
| 2004/0039792 A1 | 2/2004 | Nakanishi |
| 2004/0044623 A1 | 3/2004 | Wake et al. |
| 2004/0047358 A1 | 3/2004 | Chen et al. |
| 2004/0054779 A1 | 3/2004 | Takeshima et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0127200 A1 | 7/2004 | Shaw et al. |
| 2004/0127208 A1 | 7/2004 | Nair et al. |
| 2004/0132427 A1 | 7/2004 | Lee et al. |
| 2004/0133668 A1 | 7/2004 | Nicholas, III |
| 2004/0137890 A1 | 7/2004 | Kalke |
| 2004/0168052 A1 | 8/2004 | Clisham et al. |
| 2004/0170191 A1 | 9/2004 | Guo et al. |
| 2004/0176104 A1 | 9/2004 | Arcens |
| 2004/0198331 A1 | 10/2004 | Coward et al. |
| 2004/0203755 A1 | 10/2004 | Brunet et al. |
| 2004/0203833 A1 | 10/2004 | Rathunde et al. |
| 2004/0225561 A1 | 11/2004 | Hertzberg et al. |
| 2004/0225898 A1 | 11/2004 | Frost et al. |
| 2004/0236547 A1 | 11/2004 | Rappaport et al. |
| 2004/0243680 A1 | 12/2004 | Mayer |
| 2004/0243992 A1 | 12/2004 | Gustafson et al. |
| 2004/0249918 A1 | 12/2004 | Sunshine |
| 2004/0255145 A1 | 12/2004 | Chow |
| 2004/0259534 A1 | 12/2004 | Chaudhari et al. |
| 2004/0260766 A1 | 12/2004 | Barros et al. |
| 2004/0267872 A1 | 12/2004 | Serdy et al. |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0041617 A1 | 2/2005 | Huotari et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0055595 A1 | 3/2005 | Frazer |
| 2005/0060266 A1 | 3/2005 | Demello et al. |
| 2005/0060525 A1 | 3/2005 | Schwartz et al. |
| 2005/0075115 A1 | 4/2005 | Corneille et al. |
| 2005/0079863 A1 | 4/2005 | Macaluso |
| 2005/0091505 A1 | 4/2005 | Riley et al. |
| 2005/0096024 A1 | 5/2005 | Bicker et al. |
| 2005/0097516 A1 | 5/2005 | Donnelly et al. |
| 2005/0107091 A1 | 5/2005 | Vannithamby et al. |
| 2005/0108075 A1 | 5/2005 | Douglis et al. |
| 2005/0111463 A1 | 5/2005 | Leung et al. |
| 2005/0128967 A1 | 6/2005 | Scobbie |
| 2005/0135264 A1 | 6/2005 | Popoff et al. |
| 2005/0163320 A1 | 7/2005 | Brown et al. |
| 2005/0166043 A1 | 7/2005 | Zhang et al. |
| 2005/0183143 A1 | 8/2005 | Anderholm et al. |
| 2005/0186948 A1 | 8/2005 | Gallagher et al. |
| 2005/0198377 A1 | 9/2005 | Ferguson et al. |
| 2005/0216421 A1 | 9/2005 | Barry et al. |
| 2005/0228985 A1 | 10/2005 | Ylikoski et al. |
| 2005/0238046 A1 | 10/2005 | Hassan et al. |
| 2005/0239447 A1 | 10/2005 | Holzman et al. |
| 2005/0245241 A1 | 11/2005 | Durand et al. |
| 2005/0246282 A1 | 11/2005 | Naslund et al. |
| 2005/0250508 A1 | 11/2005 | Guo et al. |
| 2005/0250536 A1 | 11/2005 | Deng et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0020787 A1 | 1/2006 | Choyi et al. |
| 2006/0026679 A1 | 2/2006 | Zakas |
| 2006/0030306 A1 | 2/2006 | Kuhn |
| 2006/0034256 A1 | 2/2006 | Addagatla et al. |
| 2006/0035631 A1 | 2/2006 | White et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072451 A1 | 4/2006 | Ross |
| 2006/0072550 A1 | 4/2006 | Davis et al. |
| 2006/0072646 A1 | 4/2006 | Feher |
| 2006/0075506 A1 | 4/2006 | Sanda et al. |
| 2006/0085543 A1 | 4/2006 | Hrastar et al. |
| 2006/0095517 A1 | 5/2006 | O'Connor et al. |
| 2006/0098627 A1 | 5/2006 | Karaoguz et al. |
| 2006/0099970 A1 | 5/2006 | Morgan et al. |
| 2006/0101507 A1 | 5/2006 | Camenisch |
| 2006/0112016 A1 | 5/2006 | Ishibashi |
| 2006/0114821 A1 | 6/2006 | Willey et al. |
| 2006/0114832 A1 | 6/2006 | Hamilton et al. |
| 2006/0126562 A1 | 6/2006 | Liu |
| 2006/0135144 A1 | 6/2006 | Jothipragasam |
| 2006/0136882 A1 | 6/2006 | Noonan et al. |
| 2006/0143066 A1 | 6/2006 | Calabria |
| 2006/0143098 A1 | 6/2006 | Lazaridis |
| 2006/0156398 A1 | 7/2006 | Ross et al. |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | McKelvie et al. |
| 2006/0174035 A1 | 8/2006 | Tufail |
| 2006/0178917 A1 | 8/2006 | Merriam et al. |
| 2006/0178918 A1 | 8/2006 | Mikurak |
| 2006/0182137 A1 | 8/2006 | Zhou et al. |
| 2006/0183462 A1 | 8/2006 | Kolehmainen |
| 2006/0190314 A1 | 8/2006 | Hernandez |
| 2006/0190987 A1 | 8/2006 | Ohta et al. |
| 2006/0199608 A1 | 9/2006 | Dunn et al. |

(56) References Cited

U.S. PATENT DOCUMENTS

| | | |
|---|---|---|
| 2006/0200663 A1 | 9/2006 | Thornton |
| 2006/0206709 A1 | 9/2006 | Labrou et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0277590 A1 | 12/2006 | Limont et al. |
| 2006/0291419 A1 | 12/2006 | McConnell et al. |
| 2006/0291477 A1 | 12/2006 | Croak et al. |
| 2007/0005795 A1 | 1/2007 | Gonzalez |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0036312 A1 | 2/2007 | Cai et al. |
| 2007/0055694 A1 | 3/2007 | Ruge et al. |
| 2007/0060200 A1 | 3/2007 | Boris et al. |
| 2007/0061243 A1 | 3/2007 | Ramer et al. |
| 2007/0061800 A1 | 3/2007 | Cheng et al. |
| 2007/0061878 A1 | 3/2007 | Hagiu et al. |
| 2007/0073899 A1 | 3/2007 | Judge et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0109983 A1 | 5/2007 | Shankar et al. |
| 2007/0130283 A1 | 6/2007 | Klein et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0147317 A1 | 6/2007 | Smith et al. |
| 2007/0147324 A1 | 6/2007 | McGary |
| 2007/0155365 A1 | 7/2007 | Kim et al. |
| 2007/0165630 A1 | 7/2007 | Rasanen |
| 2007/0168499 A1 | 7/2007 | Chu |
| 2007/0171856 A1 | 7/2007 | Bruce et al. |
| 2007/0174490 A1 | 7/2007 | Choi et al. |
| 2007/0192460 A1 | 8/2007 | Choi et al. |
| 2007/0198656 A1 | 8/2007 | Mazzaferri |
| 2007/0201502 A1 | 8/2007 | Abramson |
| 2007/0213054 A1 | 9/2007 | Han |
| 2007/0220251 A1 | 9/2007 | Rosenberg et al. |
| 2007/0226225 A1 | 9/2007 | Yiu et al. |
| 2007/0226775 A1 | 9/2007 | Andreasen |
| 2007/0234402 A1 | 10/2007 | Khosravi et al. |
| 2007/0243862 A1 | 10/2007 | Coskun et al. |
| 2007/0248100 A1 | 10/2007 | Zuberi et al. |
| 2007/0254675 A1 | 11/2007 | Zorlu Ozer et al. |
| 2007/0255769 A1 | 11/2007 | Agrawal et al. |
| 2007/0255797 A1 | 11/2007 | Dunn et al. |
| 2007/0255848 A1 | 11/2007 | Sewall et al. |
| 2007/0257767 A1 | 11/2007 | Beeson |
| 2007/0259656 A1 | 11/2007 | Jeong |
| 2007/0259673 A1 | 11/2007 | Willars et al. |
| 2007/0263558 A1 | 11/2007 | Salomone |
| 2007/0266422 A1 | 11/2007 | Germano et al. |
| 2007/0274327 A1 | 11/2007 | Kaarela et al. |
| 2007/0280453 A1 | 12/2007 | Kelley |
| 2007/0282896 A1 | 12/2007 | Wydroug et al. |
| 2007/0293191 A1 | 12/2007 | Mir et al. |
| 2007/0294395 A1 | 12/2007 | Strub et al. |
| 2007/0294410 A1 | 12/2007 | Pandya et al. |
| 2007/0297378 A1 | 12/2007 | Poyhonen et al. |
| 2007/0298764 A1 | 12/2007 | Clayton |
| 2007/0299965 A1 | 12/2007 | Nieh et al. |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010379 A1 | 1/2008 | Zhao |
| 2008/0010452 A1 | 1/2008 | Holtzman et al. |
| 2008/0018494 A1 | 1/2008 | Waite et al. |
| 2008/0022354 A1 | 1/2008 | Grewal et al. |
| 2008/0025230 A1 | 1/2008 | Patel et al. |
| 2008/0032715 A1 | 2/2008 | Jia et al. |
| 2008/0034063 A1 | 2/2008 | Yee |
| 2008/0034419 A1 | 2/2008 | Mullick et al. |
| 2008/0039102 A1 | 2/2008 | Sewall et al. |
| 2008/0049630 A1 | 2/2008 | Kozisek et al. |
| 2008/0050715 A1 | 2/2008 | Golczewski et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0066181 A1 | 3/2008 | Haveson et al. |
| 2008/0070550 A1 | 3/2008 | Hose |
| 2008/0077705 A1 | 3/2008 | Li et al. |
| 2008/0080457 A1 | 4/2008 | Cole |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0089303 A1 | 4/2008 | Wirtanen et al. |
| 2008/0095339 A1 | 4/2008 | Elliott et al. |
| 2008/0096559 A1 | 4/2008 | Phillips et al. |
| 2008/0098062 A1 | 4/2008 | Balia |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0125079 A1 | 5/2008 | O'Neil et al. |
| 2008/0126287 A1 | 5/2008 | Cox et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1* | 6/2008 | Choi-Grogan ........ H04W 28/24 455/550.1 |
| 2008/0134330 A1 | 6/2008 | Kapoor et al. |
| 2008/0139210 A1 | 6/2008 | Gisby et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0166993 A1 | 7/2008 | Gautier et al. |
| 2008/0167027 A1 | 7/2008 | Gautier et al. |
| 2008/0167033 A1 | 7/2008 | Beckers |
| 2008/0168275 A1 | 7/2008 | DeAtley et al. |
| 2008/0168523 A1 | 7/2008 | Ansari et al. |
| 2008/0177998 A1 | 7/2008 | Apsangi et al. |
| 2008/0178300 A1 | 7/2008 | Brown et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0212751 A1 | 9/2008 | Chung |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0250053 A1 | 10/2008 | Aaltonen et al. |
| 2008/0256593 A1 | 10/2008 | Vinberg et al. |
| 2008/0259924 A1 | 10/2008 | Gooch et al. |
| 2008/0262798 A1 | 10/2008 | Kim et al. |

(56) References Cited

U.S. PATENT DOCUMENTS

| | | |
|---|---|---|
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0279216 A1 | 11/2008 | Sharif-Ahmadi et al. |
| 2008/0282319 A1 | 11/2008 | Fontijn et al. |
| 2008/0293395 A1 | 11/2008 | Mathews et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2008/0320497 A1 | 12/2008 | Tarkoma et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0006229 A1 | 1/2009 | Sweeney et al. |
| 2009/0013157 A1 | 1/2009 | Beaule |
| 2009/0016310 A1 | 1/2009 | Rasal |
| 2009/0036111 A1 | 2/2009 | Danford et al. |
| 2009/0042536 A1 | 2/2009 | Bernard et al. |
| 2009/0044185 A1 | 2/2009 | Krivopaltsev |
| 2009/0046707 A1 | 2/2009 | Smires et al. |
| 2009/0046723 A1 | 2/2009 | Rahman et al. |
| 2009/0047989 A1 | 2/2009 | Harmon et al. |
| 2009/0048913 A1 | 2/2009 | Shenfield et al. |
| 2009/0049156 A1 | 2/2009 | Aronsson et al. |
| 2009/0049518 A1 | 2/2009 | Roman et al. |
| 2009/0054030 A1 | 2/2009 | Golds |
| 2009/0065571 A1 | 3/2009 | Jain |
| 2009/0067372 A1 | 3/2009 | Shah et al. |
| 2009/0068984 A1 | 3/2009 | Burnett |
| 2009/0070379 A1 | 3/2009 | Rappaport |
| 2009/0077622 A1 | 3/2009 | Baum et al. |
| 2009/0079699 A1 | 3/2009 | Sun |
| 2009/0113514 A1 | 4/2009 | Hu |
| 2009/0125619 A1 | 5/2009 | Antani |
| 2009/0132860 A1 | 5/2009 | Liu et al. |
| 2009/0149154 A1 | 6/2009 | Bhasin et al. |
| 2009/0157792 A1 | 6/2009 | Fiatal |
| 2009/0163173 A1 | 6/2009 | Williams |
| 2009/0172077 A1 | 7/2009 | Roxburgh et al. |
| 2009/0180391 A1 | 7/2009 | Petersen et al. |
| 2009/0181662 A1 | 7/2009 | Fleischman et al. |
| 2009/0197585 A1 | 8/2009 | Aaron |
| 2009/0197612 A1 | 8/2009 | Kiiskinen |
| 2009/0203352 A1 | 8/2009 | Fordon et al. |
| 2009/0217364 A1 | 8/2009 | Salmela et al. |
| 2009/0219170 A1 | 9/2009 | Clark et al. |
| 2009/0248883 A1 | 10/2009 | Suryanarayana et al. |
| 2009/0254857 A1 | 10/2009 | Romine et al. |
| 2009/0257379 A1 | 10/2009 | Robinson et al. |
| 2009/0271514 A1 | 10/2009 | Thomas et al. |
| 2009/0282127 A1 | 11/2009 | LeBlanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0291665 A1 | 11/2009 | Gaskarth et al. |
| 2009/0299857 A1 | 12/2009 | Brubaker |
| 2009/0307696 A1 | 12/2009 | Vals et al. |
| 2009/0307746 A1 | 12/2009 | Di et al. |
| 2009/0315735 A1 | 12/2009 | Bhavani et al. |
| 2009/0320110 A1 | 12/2009 | Nicolson et al. |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0041365 A1 | 2/2010 | Lott et al. |
| 2010/0042675 A1 | 2/2010 | Fujii |
| 2010/0043068 A1 | 2/2010 | Varadhan et al. |
| 2010/0071053 A1 | 3/2010 | Ansari et al. |
| 2010/0075666 A1 | 3/2010 | Garner |
| 2010/0080202 A1 | 4/2010 | Hanson |
| 2010/0082431 A1 | 4/2010 | Ramer et al. |
| 2010/0103820 A1 | 4/2010 | Fuller et al. |
| 2010/0121744 A1 | 5/2010 | Belz et al. |
| 2010/0131584 A1 | 5/2010 | Johnson |
| 2010/0144310 A1 | 6/2010 | Bedingfield |
| 2010/0151866 A1 | 6/2010 | Karpov et al. |
| 2010/0153781 A1 | 6/2010 | Hanna |
| 2010/0167696 A1 | 7/2010 | Smith et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0190469 A1 | 7/2010 | Vanderveen et al. |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0235329 A1 | 9/2010 | Koren et al. |
| 2010/0241544 A1 | 9/2010 | Benson et al. |
| 2010/0248719 A1 | 9/2010 | Scholaert |
| 2010/0284327 A1 | 11/2010 | Miklos |
| 2010/0284388 A1 | 11/2010 | Fantini et al. |
| 2010/0287599 A1 | 11/2010 | He |
| 2010/0311402 A1 | 12/2010 | Srinivasan et al. |
| 2010/0325420 A1 | 12/2010 | Kanekar |
| 2011/0004917 A1 | 1/2011 | Saisa et al. |
| 2011/0013569 A1 | 1/2011 | Scherzer et al. |
| 2011/0019574 A1 | 1/2011 | Malomsoky et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |
| 2011/0145920 A1 | 6/2011 | Mahaffey et al. |
| 2011/0159818 A1 | 6/2011 | Scherzer et al. |
| 2011/0173678 A1 | 7/2011 | Kaippallimalil et al. |
| 2011/0177811 A1 | 7/2011 | Heckman et al. |
| 2011/0264923 A1 | 10/2011 | Kocher et al. |
| 2011/0277019 A1 | 11/2011 | Pritchard, Jr. |
| 2012/0020296 A1 | 1/2012 | Scherzer et al. |
| 2012/0144025 A1 | 6/2012 | Melander et al. |
| 2012/0166364 A1 | 6/2012 | Ahmad et al. |
| 2012/0196644 A1 | 8/2012 | Scherzer et al. |
| 2012/0238287 A1 | 9/2012 | Scherzer |
| 2013/0029653 A1 | 1/2013 | Baker et al. |
| 2013/0058274 A1 | 3/2013 | Scherzer et al. |
| 2013/0065555 A1 | 3/2013 | Baker et al. |
| 2013/0072177 A1 | 3/2013 | Ross et al. |
| 2013/0084835 A1 | 4/2013 | Scherzer et al. |
| 2013/0144789 A1 | 6/2013 | Aaltonen et al. |
| 2013/0326356 A9 | 12/2013 | Zheng et al. |
| 2014/0073291 A1 | 3/2014 | Hildner et al. |
| 2014/0241342 A1 | 8/2014 | Constantinof |

FOREIGN PATENT DOCUMENTS

| | | |
|---|---|---|
| CN | 1345154 A | 4/2002 |
| CN | 1508734 A | 6/2004 |
| CN | 1538730 A | 10/2004 |
| CN | 1567818 A | 1/2005 |
| CN | 101035308 A | 3/2006 |
| CN | 1801829 A | 7/2006 |
| CN | 1802839 A | 7/2006 |
| CN | 1889777 A | 7/2006 |
| CN | 101155343 A | 9/2006 |
| CN | 1867024 A | 11/2006 |
| CN | 1878160 A | 12/2006 |
| CN | 1937511 A | 3/2007 |
| CN | 101123553 A | 9/2007 |
| CN | 101080055 A | 11/2007 |
| CN | 101115248 A | 1/2008 |

(56) References Cited

FOREIGN PATENT DOCUMENTS

| | | |
|---|---|---|
| CN | 101127988 A | 2/2008 |
| CN | 101183958 A | 5/2008 |
| CN | 101335666 A | 12/2008 |
| CN | 101341764 A | 1/2009 |
| CN | 101815275 A | 8/2010 |
| EP | 1098490 A2 | 5/2001 |
| EP | 1289326 A1 | 3/2003 |
| EP | 1463238 | 9/2004 |
| EP | 1503548 A1 | 2/2005 |
| EP | 1545114 A1 | 6/2005 |
| EP | 1739518 | 1/2007 |
| EP | 1772988 | 4/2007 |
| EP | 1850575 | 10/2007 |
| EP | 1887732 A1 | 2/2008 |
| EP | 1978772 | 10/2008 |
| EP | 2007065 A1 | 12/2008 |
| EP | 2026514 A1 | 2/2009 |
| JP | 3148713 B2 | 3/2001 |
| JP | 2005339247 A | 12/2005 |
| JP | 2006041989 | 2/2006 |
| JP | 2006155263 A | 6/2006 |
| JP | 2006-197137 | 7/2006 |
| JP | 2006-344007 | 12/2006 |
| JP | 2007-318354 | 12/2007 |
| JP | 2008-301121 | 12/2008 |
| JP | 2009-111919 | 5/2009 |
| JP | 2009-212707 | 9/2009 |
| JP | 2009-218773 | 9/2009 |
| JP | 2009-232107 | 10/2009 |
| WO | 1998058505 | 12/1998 |
| WO | 1999027723 A1 | 6/1999 |
| WO | 1999065185 | 12/1999 |
| WO | 0208863 | 1/2002 |
| WO | 2002045315 | 6/2002 |
| WO | 2002067616 A1 | 8/2002 |
| WO | 2002093877 | 11/2002 |
| WO | 2003014891 | 2/2003 |
| WO | 2003017063 A2 | 2/2003 |
| WO | 2003017065 A2 | 2/2003 |
| WO | 2003058880 | 7/2003 |
| WO | 2004028070 | 4/2004 |
| WO | 2004064306 A2 | 7/2004 |
| WO | 2004077797 | 9/2004 |
| WO | 2004095753 | 11/2004 |
| WO | 2005008995 | 1/2005 |
| WO | 2005053335 A1 | 6/2005 |
| WO | 2005083934 | 9/2005 |
| WO | 2006004467 | 1/2006 |
| WO | 2006004784 | 1/2006 |
| WO | 2006012610 | 2/2006 |
| WO | 2006050758 | 5/2006 |
| WO | 2006073837 | 7/2006 |
| WO | 2006077481 | 7/2006 |
| WO | 2006093961 | 9/2006 |
| WO | 2006120558 | 11/2006 |
| WO | 2006130960 | 12/2006 |
| WO | 2007001833 | 1/2007 |
| WO | 2007014630 | 2/2007 |
| WO | 2007018363 | 2/2007 |
| WO | 2007053848 | 5/2007 |
| WO | 2007068288 A1 | 6/2007 |
| WO | 2007069245 | 6/2007 |
| WO | 2007097786 | 8/2007 |
| WO | 2007107701 | 9/2007 |
| WO | 2007120310 | 10/2007 |
| WO | 2007124279 | 11/2007 |
| WO | 2007126352 | 11/2007 |
| WO | 2007129180 A2 | 11/2007 |
| WO | 2007133844 | 11/2007 |
| WO | 2008017837 | 2/2008 |
| WO | 2008051379 | 5/2008 |
| WO | 2008066419 | 6/2008 |
| WO | 2008080139 | 7/2008 |
| WO | 2008080430 | 7/2008 |
| WO | 2008099802 | 8/2008 |
| WO | 2009008817 | 1/2009 |
| WO | 2009091295 | 7/2009 |
| WO | 2010088413 | 8/2010 |
| WO | 2011002450 A1 | 1/2011 |

OTHER PUBLICATIONS

3rd Generation Partnership Project, "Technical Specification Group Services and System Aspects; Policy and Charging Control Architecture," Release 8, Document No. 3GPP TS 23.203, V8.4.0, Dec. 2008.

Alonistioti et al., "Intelligent Architectures Enabling Flexible Service Provision and Adaptability," 2002.

Amazon Technologies, Inc., "Kindle™ User's Guide," 3rd Edition, Copyright 2004-2009.

Chandrasekhar et al., "Femtocell Networks: A Survey," Jun. 28, 2008.

Chaouchi et al., "Policy Based Networking in the Integration Effort of 4G Networks and Services," 2004 IEEE.

Cisco Systems, Inc., "Cisco Mobile Exchange (CMX) Solution Guide: Chapter 2—Overview of GSM, GPRS, and UMTS," Nov. 4, 2008.

Dikaiakos et al., "A Distributed Middleware Infrastructure for Personalized Services," Nov. 24, 2003.

European Commission, "Data Roaming Tariffs—Transparency Measures," [online] retrieved from http://web.archive.org/web/20081220232754/http://ec.europa.eu/information_society/activities/roaming/data/measures/index_en.htm, Dec. 20, 2008 [retrieved May 16, 2012].

Farooq et al., "An IEEE 802.16 WiMax Module for the NS-3 Simulator," Mar. 2-6, 2009.

Han et al., "Information Collection Services for Qos-Aware Mobile Applications," 2005.

Hartmann et al., "Agent-Based Banking Transactions & Information Retrieval—What About Performance Issues?" 1999.

Hewlett-Packard Development Company, LP, "IP Multimedia Services Charging," white paper, Jan. 2006.

Hossain et al., "Gain-Based Selection of Ambient Media Services in Pervasive Environments," Mobile Networks and Applications. Oct. 3, 2008.

Knight et al., "Layer 2 and 3 Virtual Private Networks: Taxonomy, Technology, and Standarization Efforts," IEEE Communications Magazine, Jun. 2004.

Koutsopoulou et al., "Middleware Platform for the Support of Charging Reconfiguration Actions," 2005.

Kyriakakos et al., "Ubiquitous Service Provision in Next Generation Mobile Networks," Proceedings of the 13th IST Mobile and Wireless Communications Summit, Lyon, France, Jun. 2004.

Li, Yu, "Dedicated E-Reading Device: The State of the Art and the Challenges," Scroll, vol. 1, No. 1, 2008.

Nilsson et al., "A Novel MAC Scheme for Solving the QoS Parameter Adjustment Problem in IEEE802.11e EDCA," Feb. 2006.

Oppliger, Rolf, "Internet Security: Firewalls and Bey," Communications of the ACM, May 1997, vol. 40. No. 5.

Rao et al., "Evolution of Mobile Location-Based Services," Communication of the ACM, Dec. 2003.

Steglich, Stephan, "I-Centric User Interaction," Nov. 21, 2003.

Van Eijk, et al., "GigaMobile, Agent Technology for Designing Personalized Mobile Service Brokerage," Jul. 1, 2002.

Zhu et al., "A Survey of Quality of Service in IEEE 802.11 Networks," IEEE Wireless Communications, Aug. 2004.

Anton, B. et al., "Best Current Practices for Wireless Internet Service Provider (WISP) Roaming"; Release Date Feb. 2003, Version 1.0; Wi-Fi Alliance—Wireless ISP Roaming (WISPr).

Ruckus Wireless—White Paper; "Smarter Wi-Fi for Mobile Operator Infrastructures" 2010.

Accuris Networks, "The Business Value of Mobile Data Offload—a White Paper", 2010.

Wireless Broadband Alliance, "WISPr 2.0, Apr. 8, 2010"; Doc. Ref. No. WBA/RM/WISPr, Version 01.00.

VerizonWireless.com news, "Verizon Wireless Adds to Portfolio of Cosumer-Friendly Tools With Introduction of Usage Controls,

(56) References Cited

OTHER PUBLICATIONS

Usage Controls and Chaperone 2.0 Offer Parents Full Family Security Solution," Aug. 18, 2008.
"The Construction of Intelligent Residential District in Use of Cable Television Network," Shandong Science, vol. 13, No. 2, Jun. 2000.
"Communication Concepts for Mobile Agent Systems," by Joachim Baumann et al.; Inst. of Parallel and Distributed High-Performance Systems, Univ. of Stuttgart, Germany, pp. 123-135, 1997.
"End to End QoS Solution for Real-time Multimedia Application;" Computer Engineering and Applications, 2007, 43 (4): 155-159, by Tan Zu-guo, Wang Wen-juan; Information and Science School, Zhanjian Normal College, Zhan jiang, Guangdong 524048, China.
"ASA/PIX: Allow Split Tunneling for VPN Clients on the ASA Configuration Example," Document ID 70917, Jan. 10, 2008.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Kassar et al., "An overview of vertical handover decision strategies in heterogeneous wireless networks," ScienceDirect, University Pierre & Marie Curie, Paris, France, Jun. 5, 2007.
Schiller et al., "Location-Based Services," The Morgan Kaufmann Series in Data Management Systems, 2004.
Sadeh et al., "Understanding and Capturing People's Privacy Policies in a Mobile Social Networking Application," ISR School of Computer Science, Carnegie Mellon University, 2007.
Jing et al., "Client-Sewer Computing in Mobile Environments," GTE Labs. Inc., Purdue University, ACM Computing Surveys, vol. 31, No. 2, Jun. 1999.
Rivadeneyra et al., "A communication architecture to access data services through GSM," San Sebastian, Spain, 1998.
Loopt User Guide, metroPCS, Jul. 17, 2008.
"Jentro Technologies launches Zenlet platform to accelerate location-based content delivery to mobile devices," The Mobile Internet, Boston, MA, Feb. 2008.
"Ads and movies on the run," the Gold Coast Bulletin, Southport, Qld, Jan. 29, 2008.
Richtel, "Cellphone consumerism; If even a debit card is too slow, now you have a new way to act on impulse: [National Edition]," National Post, Canada, Oct. 2, 2007.
Kim, "Free wireless a high-wire act; MetroFi needs to draw enough ads to make service add profits," San Francisco Chronicle, Aug. 21, 2006.
Koutsopoulou et al., "Charging, Accounting and Billing Management Schemes in Mobile Telecommunication Networks and the Internet," IEEE Communications Surveys & Tutorials, First Quarter 2004, vol. 6, No. 1.
Sun et al., "Towards Connectivity Management Adaptability: Context Awareness in Policy Representation and End-to-end Evaluation Algorithm," Dept. of Electrical and Information Engineering, Univ. Of Oulu, Finland, 2004.
Sabat, "The evolving mobile wireless value chain and market structure," Nov. 2002.
Nuzman et al., "A compund model for TCP connection arrivals for LAN and WAN applications," Oct. 22, 2002.
Kuntze et al., "Trustworthy content push," Fraunhofer-Institute for Secure Information Technology SIT; Germany; WCNC 2007 proceedings, IEEE.
Blackberry Mobile Data System, version 4.1, Technical Overview, 2006.
Client Guide for Symantec Endpoint Protection and Symantec Network Access Control, 2007.
Ehnert, "Small application to monitor IP trafic on a Blackberry—1.01.03", Mar. 27, 2008; http://www.ehnert.net/MiniMoni/.
NetLimiter Lite 4.0.19.0; http://www.heise.de/download/netlimiter-lite-3617703.html from vol. 14/2007.
Muntermann et al., "Potentiale und Sicherheitsanforderungen mobiler Finanzinformationsdienste und deren Systeminfrastrukturen," Chair of Mobile Commerce & Multilateral Security, Goethe Univ. Frankfurt, 2004.
Kasper et al., "Subscriber Authentication in mobile cellular Networks with virtual software SIM Credentials using Trusted Computing," Fraunhofer-Institute for Secure Information Technology SIT, Darmstadt, Germany; ICACT 2008.
Fujitsu, "Server Push Technology Survey and Bidirectional Communication in HTTP Browser," Jan. 9, 2008 (JP).
Windows7 Power Management, published Apr. 2009.
Open Mobile Alliance (OMA), Push Architecture, Candidate Version 2.2; Oct. 2, 2007; OMA-AD-Push-V2_2-20071002-C.
Dixon et al., Triple Play Digital Services: Comcast and Verizon (Digital Phone, Television, and Internet), Aug. 2007.

\* cited by examiner

QUALITY OF SERVICE FOR DEVICE ASSISTED SERVICES

BACKGROUND OF THE INVENTION

With the advent of mass market digital communications, applications and content distribution, many access networks such as wireless networks, cable networks and DSL (Digital Subscriber Line) networks are pressed for user capacity, with, for example, EVDO (Evolution-Data Optimized), HSPA (High Speed Packet Access), LTE (Long Term Evolution), WiMax (Worldwide Interoperability for Microwave Access), DOCSIS, DSL, and Wi-Fi (Wireless Fidelity) becoming user capacity constrained. In the wireless case, although network capacity will increase with new higher capacity wireless radio access technologies, such as MIMO (Multiple-Input Multiple-Output), and with more frequency spectrum and cell splitting being deployed in the future, these capacity gains are likely to be less than what is required to meet growing digital networking demand.

Similarly, although wire line access networks, such as cable and DSL, can have higher average capacity per user compared to wireless, wire line user service consumption habits are trending toward very high bandwidth applications and content that can quickly consume the available capacity and degrade overall network service experience. Because some components of service provider costs go up with increasing bandwidth, this trend will also negatively impact service provider profits.

BRIEF DESCRIPTION OF THE DRAWINGS

Various embodiments of the invention are disclosed in the following detailed description and the accompanying drawings.

DETAILED DESCRIPTION

Figure 1:
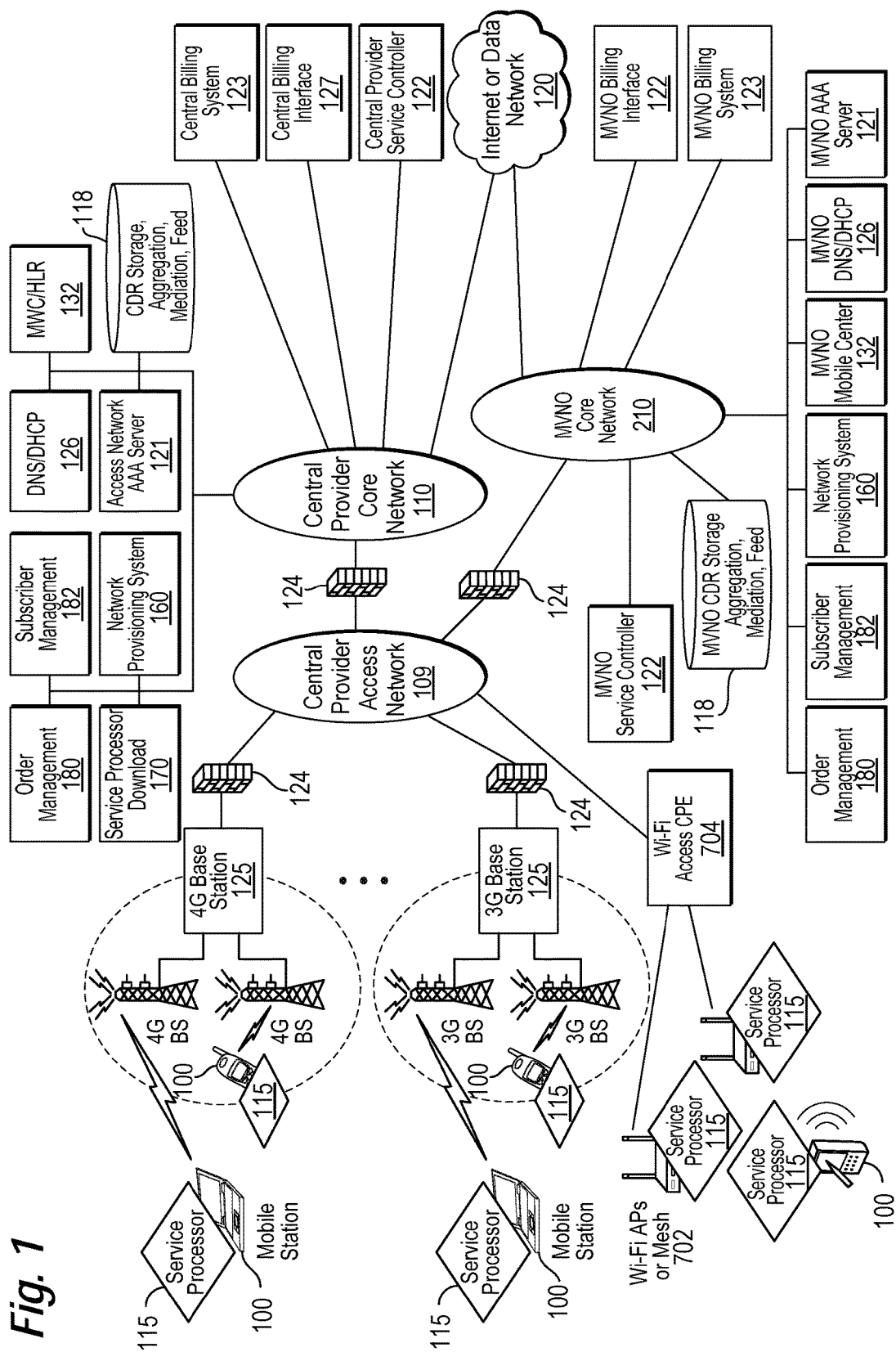
FIG. 1 illustrates a functional diagram of a network architecture for providing quality of service (QoS) for device assisted services (DAS) in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As wireless networks, such as mobile networks, evolve towards higher bandwidth services, which can include or require, for example, various levels of Quality of Service (QoS) (e.g., conversational, interactive data, streaming data, and/or various (end-to-end) real-time services that may benefit from QoS), demands will increase for converged network services to facilitate such services for end-to-end services between networks (e.g., to allow for control and/or support for such services, for example, QoS support, across network boundaries, such as between wireless networks (such as various service provider networks) and IP networks (such as the Internet), and/or other networks). While various efforts have attempted to address such QoS needs, such as policy management frameworks for facilitating QoS end-to end solutions, there exists a need to facilitate various QoS requirements using Device Assisted Services (DAS).

Accordingly, Quality of Service (QoS) for Device Assisted Services (DAS) is provided. In some embodiments, QoS for DAS is provided.

To establish a QoS channel, differentiated services are typically available, in which one class/level of service has a higher priority than another to provide for differentiated services on a network, such as a wireless network. For example, in a wireless network, various network elements/functions can be provisioned and controlled to establish a single end or end to end QoS channel. In some embodiments, a centralized QoS policy coordination and decision function using DAS techniques to assist in coordinating the QoS channel setup and control among the various elements of a wireless network is provided.

In some embodiments, QoS channel refers to the logical communication channel connected to a device that provides a desired level of QoS service level. For example, the QoS channel can be created with one or more QoS links, in which each link represents a QoS enabled connection that spans a portion of the total end to end network communication path from a near end device to a far end device. For example, the far end device can be on the same network or on a different network, potentially with different access technology and/or a different access network carrier. In some embodiments, the QoS channel includes one or more QoS links in which each link in the channel is QoS enabled, or one or more of the links in the channel is QoS enabled and others are not. As an example, a QoS channel can include the following links: a first device traffic path link, a first device to access network equipment element link (e.g., 2G/3G/4G wireless base station, WiFi access point, cable network head end, DSLAM, fiber aggregation node, satellite aggregation node, or other network access point/node), a first carrier core network, a long haul IPX network, a second carrier core network, a second device to access network equipment element link, and a second device traffic path link as similarly described herein with respect to various embodiments.

In some embodiments, each of the links described above have the ability to provide QoS services for that segment of an overall QoS channel. In some embodiments, the device traffic path link and/or the device to access network equipment element link are QoS enabled, but the carrier core network and/or IPX network links are not QoS enabled. In some embodiments, the core network and/or IPX network have sufficient over-provisioning of bandwidth that QoS is not limited by these network elements and, for example, can be limited by the device traffic link and/or the device to access network equipment element link do not have sufficient excess bandwidth making it desirable to QoS enable these QoS channel links. A common example is a 2G/3G/4G wireless network in which a device traffic path link and the device to access network element link (e.g., Radio Access Bearer (RAB)) are QoS enabled while the carrier core network and IPX network links are not (e.g., are provided at a best effort service level or other service levels).

In some embodiments, a QoS session refers to the QoS enabled traffic for a given device that flows over a QoS channel or QoS link. This QoS traffic supports a QoS service activity. In some embodiments, a QoS service activity includes a device service usage that is requested, configured, or preferably serviced with a given level of QoS. In some embodiments, a device QoS activity is a combination of one or more of the following: application, destination, source, URL or other similar service identifier, service provider, network type, traffic type, content type, network protocol, session type, QoS identifier, time of day, network capacity (e.g., network busy state), user service plan authorization or standing, roaming/home network status, and/or other criteria/measures as similarly described herein. For example, QoS service activities that are supported by QoS sessions can include VOIP traffic, streaming video traffic, differentiated access bandwidth during busy network periods, real-time interactive traffic, such as network connected multimedia meetings (e.g., shared presentations, picture, video, voice, and/or other such applications/services), best effort interactive, such as Internet browsing, time sensitive services, such as email message body delivery, near real time interactive services, such as SMS or push to talk, background download services, such as email downloads and other file transfers (e.g., FTP), and/or truly background download services, such as software updates.

In some embodiments, various QoS levels or classes are supported. For example a conversation class can provide for real-time traffic, which is typically very delay sensitive but can tolerate bit errors and packet losses. The conversational class is typically used for Voice Over IP (VOIP) and video telephony, in which users of such services benefit from the short delay features of the conversational class. A streaming class is similar to the conversational class except that the streaming class typically can tolerate more delay than the conversational class. The streaming class is generally used for when one end of the connection is a user (e.g., human user) and the other end is a machine/computer (e.g., for streaming content applications, such as streaming of video, such as movies or other video content). An interactive class is generally intended for traffic that allows delay variation while requiring reasonably low response time (e.g., web browsing or other applications in which the channel can be unused for long periods of time but when a user makes a request for a new page/data, the response time should be reasonably low). A background class is generally used for lowest priority service usages (e.g., typically used for e-mail, software updates, and/or other similar applications). In some embodiments, various QoS classes or services are applicable to the conversational class. In some embodiments, various QoS classes or services are also applicable to the streaming class. In some embodiments, various QoS classes or services are also applicable to the interactive class but typically not applicable to the background class. As will now be apparent to one of ordinary skill in the art, various other classes can be provided with lower or higher granularity based on service usage/channel requirements and/or network architectures.

In some embodiments, a QoS link or a QoS channel supports one QoS session. In some embodiments, a QoS link or a QoS channel supports multiple QoS sessions. In some embodiments, QoS link provisioning is provided to setup the QoS traffic level for a given QoS session or group of QoS sessions.

In some embodiments, a QoS channel is a single ended QoS channel or an end to end QoS channel. For example, if a QoS channel is end to end, then the QoS channel provisioning is accomplished in a coordinated manner for each QoS enabled link in the QoS channel. If a QoS channel is single ended, then the network elements and/or device participate in provisioning as much of one end of the QoS channel as possible, leaving provisioning of the QoS for the other end of the channel as the responsibility of the device and/or network elements that handle the traffic at the other end of the QoS channel. In some embodiments, a single ended QoS channel includes another single ended QoS channel at the other end. In some embodiments, only one end has single ended QoS channel enablement while the other end of the channel is a best effort service level, which, for example, can be used where one end of the QoS channel has tighter constraints on traffic capacity or quality than the other end (e.g., a VOIP call with one end that is QoS enabled on a 3G wireless network that has relatively tight bandwidth compared to a lightly loaded cable modem network device on the other end which may not need to be QoS enabled in order to achieve adequate voice quality).

In some embodiments, a QoS request (e.g., a QoS channel request or QoS service request) is a request for a QoS provisioning event to enable a QoS channel for one or more QoS service activities. In some embodiments, QoS availability assessment includes determining whether one or more of the links in a possible QoS channel are available (e.g., based on network capacity and transmission quality) to provision the necessary level of QoS for a requested QoS channel. In some embodiments, a QoS request is initiated by a device, a user, an application, and/or a network element/function as similarly described herein.

In some embodiments, a service plan refers to the collection of access service capabilities and/or QoS capabilities that are associated with a communications device. In some embodiments, the access and/or QoS capabilities are determined by the collection of access service control policies for the device. In some embodiments, these service control policies are implemented in the network equipment. In some embodiments, these access service control policies are implemented both in the device and in the network equipment. In some embodiments, these access service control policies are implemented in the device. In some embodiments, there are different levels of service control capabilities (e.g., policies) based on different levels of service plan payments or device standing or user standing. In some embodiments, there are different levels of service control policies based on network type, time of day, network busy status, and/or other criteria/measures as similarly described herein with respect to various embodiments. In some embodiments, the access control and QoS control policies are based on the type of service activity being sought. In some embodiments, the QoS level and access level available for a given service activity for a given device or user is determined by the policies associated with the service plan. In some embodiments, a QoS authorization assessment is performed to determine whether a device or user has sufficient service plan standing to allow the requested level of QoS.

In some embodiments, before a QoS channel or link is provisioned (or before a QoS request is responded to or filled), a QoS availability assessment is performed to determine whether sufficient communication channel resources are available to provision the necessary level of QoS for the QoS channel or link. In some embodiments, this QoS availability assessment is determined by assessing the available QoS capacity for one or more necessary QoS links in the channel. For example, the available QoS link capacity can be assessed for one or more of a device traffic path, a device to access network equipment element link, a core network link, and/or an IPX network link. If the QoS assessment shows that the necessary channel capacity and quality is available for the desired QoS level for one or more desired QoS service activities, then a QoS channel request or QoS service request can be granted. In some embodiments, a QoS link or QoS channel reservation process is provided to reserve QoS capacity and quality in advance of link or channel provisioning to ensure that the available QoS resources are not assigned between the time of QoS availability assessment and QoS channel provisioning.

In some embodiments, the QoS availability assessment is performed after QoS authorization assessment. This prevents the unnecessary exercising of network elements when the device or user does not have sufficient service plan standing to receive the desired level of QoS even if it is available. This can be an important screening function performed on the device in the service processor, or by a centralized network function such as the service controller (e.g. or interchangeably, the home agent (HA), Home Location Register (HLR), Authentication, Authorization, and Accounting (AAA) server/gateway/function, base station, one of the gateways or other network element/function). In some embodiments, QoS availability is assessed without conducting a QoS authorization assessment or before receiving the response to a QoS authorization assessment.

In some embodiments, a QoS channel is provisioned to create the QoS channel to support a QoS session (e.g., a QoS service activity). In some embodiments, QoS channel provision includes assigning, routing, and/or otherwise causing the QoS session traffic to flow over one or more QoS links in the assigned QoS channel.

In some embodiments, device assisted service traffic control and QoS apply readily and directly to the problems of managing a QoS device link for QoS channel provisioning. Accordingly, in some embodiments, a service provider is provided to assist in provisioning the device portion of the QoS channel. In some embodiments, the service processor provisions the device link portion of the QoS channel by placing a higher priority on higher QoS level traffic. In some embodiments, this QoS priority is implemented in a number of ways, including routing the higher priority QoS traffic into first priority in the downstream and/or upstream traffic queues. Upstream traffic queuing is performed directly in some embodiments by transmitting guaranteed bit rate traffic first at higher available throttling rates, differentiated QoS traffic second with a controlled throttling rate, best effort traffic third with possibly lower controlled throttled rates, and/or background traffic fourth when/if bandwidth not needed by the higher levels of QoS traffic and at lower controlled throttling rates. For example, downstream traffic can be handled by queuing traffic and delaying or preventing TCP acknowledgements to be returned for the lower levels of QoS priority, while immediately passing the traffic and TCP acknowledgements for higher levels of QoS priority. The device link portion of the QoS channel is thus provisioned by assigning policies for the queuing priority, delay, throttle rate, and TCP acknowledgement return rate for device traffic in accordance with the bandwidth that is available at any point in time for the device. In some embodiments, various device service processor traffic control capabilities regulate or partially regulate QoS in accordance with a set of network policy instructions, including, in some embodiments, a service plan policy set.

In some embodiments the device service processor establishes multiple QoS channels through the device traffic path with each QoS channel having traffic control policies as described herein, with each QoS channel policy set creating a different class of QoS. In some embodiments, employing this multiple QoS channel approach, QoS for a given service activity is provided by routing the traffic for that QoS activity to the appropriate QoS channel with the appropriate QoS policy settings. The routing to the appropriate QoS channel can be provided using various techniques. For example, the routing can be provided by applying a common service traffic control policy set to traffic associated with all QoS service activities that require or request the QoS provided by the common service traffic control policy set. The application of the service traffic control policy set can be accomplished in a number of ways utilizing the embodiments described for the policy implementation agent and the policy control agent described herein. In such embodiments, the problem of assigning a QoS channel to a number of QoS service activities is reduced to applying a pre-determined set of service traffic control policies to each of the QoS service activities, with each pre-determined set of service traffic control policies representing a different QoS class. The device can then manage the overall QoS for all traffic based on the available traffic capacity and quality, the total aggregate traffic demand for each QoS traffic class and the policy rules that determine how each traffic class is provided with differential bit rate and traffic quality as compared to the other traffic classes for a given level of available traffic capacity and quality.

Based on the aggregate demand for each traffic QoS class, and the traffic capacity and quality level available to the device, the service processor can adjust the total available bit rate or percentage of available traffic capacity for each QoS class. For example, in some embodiments, the aggregate demand for the real time interactive traffic control class (e.g. services, such as VOIP, emergency communication services or high performance real time competitive gaming) can be determined, and the QoS routing function on the device (e.g., a QoS router agent/function) can first allocate enough constant bit rate traffic capacity from the available traffic capacity to satisfy these services, with each QoS service activity that requires this QoS class being assigned to this QoS channel. As more QoS service activities require this traffic class, the capacity allocated to the QoS channel out of the available device capacity is increased, and when fewer QoS service activities require this traffic class the capacity for this QoS channel is released. In the event that the device does not have any more available capacity with a guaranteed bit rate QoS level, then additional QoS service activities that desire, require or request this QoS level will not be provided this QoS level, and instead will either be provided with a lower QoS level or will not be allowed to connect to the access network. In some embodiments, there can be a hierarchy among the possible QoS service activities so that if there is no more capacity available at a given service QoS level, then the available capacity for that QoS class is provided to the service activities requiring that QoS from highest priority to lowest, until the available QoS class capacity is consumed, and then one or more QoS service activities that are too low on the priority list to obtain service with that QoS class are either bumped to a lower QoS class or are denied access. In some embodiments, once the required capacity to satisfy the real time constant rate traffic needs is satisfied, the remaining capacity available to the device is then divided among the other QoS channel classes in accordance with a priority policy, with the priority policy being based on the relative priority of each service class, the relative priority of each QoS service activity, or a combination of the relative priority of each QoS service class and each QoS service activity. For example, these relative priority policies can vary from device to device based on service plan selection, device type, user standing, user group, device location, device network connection, type of network, time of day, network busy state, and/or other criteria/measures.

In some embodiments, a QoS link is established between the device and an access network equipment element. For example, such equipment element embodiments can include a 2G/3G/4G wireless base station, a wireless access point, a cable network head end, a DSL network DSLAM, a fiber network device traffic aggregator, a satellite network device traffic aggregator, a frame relay aggregation node, an ATM aggregation node, and/or other network equipment. In some embodiments, a logical communication channel is created between the device and the network equipment element, with the logical communication channel supporting a given level of QoS or QoS class traffic policy set. For example, the logical channel can include a RAB formed between a 2G/3G/4G base station and a wireless end point device. The RAB can be formed by controlling the media access control (MAC) parameters of the base station radio channel so that a given level of QoS class policies can be implemented. For example, the RAB can support constant bit rate, low latency communication traffic for guaranteed bit rate real time traffic, or a differentiated high priority access channel for streaming traffic, or a best effort random access channel for best effort traffic, or an available unused capacity traffic for background traffic. The QoS channel link created in this manner can be dedicated to a single device, or shared with a subset of devices, or available to all devices. The QoS channel link created in this manner can be used by the device to support a single QoS activity as described herein, or a group of QoS activities as described herein. It will now be apparent to one of ordinary skill in the art that similar settings for cable head end and cable modem MAC can yield similar QoS classes for QoS links for the cable modem case and that similar techniques can be applied for a wireless access point or a satellite system MAC to achieve similar QoS classes for QoS links. It will also now be apparent to one of ordinary skill in the art that by creating multiple logical channels in the device link, and/or adjusting the available access network capacity and quality for each logical device communication channel in the DSLAM or fiber aggregator, similar QoS class QoS links can be established for the DSL and fiber distribution network cases.

In some embodiments the device service processor serves to route QoS service activities to the appropriate logical communication channel established for the desired QoS class supported by a QoS link between the device and the access network equipment element. In some embodiments, the device service processor elements (e.g., the policy implementation agent and/or the policy control agent) can be used in some embodiments to assign the same QoS traffic control policies to one or more QoS service activities that require the same QoS level. In a similar manner, in some embodiments, the device service processor elements can be used to assign or route service activity traffic for a given QoS class to the correct logical communication channel between the device and the access network element (e.g., a 2G/3G/4G base station) that supports the traffic control policies for the desired QoS class. For example, a QoS service link that supports guaranteed bit rate and latency can be established with one or more RABs from a base station to the device, and a second QoS service link can be established that supports differentiated preferred access for streaming content using one or more differentiated access RABs, and a third best effort RAB can be used to support best effort traffic. Each of the required RABs is first requested and then provisioned as described herein based on the aggregate required capacity and quality for one or more QoS service activities that require or desire the specific QoS service class associated with the RAB logical channel policy parameters. Once the set of logical QoS channels is thus established, the service processor (e.g., QoS router agent/function) routes the traffic associated with each QoS service activity to the appropriate RAB. In some embodiments, the service processor can detect increases or decreases in aggregate QoS class demand for each QoS class as QoS activities are initiated or terminated for that QoS class, and the service processor can communicate the required increases or decreases in the RAB assignments required to support that logical QoS channel.

In some embodiments, the access QoS link is established by direct communication from the device in which the device requests the QoS channel or link from the access network equipment element, or the device requests the QoS channel or link from an intermediate networking device, such as a service controller (e.g., or a readily substituted device with similar features, such as a home agent, an HLR, a mobile switching center, a base station, an access gateway, a AAA system, or a billing system). In some embodiments, the device service processor bases the QoS channel or link request on an association the device performs to match a QoS service activity with a desired or required QoS class or QoS traffic control policy set. For example, this association of QoS class or QoS traffic control policy set with QoS service activity can be determined by a predefined policy mapping that is stored on the device and used by the service processor. In some embodiments, this policy mapping store is populated and/or updated by a service controller (e.g., or similar function as described herein). In some embodiments, the mapping is determined by a service controller (e.g., or similar function as described herein) based on a report from the device of the QoS service activity that needs the QoS channel or link.

In some embodiments, the required or desired QoS level for one or more QoS service activities is determined by a set of QoS service traffic control policies that are pre-assigned to various QoS service activities. For example, a given application can be pre-assigned a QoS class. As another example, a web service destination such as a VOIP service site can be assigned a QoS class. As another example, a given application can have one QoS assignment level for general Internet traffic but have a QoS assignment for real-time gaming traffic. As another example, a real-time broadcasting website can have a best effort QoS level assigned to programming information and general browsing and have a differentiated streaming QoS level for broadcast traffic content. In some embodiments, detection of QoS need or QoS assignment request for a given activity can be assigned by a device service processor according to a pre-defined QoS policy rules table (e.g., QoS activity table), or can be determined by a service controller based on information reported by the device, or can be requested by an application through a QoS application interface (e.g., QoS API), or can be determined by the nature of incoming traffic.

In embodiments, in which both end points in the QoS channel participate in establishing an end to end QoS channel, the required QoS level is determined and/or communicated by the originating end point. In some embodiments, the required QoS level is determined and/or communicated by the receiving end point. In some embodiments the QoS level is determined and/or communicated by the originating end point service controller (e.g., or the access network element (such as a base station), the HLR, home agent, mobile switching center, AAA, gateway, or other network element/function). In some embodiments, the QoS level is determined and/or communicated by the receiving end point service controller (e.g., or alternatively the access network element (such as a base station), the HLR, home agent, mobile switching center, AAA, gateway, or other network element/function). In some embodiments, the receiving end point service controller (e.g., or the access network element (such as a base station), the HLR, home agent, mobile switching center, AAA, gateway or other network function) and the originating end point service controller (e.g., or other similar function) communicate with one another to coordinate establishment of the QoS channel between the end points.

In some embodiments, the near end or originating end device service processor contacts the far end or terminating device service processor to initiate a QoS channel. In some embodiments, the initiation of the QoS channel from the near end or originating device is performed automatically by the far end device when its service processor detects that a given level of QoS is needed for the communication between the two devices. In some embodiments, the near end or originating device service processor detects the need for a QoS channel to the far end or terminating device and contacts a central network resources, such as the service controller (e.g., or other equipment element with similar function for this purpose), and the service controller provisions the far end of the QoS channel, either by communicating directly with the far end device or by communicating with the far end device's service controller (e.g., or other equipment element with similar function for this purpose). In some embodiments, in which the far end device service controller is contacted to assist in provisioning the QoS channel, there is a look up function to determine the address of the far end service controller based on a look up index formed from some aspect of the far end device credentials (e.g., phone number, SIM ID, MEID, IMSI, IP address, user name, and/or other device credentials).

In some embodiments, the mapping of QoS service activity to the desired level of QoS class or QoS traffic control policies is determined by providing a QoS API in the device service processor that applications use to request a QoS class or QoS channel connection. In some embodiments, an API is provided so that application developers can create application software that uses the standard interface commands to request and set up QoS channels. In some embodiments, the API does one or more of the following: accepts QoS requests from an application, formats the QoS channel request into a protocol appropriate for transmission to network equipment responsible for assessing QoS channel availability (e.g., including possibly the device traffic control system), coordinates with other network elements (e.g., including possibly the device traffic control system) to reserve a QoS channel, coordinates with other network elements (e.g., including possibly the device traffic control system) to provision a QoS channel, informs the application that the desired QoS channel can be created or not, and/or coordinates with other network elements (e.g., including possibly the device traffic control system) to connect the application with the desired QoS channel class. In some embodiments, the QoS API accepts the application QoS request and communicates and possibly coordinates with one or more QoS network equipment elements, such as a base station, cable head end or access point. In some embodiments, the QoS API accepts the QoS request from the application and communicate and possibly coordinates with an intermediate network element, such as a service processor (e.g., or other similar function as described herein). In some embodiments the QoS API assesses the QoS service plan standing for the device or user before sending QoS channel requests to other network elements, and only initiates the QoS request sequence if required service plan authorization is in place. In this manner, the potentially complex process of establishing a QoS channel with all the specific equipment communication protocols that typically need to be supported to assess QoS channel availability and provision the QoS channel are simplified into a limited set of API commands that are easy for an application development community to learn about and use for QoS differentiated services and applications.

In some embodiments, local traffic control on the device service processor is combined with traffic control in the link between the device and the access network equipment element. In this manner, both the device traffic control path QoS link and the device to access network element QoS link can be coordinated for best device QoS performance results given the available capacity and quality of the access network traffic for the device. In some embodiments the policies for how the device manages local traffic control, establishes access network element logical channels (e.g., RABs) and routes traffic to and from the access network element logical channels is all determined by predefined policy rules loaded onto the device by the service controller (or other equivalent network element). In some embodiments, these policies are determined in the service controller itself.

In some embodiments, a QoS user interface (e.g., QoS UI) is presented to the device user. In some embodiments, the QoS UI notifies the user what level of QoS services the device is authorized to receive based on the service plan selection. In some embodiments, the QoS UI notifies the user what level of QoS services are available on the present network the device is connected to at the present time. In some embodiments, the QoS UI notifies the user when a level of QoS service that is higher than that authorized by the user service plan is required or desirable for a given service activity that the device has initiated. In some embodiments, the QoS UI provides the user with a set of one or more upgrade options to upgrade the service plan to include a higher level of QoS for one or more service activities. In some embodiments, the QoS UI provides the user with an opportunity to specify what level of QoS the user would like to employ for one or more service usage activities. In some embodiments, the QoS UI allows the user to specify a service plan setting that provides differentiated QoS during times when the network is busy. In some embodiments, the QoS UI allows the user to purchase one or more grades of service QoS with either a post-pay for a pre-defined service period and one or more pre-defined service usage limits by QoS class, a pre-pay for one or more pre-defined service usage limits by QoS class, or another payment system for differentiated QoS services. In some embodiments, the QoS UI provides the user with an opportunity to QoS enable or pay for QoS services for a connection that is initiated by an incoming connection to the device.

In some embodiments, QoS for DAS techniques include verifying that the device is properly implementing the QoS traffic control policies, for example, in accordance with a service plan. This ensures that errors, hacking, user device software settings manipulations, or other malware events do not result in inappropriate levels of QoS for a given device or group of devices. Accordingly, in some embodiments, the traffic control and QoS verification techniques described herein are employed to verify that the proper level of QoS is applied for a given service usage activity in accordance with a QoS priority policy. For example, verification of QoS channel request policy rules behavior can be implemented in a variety of ways including, as an example, monitoring device QoS channel requests and comparing the level of QoS requested with the level of QoS the device is authorized to receive in the service plan in effect for the device. Verification of proper QoS channel usage behavior by a device can be implemented in a variety of ways including, for example, monitoring network based reports of QoS service usage and comparing the network based reports against the service policy rules that should be in effect given the device service plan. Verification of proper device traffic control to implement a QoS service policy that is in effect can be accomplished in a variety of ways by verifying that the appropriate traffic control policy rules are being properly implemented as described herein.

In some embodiments, the QoS router prioritizes traffic on the device. In some embodiments, the QoS router connects the QoS enabled session to the RAB that has the proper QoS level. In some embodiments, one session is routed to the RAB. In some embodiments, more than one session can be routed to an RAB. In some embodiments, multiple RABs providing multiple QoS levels are created to the device, and the QoS router routes each service activity to the RAB dictated by the QoS policy rules in effect on the device.

In some embodiments, the network collects service usage charges for different QoS classes. In some embodiments, there is differentiated service charging for the different classes of QoS service usage. As an example, since guaranteed bit rate traffic consumes network resources whether the traffic capacity is used or not, there can be a time element involved in the charging calculations. As a more detailed example, guaranteed bit rate services can be charged by the total bandwidth provisioned to the device at a given time multiplied by the amount of time that that bandwidth is made available. In some embodiments, differentiated access traffic that has higher QoS than best effort traffic but is not guaranteed bit rate can be charged at a higher rate than best effort traffic but lower than guaranteed bit rate. In some embodiments, such traffic can be charged based on the time the QoS channel is made available and the total amount of data transmitted over the channel, or can only be based on the total amount of data transmitted over the channel. Best effort traffic is charged in some embodiments based only on the total amount of data used, with the data charges being less than differentiated streaming access services. Background data services in some embodiments are charged at the lowest rate, possibly with only certain times of the day or periods of low network traffic demand being available for such services, and with the service being based on total data transmitted. In some embodiments, all QoS service levels can be charged based on a fixed price for a fixed charging period, possibly with a service usage cap with additional charges if the service cap is exceeded. In such fixed price scenario embodiments, the price charged is again higher for higher levels of QoS.

In some embodiments, the network equipment (e.g., access network element, gateways, AAA, service usage storage systems, home agent, HLR, mobile data center, and/or billing systems) record and report service usage for one or more of the QoS service classes used by the device. In some embodiments, the device service processor records and reports service usage for one or more of the QoS service classes used by the device and reports the QoS service class usage to the service controller (e.g., or another substitute network element). In some embodiments, in which the device is recording reporting usage for one or more QoS service classes, it is important to verify the device service usage reports to ensure that the device usage reports are not distorted, tampered with, and/or otherwise in error. In some embodiments, verifying service usage reports against service usage that should be occurring given the service control policies in place on the device, service processor agent functional operation verification, test service usage events, agent query response sequences, device service processor software protection techniques, device service processor software environment checks, and several other techniques are provides as described herein. For example, using one or more of these verification techniques can provide a verifiable device assisted QoS service usage charging system.

In some embodiments, device assisted traffic control is provided for managing network congestion as follows. For example, when a given base station or group of base stations experience traffic demand that is high relative to the available capacity and/or service quality that can be provided, and such a condition is detected by means of network busy state assessment as described below, then a service controller (e.g., or another interchangeable network function) can issue traffic control throttling policies to the devices in accordance with a measure of the excess traffic demand the one or more base stations is experiencing. For example, the device service processors connected to an overly busy base station can be instructed to reduce the traffic control priority for one or more classes of QoS traffic, reducing the queuing priority, throttling rate, delay and/or access allowance for some or all of one or more classes of traffic. As another example, background download processes, such as software updates can be turned off completely or throttled back significantly. As another example, best effort traffic such as Internet browsing can be throttled or reduced for a group of devices connected to base stations experiencing excess traffic demand. As another example, a policy can be implemented on the devices connected to busy base stations in which the device is allowed to browse or conduct other best effort service activities at a relatively high throttling rate for a period of time, but if the device uses more than a certain amount of service (e.g., total data downloaded and/or uploaded) in a certain period of time then the device may be traffic controlled according to an adaptive throttling policy as described herein. In some embodiments, higher QoS level traffic cannot be throttled in such circumstances, such as VOIP traffic where real time guaranteed bit rate is important to meet user service needs or expectations, while lower priority traffic such as interactive browsing and/or background download are throttled and/or blocked. In some embodiments, the QoS availability assessment processes described herein are adjusted so that higher QoS channels are not provided and provisioned in times or locations in which a given base station or group of base stations experience excess demand or demand above a given threshold.

In some embodiments, users or devices that have service plans with higher QoS levels, or service plans with higher priority during busy network periods have different traffic control policies applied to them that result in a higher level of traffic performance and/or a higher level of QoS service availability. For example, emergency service workers can be given higher traffic control access policies that result in differentiated services during peak busy times on the network or a portion of the network. In some embodiments, users can obtain a premium service plan for differentiated access during peak busy time periods or may use higher levels of QoS service settings and/or service plans to achieve differentiated service during peak busy periods. As another example, services that demand high levels of QoS classes, such as real time voice services, instant messaging, push to talk, differentiated video streaming, and/or interactive gaming, are not traffic controlled to the same extent that other lower priority services or lower class service plans are traffic controlled during peak busy times. For example, this type of service differentiation can also be applied based on device type, user group, user standing, user reward zone points, and/or other criteria/measures as similarly described herein.

In some embodiments, the decision to reduce the access traffic control settings as described above is made by the device service processor based on the device's assessment of the network capacity, which can be determined using various techniques as described herein. In some embodiments, the decision to reduce the access traffic control settings as described above is made by a service controller (e.g., or other interchangeable network equipment element or elements as described herein) connected to the device that provides instructions to the device to adjust the access policy settings. For example, the service controller can obtain the network capacity information from access equipment elements, from device reports of traffic capacity and/or quality as described herein, or from reports on traffic capacity and/or quality obtained from dedicated devices used for the purpose of assessing network capacity. In some embodiments, the decision to reduce the access traffic control settings as described above is based on the time of day or day of week or both to accommodate cyclical patterns in network capacity and traffic demand.

In some embodiments, a service controller (e.g., or other interchangeable network equipment element or elements as described herein) assesses network busy state and then controls device traffic demand by reducing the offered capacity for one or more service classes supported by the access network equipment elements, such as a wireless base station. In such embodiments, the service controller (e.g., or similar function) gathers the network capacity information with one of the techniques described herein and instructs one or more of the access network equipment elements to reduce the offered capacity for one or more levels of service QoS, to one or more of the devices connected to the access network equipment elements. For example, the determination of which devices to throttle back can be made based on an equal throttling of all devices of a given service plan status, or based on the device traffic usage patterns in the recent past as described herein, or based on a combination of service plan status and recent traffic usage patterns.

In some embodiments, the device is enabled with ambient services that have differentiated QoS services as part of the ambient service offering. For example, this can be accomplished using the pre-assigned QoS policies for a given service activity set within the ambient service, or using an ambient service application that requests QoS through the QoS API. Other embodiments for providing QoS differentiated service activities within ambient service offerings will now be apparent to one of ordinary skill in the art.

In some embodiments, a QoS service control policy is adapted as a function of the type of network the device is connected to. For example, the QoS traffic control policies and/or the QoS service charging policies can be different when the device is connected to a wireless network (e.g., a 3G/4G network where there is in general less available QoS enabled traffic capacity) than when the device is connected to a wired network (e.g., a cable or DSL network where there is in general a higher level of QoS capacity available). In such embodiments, the device service processor and the service controller can coordinate to adapt the QoS service control policies and/or the QoS service charging policies to be different depending on which network the device is connected to. Similarly, the device QoS service control policy and/or QoS service charging policy can also be adapted based on whether the device is connected to a home wireless network or a roaming wireless network.

In some embodiments, various of the QoS related techniques described herein are performed on the device using DAS techniques and/or on the service controller in secure communication with a verified service processor executed on the device using DAS techniques. In some embodiments, various of the QoS related techniques described herein are performed by/in coordination/communication with one or more intermediate network elements/functions for assisting in various QoS functions.

FIG. 1 illustrates a functional diagram of a network architecture for providing quality of service (QoS) for device assisted services (DAS) in accordance with some embodiments. In some embodiments, QoS for DAS techniques described herein are implemented using the network architecture shown in FIG. 1.

As shown, FIG. 1 includes a 4G/3G/2G wireless network operated by, for example, a central provider. As shown, various wireless devices 100 are in communication with base stations 125 for wireless network communication with the wireless network (e.g., via a firewall 124), and other devices 100 are in communication with Wi-Fi Access Points (APs) or Mesh 702 for wireless communication to Wi-Fi Access CPE 704 in communication with central provider access network 109. In some embodiments, one or more of the devices 100 are in communication with other network element/equipment that provides an access point, such as a cable network head end, a DSL network DSLAM, a fiber network aggregation node, and/or a satellite network aggregation node. In some embodiments, each of the wireless devices 100 includes a service processor 115 (as shown) (e.g., executed on a processor of the wireless device 100), and each service processor connects through a secure control plane link to a service controller 122 (e.g., using encrypted communications).

In some embodiments, service usage information includes network based service usage information (e.g., network based service usage measures or CDRs, which can, for example, be generated by service usage measurement apparatus in the network equipment), which is obtained from one or more network elements (e.g., BTS/BSCs 125, RAN Gateways (not shown), Transport Gateways (not shown), Mobile Wireless Center/HLRs 132, AAA 121, Service Usage History/CDR Aggregation, Mediation, Feed 118, or other network equipment). In some embodiments, service usage information includes micro-CDRs. In some embodiments, micro-CDRs are used for CDR mediation or reconciliation that provides for service usage accounting on any device activity that is desired. In some embodiments, each device activity that is desired to be associated with a billing event is assigned a micro-CDR transaction code, and the service processor 115 is programmed to account for that activity associated with that transaction code. In some embodiments, the service processor 115 periodically reports (e.g., during each heartbeat or based on any other periodic, push, and/or pull communication technique(s)) micro-CDR usage measures to, for example, the service controller 122 or some other network element. In some embodiments, the service controller 122 reformats the heartbeat micro-CDR usage information into a valid CDR format (e.g., a CDR format that is used and can be processed by an SGSN or GGSN or other network elements/equipment used/authorized for generating or processing CDRs) and then transmits it to a network element/function for CDR mediation (e.g., CDR Storage, Aggregation, Mediation, Feed 118).

In some embodiments, CDR mediation is used to account for the micro-CDR service usage information by depositing it into an appropriate service usage account and deducting it from the user device bulk service usage account. For example, this technique provides for a flexible service usage billing solution that uses pre-existing solutions, infrastructures, and/or techniques for CDR mediation and billing. For example, the billing system (e.g., billing system 123 or billing interface 127) processes the mediated CDR feed from CDR mediation, applies the appropriate account billing codes to the aggregated micro-CDR information that was generated by the device, and then generates billing events in a manner that does not require changes to the existing billing systems (e.g., using new transaction codes to label the new device assisted billing capabilities). In some embodiments, network provisioning system 160 provisions various network elements/functions for authorization in the network, such as to authorize certain network elements/functions (e.g., CDR storage, aggregation, mediation, feed 118 or other network elements/functions) for providing micro-CDRs, reformatted micro-CDRs, and/or aggregated or reconciled CDRs.

As shown in FIG. 1, a CDR storage, aggregation, mediation, feed 118 is provided. In some embodiments, the CDR storage, aggregation, mediation, feed 118 receives, stores, aggregates and mediates micro-CDRs received from mobile devices 100. In some embodiments, the CDR storage, aggregation, mediation, feed 118 also provides a settlement platform using the mediated micro-CDRs, as described herein. In some embodiments, another network element provides the settlement platform using aggregated and/or mediated micro-CDRs (e.g., central billing interface 127 and/or another network element/function).

In some embodiments, various techniques for partitioning of device groups are used for partitioning the mobile devices 100 (e.g., allocating a subset of mobile devices 100 for a distributor, an OEM, a MVNO, and/or another partner or entity). As shown in FIG. 1, a MVNO core network 210 includes a MVNO CDR storage, aggregation, mediation, feed 118, a MVNO billing interface 122, and a MVNO billing system 123 (and other network elements as shown in FIG. 1). In some embodiments, the MVNO CDR storage, aggregation, mediation, feed 118 receives, stores, aggregates and mediates micro-CDRs received from mobile devices 100 (e.g., MVNO group partitioned devices).

Those of ordinary skill in the art will appreciate that various other network architectures can be used for providing device group partitions and a settlement platform, and FIG. 1 is illustrative of just one such example network architecture for which device group partitions and settlement platform techniques described herein can be provided.

In some embodiments, CDR storage, aggregation, mediation, feed 118 (e.g., service usage 118, including a billing aggregation data store and rules engine) is a functional descriptor for, in some embodiments, a device/network level service usage information collection, aggregation, mediation, and reporting function located in one or more of the networking equipment apparatus/systems attached to one or more of the sub-networks shown in FIG. 1 (e.g., central provider access network 109 and/or central provider core network 110), which is in communication with the service controller 122 and a central billing interface 127. As shown in FIG. 1, service usage 118 provides a function in communication with the central provider core network 110. In some embodiments, the CDR storage, aggregation, mediation, feed 118 function is located elsewhere in the network or partially located in elsewhere or integrated with/as part of other network elements. In some embodiments, CDR storage, aggregation, mediation, feed 118 functionality is located or partially located in the AAA server 121 and/or the mobile wireless center/Home Location Register (HLR) 132 (as shown, in communication with a DNS/DHCP server 126). In some embodiments, service usage 118 functionality is located or partially located in the base station, base station controller and/or base station aggregator, collectively referred to as base station 125 in FIG. 1. In some embodiments, CDR storage, aggregation, mediation, feed 118 functionality is located or partially located in a networking component in the central provider access network 109, a networking component in the core network 110, the central billing system 123, the central billing interface 127, and/or in another network component or function. This discussion on the possible locations for the network based and device based service usage information collection, aggregation, mediation, and reporting function (e.g., CDR storage, aggregation, mediation, feed 118) can be easily generalized as described herein and as shown in the other figures and embodiments described herein by one of ordinary skill in the art. Also as shown in FIG. 1, the service controller 122 is in communication with the central billing interface 127 (e.g., sometimes referred to as the external billing management interface or billing communication interface), which is in communication with the central billing system 123. As shown in FIG. 1, an order management 180 and subscriber management 182 are also in communication with the central provider core network 110 for facilitating order and subscriber management of services for the devices 100 in accordance with some embodiments.

In some embodiments, a service processor download 170 is provided, which provides for periodical downloads/updates of service processors (e.g., service processor 115). In some embodiments, verification techniques include periodically updating, replacing, and/or updating an obfuscated version of the service processor, or performing any of these techniques in response to an indication of a potential compromise or tampering of any service processor functionality and/or QoS functionality executed on or implemented on the device 100.

In some embodiments, the CDR storage, aggregation, mediation, feed 118 (and/or other network elements or combinations of network elements) provides a device/network level service usage information collection, aggregation, mediation, and reporting function. In some embodiments, the CDR storage, aggregation, mediation, feed 118 (and/or other network elements or combinations of network elements) collects device generated/assisted service usage information (e.g., micro-CDRs) for one or more devices on the wireless network (e.g., devices 100); and provides the device generated service usage information in a syntax and a communication protocol that can be used by the wireless network to augment or replace network generated usage information for the one or more devices on the wireless network. In some embodiments, the syntax is a charging data record (CDR), and the communication protocol is selected from one or more of the following: 3GPP, 3GPP2, or other communication protocols. In some embodiments, as described herein, the CDR storage, aggregation, mediation, feed 118 collects/receives micro-CDRs for one or more devices on the wireless network (e.g., devices 100). In some embodiments, the CDR storage, aggregation, mediation, feed 118 (and/or other network elements or combinations of network elements) includes a service usage data store (e.g., a billing aggregator) and a rules engine for aggregating the collected device generated service usage information. In some embodiments, the network device is a CDR feed aggregator, and the CDR storage, aggregation, mediation, feed 118 (e.g., other network elements and/or various combinations of network elements) also aggregates (network based) CDRs and/or micro-CDRs for the one or more devices on the wireless network; applies a set of rules to the aggregated CDRs and/or micro-CDRs using a rules engine (e.g., bill by account, transactional billing, revenue sharing model, and/or any other billing or other rules for service usage information collection, aggregation, mediation, and reporting), and communicates a new set of CDRs for the one or more devices on the wireless network to a billing interface or a billing system (e.g., providing a CDR with a billing offset by account/service). In some embodiments, a revenue sharing platform is provided using various techniques described herein.

In some embodiments, the CDR storage, aggregation, mediation, feed 118 (e.g., or other network elements and/or various combinations of network elements) communicates a new set of CDRs (e.g., aggregated and mediated CDRs and/or micro-CDRs that are then translated into standard CDRs for a given wireless network) for the one or more devices on the wireless network to a billing interface (e.g., central billing interface 127) or a billing system (e.g., central billing system 123). In some embodiments, the CDR storage, aggregation, mediation, feed 118 (e.g., or other network elements and/or various combinations of network elements) communicates with a service controller (e.g., service controller 122) to collect the device generated service usage information (e.g., micro-CDRs) for the one or more devices on the wireless network. In some embodiments, the CDR storage, aggregation, mediation, feed 118 (and/or other network elements or combinations of network elements) communicates with a service controller, in which the service controller is in communication with a billing interface or a billing system. In some embodiments, the CDR storage, aggregation, mediation, feed 118 (e.g., or other network elements and/or combinations of network elements) communicates the device generated service usage information to a billing interface or a billing system. In some embodiments, the CDR storage, aggregation, mediation, feed 118 (e.g., or other network elements and/or various combinations of network elements) communicates with a transport gateway and/or a Radio Access Network (RAN) gateway to collect the network generated/based service usage information for the one or more devices on the wireless network. In some embodiments, the service controller 122 communicates the device assisted service usage information (e.g., micro-CDRs) to the CDR storage, aggregation, mediation, feed 118 (e.g., or other network elements and/or various combinations of network elements).

In some embodiments, the CDR storage, aggregation, mediation, feed 118 (and/or other network elements or combinations of network elements) performs rules for performing a bill by account aggregation and mediation function. In some embodiments, the CDR storage, aggregation, mediation, feed 118 (and/or other network elements or combinations of network elements) performs rules for performing a service billing function, as described herein, and/or for performing a service/transactional revenue sharing function, as described herein. In some embodiments, the service controller 122 in communication with the CDR storage, aggregation, mediation, feed 118 (and/or other network elements or combinations of network elements) performs a rules engine for aggregating and mediating the device assisted service usage information (e.g., micro-CDRs). In some embodiments, a rules engine device in communication with the CDR storage, aggregation, mediation, feed 118 (and/or other network elements or combinations of network elements) performs a rules engine for aggregating and mediating the device assisted service usage information.

In some embodiments, the rules engine is included in (e.g., integrated with/part of) the CDR storage, aggregation, mediation, feed 118. In some embodiments, the rules engine and associated functions, as described herein, is a separate function/device. In some embodiments, the service controller 122 performs some or all of these rules engine based functions, as described herein, and communicates with the central billing interface 127. In some embodiments, the service controller 122 performs some or all of these rules engine based functions, as described herein, and communicates with the central billing system 123.

In some embodiments, a settlement platform service is provided. For example, micro-CDRs can be aggregated and mediated to associate service usage for one or more services used by a communications device (e.g., a user of the communications device). A rules engine or another function can determine a revenue share allocation for the service usage for a particular service to determine the settlement for such service usage for the revenue sharing allocation/model and to distribute accounting and settlement information to one or more of carriers, distribution partners, MVNOs, wholesale partners, and/or other partners or entities. In some embodiments, the service is a transactional service.

In some embodiments, duplicate CDRs are sent from the network equipment to the billing system 123 that is used for generating service billing. In some embodiments, duplicate CDRs are filtered to send only those CDRs/records for devices controlled by the service controller and/or service processor (e.g., managed devices). For example, this approach can provide for the same level of reporting, lower level of reporting, and/or higher level of reporting as compared to the reporting required by the central billing system 123.

In some embodiments, a bill-by-account billing offset is provided. For example, bill-by-account billing offset information can be informed to the central billing system 123 by providing a CDR aggregator feed that aggregates the device assisted service usage data feed to provide a new set of CDRs for the managed devices to the central billing interface 127 and/or the central billing system 123. In some embodiments, transaction billing is provided using similar techniques. For example, transaction billing log information can be provided to the central billing interface 127 and/or the central billing system 123.

In some embodiments, the rules engine (e.g., performed by the service usage 118 or another network element, as described herein) provides a bill-by-account billing offset. For example, device assisted service usage information (e.g., micro-CDRs) includes a transaction type field or transaction code (e.g., indicating a type of service for the associated service usage information). For example, the rules engine can apply a rule or a set of rules based on the identified service associated with the device generated service usage information to determine a bill-by-account billing offset (e.g., a new CDR can be generated to provide the determined bill-by-account billing offset). In some examples, the determined bill-by-account billing offset can be provided as a credit to the user's service usage account (e.g., a new CDR can be generated with a negative offset for the user's service usage account, such as for network chatter service usage, or transactional service usage, or for any other purposes based on one or more rules performed by the rules engine).

As another example, for a transactional service, a first new CDR can be generated with a negative offset for the user's service usage account for that transactional service related usage, and a second new CDR can be generated with a positive service usage value to charge that same service usage to the transactional service provider (e.g., Amazon, eBay, or another transactional service provider). In some embodiments, the service controller 122 generates these two new CDRs, and the service usage 118 stores, aggregates, and communicates these two new CDRs to the central billing interface 127. In some embodiments, the service controller 122 generates these two new CDRs, and the service usage 118 stores, aggregates, and communicates these two new CDRs to the central billing interface 127, in which the central billing interface 127 applies rules (e.g., performs the rules engine for determining the bill-by-account billing offset).

In some embodiments, the service controller 122 sends the device generated CDRs to the rules engine (e.g., a service usage data store and rules engine, such as CDR storage, aggregation, mediation, feed 118), and the rules engine applies one or more rules, such as those described herein and/or any other billing/service usage related rules as would be apparent to one of ordinary skill in the art. In some embodiments, the service controller 122 generates CDRs similar to other network elements, and the rules (e.g., bill-by-account) are performed in the central billing interface 127. For example, for the service controller 122 to generate CDRs similar to other network elements, in some embodiments, the service controller 122 is provisioned on the wireless network (e.g., by network provision system 160) and behaves substantially similar to other CDR generators on the network).

In some embodiments, the service controller 122 is provisioned as a new type of networking function that is recognized as a valid, authorized, and secure source for CDRs by the other necessary elements in the network (e.g., CDR storage, aggregation, mediation, feed 118). In some embodiments, if the necessary network apparatus only recognize CDRs from certain types of networking equipment (e.g. a RAN gateway or transport gateway), then the service controller 122 provides authentication credentials to the other networking equipment that indicate that it is one of the approved types of equipment for providing CDRs. In some embodiments, the link between the service controller 122 and the necessary CDR aggregation and mediation equipment is secured, authenticated, encrypted, and/or signed.

In some embodiments, the CDR storage, aggregation, mediation, feed 118 discards the network based service usage information (e.g., network based CDRs) received from one or more network elements. In these embodiments, the service controller 122 provides the device assisted service usage information (e.g., device based CDRs or micro-CDRs) to the CDR storage, aggregation, mediation, feed 118 (e.g., the CDR storage, aggregation, mediation, feed 118 can just provide a store, aggregate, and communication function(s), as it is not required to mediate network based CDRs and device assisted CDRs), and the device based service usage information is provided to the central billing interface 127 or the central billing system 123.

In some embodiments, the device based CDRs (e.g., micro-CDRs) and/or new CDRs generated based on execution of a rules engine as described herein are provided only for devices that are managed and/or based on device group, service plan, or any other criteria, categorization, and/or grouping, such as based on ambient service or ambient service provider or transactional service or transactional service provider.

In some embodiments, QoS for DAS includes a service processor (e.g., any device assisted element/function) that facilitates coordination for and/or provisions wireless access/radio access bearers (e.g., RABs). In some embodiments, the service processor determines whether a request for QoS is authorized (e.g., according to QoS service level, user standing, available local network capacity (e.g., as reported by other device(s) and/or network)). In some embodiments, device QoS capacity demand reports provide and/or augment network capacity demand reports.

In some embodiments, QoS for DAS includes a service controller (e.g., any network device based service control element/function) that facilitates coordination for and/or provisions wireless access/radio access bearers (e.g., RABs) on a device (e.g., a communications device, such as a mobile wireless communications device and/or an intermediate networking device), on network, and/or on device plus network. In some embodiments, the service controller provides device QoS capacity demand reports to other network equipment/elements/functions, and then also provisions the RAB channel based on various criteria and determinations.

In some embodiments, QoS for DAS provides for device assisted monitoring, information, and/or functionality to facilitate QoS without and/or to assist network based monitoring, information, and/or functionality (e.g., Deep Packet Inspection (DPI) and/or provides such monitoring, information, and/or functionality that may not be available via network based monitoring, information, and/or functionality (e.g., encrypted activities on the device may not be accessible by DPI or other network based techniques). For example, QoS for DAS can assist in the QoS setup to facilitate the QoS setup and provide such information that may not otherwise be available using network based only techniques. For example, device assisted activity and/or service monitoring techniques can assist in classifying the QoS for the monitored activity and/or service using, for example, a QoS activity map (e.g., as described herein or other similar techniques). For example, using such device assisted techniques eliminates and/or minimizes DPI or other network based techniques that can give rise to privacy concerns/issues, network neutrality concerns/issues, and/or otherwise may not be able to provide similar or equivalent granular service/activity monitoring, as discussed above, and/or also off loads such processing from the network (e.g., network elements/devices/functionality) to the communications devices (e.g., at least for such communications devices that can perform such functions, based on their processing and/or memory capabilities, as would be apparent to one of ordinary skill in the art). In some embodiments, QoS for DAS includes the service provider for providing an initial authorization/clearance for a QoS request (e.g., using various techniques described herein), and the service controller determines if the QoS request should be authorized (e.g., based on various QoS authorization/clearance/approval criteria (e.g., QoS activity maps and/or QoS request rule) and/or network capacity, as described herein). In some embodiments, QoS for DAS includes the service provider for providing a QoS request including a QoS class to the service controller, and the service controller determines if the QoS request should be authorized, as described herein.

In some embodiments, QoS for DAS includes providing or facilitating reports for base station (BTS) for network capacity (e.g., sector, channel, busy state information or network capacity usage/availability, and/or network capacity expected demand) based on, for example, one or more of the following: monitored application usage on the communications device, monitored user activity on the communications device, location of the communications, other available networks, and/or other monitored or determined activity, service usage measure, and/or metric. In some embodiments, at or after execution of an application that is determined to require network service usage (e.g., may require increased wireless network bandwidth, such as based on a service usage activity map), QoS for DAS sends information to the network (e.g., a network controller or other network device element/function) that capacity demand is forthcoming for the communications device (e.g., potentially initiating a provisioning of a QoS radio access bearer (RAB) or other type of RAB).

In some embodiments, network capacity (e.g., busy state information) is collected from one or more communications devices in communication with a wireless network (e.g., network capacity/usage information measured from each respective communications device's perspective is determined and stored by the service processor on each respective communications device) and reported to the service controller, and the service controller (e.g., or another network element/function) uses this information to determine what resources are available for allocation to various levels of QoS (e.g., to respond to/facilitate various QoS requests) and/or to workload balance across multiple base stations and/or networks (e.g., cellular, Wi-Fi, and/or other wireless networks).

In some embodiments, the service processor executed on the communications device sends a QoS request (e.g., a wireless network bearer channel reservation request or Radio Access Bearer (RAB) request) to the service controller. The service controller verifies the request using various verification techniques as described herein. In some embodiments, the service controller facilitates coordination of various device QoS requests with one or more base stations (BTSs) in communication with the communications device to provide for the requested QoS reservation to facilitate the new QoS session. In some embodiments, the service controller provides a QoS routing function by, for example, providing various QoS routing instructions to a device service processor (e.g., aggregating, prioritizing, queuing, authorizing, allocating reservations/RABs, denying, re-routing (such as to other BTSs and/or other networks) and/or otherwise managing QoS requests), in which the BTS may or may not be QoS aware. For example, QoS priority can be based on activity (e.g., service usage and/or application), service level, user standing, network capacity, time of day, and/or QoS priority can be purchased on a transaction basis, a session basis, a pre-pay basis or a plan basis. As another example, QoS priority can also vary by device type, user within a group, group, application type, content type, or any other criteria or measure and/or any combination thereof. In some embodiments, the service controller also facilitates coordination of various device QoS requests with other network elements/functions for QoS implementation and management to provide for an end to end QoS solution.

In some embodiments, QoS can be symmetric for two mobile devices or asymmetric. In some embodiments, QoS resource availability can be from communications devices, BTS(s), other network functions (e.g., service control, service controller and/or any other network elements/functions) or any combination thereof. In some embodiments, the service controller provides QoS demand information to another network element/function. In some embodiments, the service controller provides the central aggregator and policy decision point (PDP). In some embodiments, the service controller controls (e.g., at least in part) QoS related functions for communications devices, BTS(s), and/or a combination of both.

In some embodiments, charging (e.g., monitoring and/or determining associating charging or billing) for QoS service usage/transactions is determined using various techniques described herein. For example, the service processor can assist in charging for QoS activities. In some embodiments, the service processor uses device assisted Charging Data Records (CDRs) or micro-CDRs to assist in charging for QoS activities (e.g., using QoS class related transaction codes), as described herein with respect to various embodiments. In some embodiments, charging for QoS is performed in whole or in part by one or more network elements/functions (e.g., service controller, SGSN/GGSN/other gateways, and/or billing interfaces/servers).

In some embodiments, service usage information includes network based service usage information. In some embodiments, the network based service usage information includes network based CDRs. In some embodiments, service usage information includes device based service usage information. In some embodiments, device based service usage information includes device assisted CDRs, also referred to herein as micro-CDRs, as described herein. In some embodiments, micro-CDRs are used for CDR mediation or reconciliation that provides for service usage accounting on any device activity that is desired (e.g., providing granular service usage information, such as based on application layer service usage monitoring, transaction service usage monitoring, QoS activities/sessions/transactions, and/or other types of service usage information). In some embodiments, each device includes a service processor (e.g., a service processor executed on a processor of a communications device, such as a mobile device or an intermediate networking device that can communicate with a wireless network).

In some embodiments, each device activity that is desired to be associated with a billing event (e.g., for a QoS related billing event) is assigned a micro-CDR transaction code, and the service processor is programmed to account for that activity associated with that transaction code (e.g., various transaction codes can be associated with service usage associated with certain services, applications, and/or based on QoS classes or priorities, respectively, which can be used for providing granular service usage for these various Internet/network based services/sites/transactions and/or any other Internet/network based services/sites, which can include transactional based services). For example, using these techniques, as described herein, essentially any type of device activity (e.g., including QoS classes and prioritization) can be individually accounted for and/or controlled (e.g., throttled, restricted, and/or otherwise controlled as desired). In some embodiments, the service processor periodically reports (e.g., during each heartbeat or based on any other periodic, push, and/or pull communication technique(s)) micro-CDR usage measures to, for example, a service controller or some other network element/function. In some embodiments, the service controller reformats the heartbeat micro-CDR usage information into a valid CDR format (e.g., a CDR format that is used and can be processed by an SGSN or GGSN or some other authorized network element/function for CDRs) and then transmits the reformatted micro-CDRs to a network element/function for performing CDR mediation.

In some embodiments, CDR mediation is used to properly account for the micro-CDR service usage information by depositing it into an appropriate service usage account and deducting it from the user device bulk service usage account. For example, this technique provides for a flexible service usage billing solution that uses pre-existing solutions for CDR mediation and billing. For example, the billing system can process the mediated CDR feed from CDR mediation, apply the appropriate account billing codes to the aggregated micro-CDR information that was generated by the device, and then generate billing events in a manner that does not require changes to existing billing systems, infrastructures, and techniques (e.g., using new transaction codes to label the new device assisted billing capabilities).

In some embodiments, the various QoS techniques performed on or by the communications device (e.g., using a service processor to provide or assist in providing QoS session provisioning, QoS policy management, QoS policy enforcement, and/or QoS charging, such as QoS charging records and reports) are verified.

For example, a QoS request, QoS related policy rules (e.g., QoS activity map, QoS related service plan and/or service policy settings) and implementation, QoS policy enforcement, and QoS charging are verified (e.g., periodically, per transaction, and/or based on some other criteria/metric). In some embodiments, verification techniques include one or more of the following: compare a network based service usage measure with a first service policy associated with the communications device, compare a device assisted service usage measure with the first service policy, compare the network based service usage measure to the device assisted service usage measure, perform a test and confirm a device assisted service usage measure based on the test, perform a User Interface (UI) notification (e.g., which can include a user authentication, password, question/answer challenge, and/or other authentication technique) and other similar verification techniques as will now be apparent. Accordingly, in some embodiments, QoS for DAS "closes the loop" for verification of various QoS related techniques, such as QoS requests, QoS grants, QoS usage, and/or QoS charging. In some embodiments, the service processor and the service controller serve as a verifiable QoS management/coordination system for other QoS elements/functions in network. In some embodiments, if such or other verification techniques determine or assist in determining that a QoS request, QoS report, and/or QoS policy behavior does not match expected requests, reports, and/or policy, then responsive actions can be performed, for example, the communications device can be suspended, quarantined and/or flagged for further analysis/scrutiny to determine whether the device is malfunctioning, needs updating, has been tampered with or compromised, is infected with malware, and/or if any other problem exists.

In some embodiments, the communications device (e.g., the service processor) maintains a QoS flow table that associates or maps device activity to QoS level/class to RAB/QoS channel, and, in some embodiments, the communications device also informs a QoS management network function/element of the relative priority of the QoS flows for the communications device (e.g., based on or using the QoS flow table). In some embodiments, the service controller receives or collects information from the communications device and maintains such a QoS flow table for the communications device and in some embodiments, the service controller also informs a QoS management network function/element of the relative priority of the QoS flows for the communications device (e.g., based on or using the QoS flow table). In some embodiments, flows can be assigned to activities originating at the communications device in a transparent way, or simply by activity class or user preference, or using other techniques.

In some embodiments, the communications device maintains a table of QoS billing rates, scheduled transmission times, and/or other QoS related information to implement an overlay MAC at the data networking level to manage QoS on legacy networks that are not QoS MAC enabled and/or do not have the various functionality to support QoS controls (e.g., and such techniques can also be used to provide for QoS functionality across different networks). In some embodiments, QoS related policies are exchanged between roaming and home service controllers to facilitate QoS support while roaming on a non-home network(s).

In some embodiments, the communications device serves as a network capacity indicator (e.g., collecting network capacity information for a local cell and communicating or reporting that network capacity information to the service controller). For example, permanent local cell communications devices can be placed in local cell areas to augment legacy equipment for such network capacity indicator/reporting functions.

In some embodiments, service partners and/or service providers can subsidize in whole or in part to upgrade a given user or group of users to better QoS related service level agreement (SLA)/class for a preferred destination. In some embodiments, based on monitored service usage and/or other monitored behavior of the communications device, such subsidized QoS upgrade/offers can be presented to a user of the communications device (e.g., as an incentive/reward for desired or preferred user behavior or for other reasons).

In some embodiments, QoS charging is based on QoS channel/reservation, service flow, or RAB charging (e.g., single flow per RAB, multi-flow per RAB, multi-RAB per flow). In some embodiments, charging is based on one or more of the following: user service class request, traffic volume and class, time and class, network capacity (e.g., network busy state) and class, time of day and class, location, traffic type, application type, application class, destination, destination type, partner service, and/or other criteria/measures. In some embodiments, QoS charging is verified using the various verification techniques described herein (e.g., test charging events). In some embodiments, QoS charging is by data usage (e.g., by Megabyte (MB)), service flow by time by QoS class, speed by time, and/or other criteria/measures.

In some embodiments, QoS for DAS includes coordinating functions with one or more of the following: DAS elements/functions, Radio Access Network (RAN), Transport network, Core network, GRX network, IPX network, and/or other networks/elements/functions.

Figure 2:
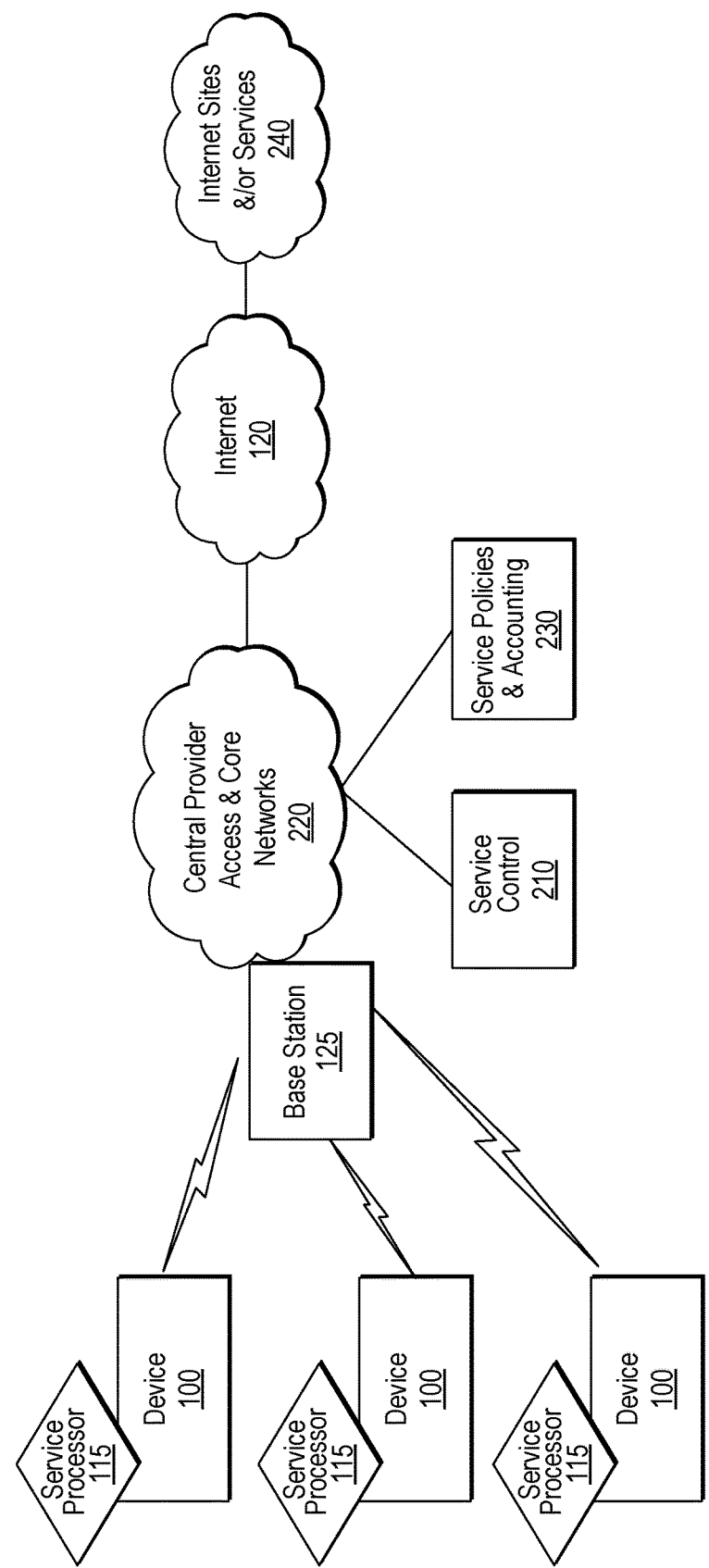
FIG. 2 illustrates another functional diagram of another network architecture for providing quality of service (QoS) for device assisted services (DAS) in accordance with some embodiments.

FIG. 2 illustrates another functional diagram of another network architecture for providing quality of service (QoS) for device assisted services (DAS) in accordance with some embodiments. In some embodiments, QoS for DAS techniques described herein are implemented using the network architecture shown in FIG. 2.

As shown, FIG. 2 includes various devices 100 including service processors 115. For example, devices 100 can include various types of mobile devices, such as phones, PDAs, computing devices, laptops, net books, tablets, cameras, music/media players, GPS devices, networked appliances, and any other networked device; and/or devices 100 can include various types of intermediate networking devices, as described herein. The devices 100 are in communication with service control 210 and central provider access and core networks 220. Service policies and accounting functions 230 are also provided in communication with the central provider access and core networks 220. For example, devices 100 can communicate via the central provider access and core networks 220 to the Internet 120 for access to various Internet sites/services 240 (e.g., Google sites/services, Yahoo sites/services, Blackberry services, Apple iTunes and AppStore, Amazon.com, FaceBook, and/or any other Internet service or other network facilitated service).

In some embodiments, FIG. 2 provides a wireless network architecture that supports partitioned device groups, in which each device group can be provided independent and secure management of transparent reconciliation. Those of ordinary skill in the art will appreciate that various other network architectures can be used for providing device group partitions and a settlement platform, and FIG. 2 is illustrative of just another such example network architecture for which device group partitions and settlement platform techniques described herein can be provided.

In some embodiments, a service provider selects who receives a reconciliation report of activations and usage by service plan type. In some embodiments, service usage information (e.g., based on CDRs and/or micro-CDRs or other service usage measures) are used for service plan billing and for reconciliation reports. In some embodiments, different service plans on the same device (e.g., device 100) can be sent to different partners or the same partner. In some embodiments, multi-device and multi-user reconciliation capabilities are provided. In some embodiments, a settlement platform service is provided. In some embodiments, various revenue share techniques as described herein are provided (e.g., implemented using a settlement platform service, using, for example, service policies and accounting functions 230).

In some embodiments, partitioned device groups are provided. In some embodiments, each partitioned group of devices (e.g., mobile devices 100) can be uniquely managed with secure admin log-ins. In some embodiments, multi-device, multi-user accounting is provided. In some embodiments, capabilities are provided to support multi-party/multi-service reconciliation records to carriers and carrier partners, which can also support various service/transactional revenue share techniques (e.g., for reducing or eliminating the up-front subsidy and associated up-front subsidy risk of certain bounty models). In some embodiments, service usage and profitability analytics are provided (e.g., using aggregated CDRs/micro-CDRs and service policies and accounting functions 230). For example, a partitioned beta test group of devices can be tested and optimized for various service usage policies and/or service plans, and then the optimized service usage policies and/or service plans can be published to an entire or larger device group. In some embodiments, a carrier can be provided a carrier branded device group, and/or a MVNO can be provided a MVNO branded device group.

Figure 3:
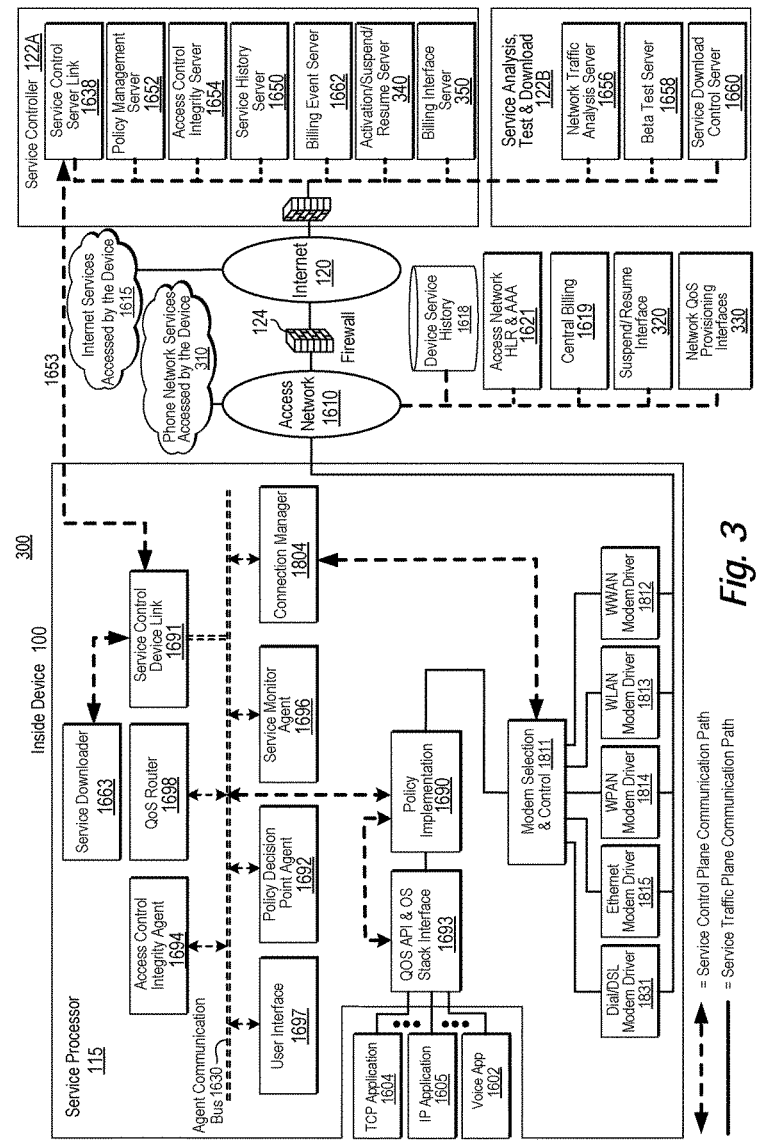
FIG. 3 illustrates a functional diagram of architecture for including a device based service processor and a service controller for providing quality of service (QoS) for device assisted services (DAS) in accordance with some embodiments.

FIG. 3 illustrates another functional diagram of a QoS for DAS architecture 300 including a device based service processor 115 and a service controller 122 for providing quality of service (QoS) for device assisted services (DAS) in accordance with some embodiments. In some embodiments, QoS for DAS techniques described herein are implemented using the functions/elements shown in FIG. 3.

For example, the architecture 300 provides a relatively full featured device based service processor implementation and service controller implementation. As shown, this corresponds to a networking configuration in which the service controller 122 is connected to the Internet 120 and not directly to the access network 1610. As shown, a data plane (e.g., service traffic plane) communication path is shown in solid line connections and control plane (e.g., service control plane) communication path is shown in dashed line connections. As will be apparent, the division in functionality between one device agent and another is based on, for example, design choices, networking environments, devices and/or services/applications, and various different combinations can be used in various different implementations. For example, the functional lines can be re-drawn in any way that the product designers see fit. As shown, this includes certain divisions and functional breakouts for device agents as an illustrative implementation, although other, potentially more complex, embodiments can include different divisions and functional breakouts for device agent functionality specifications, for example, in order to manage development specification and testing complexity and workflow. In addition, the placement of the agents that operate, interact with or monitor the data path can be moved or re-ordered in various embodiments. For example, the functional elements shown in FIG. 3 are described below with respect to FIGS. 10 and 11.

As shown in FIG. 3, service processor 115 includes a service control device link 1691. For example, as device based service control techniques involving supervision across a network become more sophisticated, it becomes increasingly important to have an efficient and flexible control plane communication link between the device agents and the network elements communicating with, controlling, monitoring, or verifying service policy. In some embodiments, the service control device link 1691 provides the device side of a system for transmission and reception of service agent to/from network element functions. In some embodiments, the traffic efficiency of this link is enhanced by buffering and framing multiple agent messages in the transmissions. In some embodiments, the traffic efficiency is further improved by controlling the transmission frequency or linking the transmission frequency to the rate of service usage or traffic usage. In some embodiments, one or more levels of security or encryption are used to make the link robust to discovery, eavesdropping or compromise. In some embodiments, the service control device link 1691 also provides the communications link and heartbeat timing for the agent heartbeat function. As discussed below, various embodiments disclosed herein for the service control device link 1691 provide an efficient and secure solution for transmitting and receiving service policy implementation, control, monitoring and verification information with other network elements.

As shown in FIG. 3, the service controller 122 includes a service control server link 1638. In some embodiments, device based service control techniques involving supervision across a network (e.g., on the control plane) are more sophisticated, and for such it is increasingly important to have an efficient and flexible control plane communication link between the device agents (e.g., of the service processor 115) and the network elements (e.g., of the service controller 122) communicating with, controlling, monitoring, or verifying service policy. For example, the communication link between the service control server link 1638 of service controller 122 and the service control device link 1691 of the service processor 115 can provide an efficient and flexible control plane communication link, a service control link 1653 as shown in FIG. 3, and, in some embodiments, this control plane communication link provides for a secure (e.g., encrypted) communications link for providing secure, bidirectional communications between the service processor 115 and the service controller 122. In some embodiments, the service control server link 1638 provides the network side of a system for transmission and reception of service agent to/from network element functions. In some embodiments, the traffic efficiency of this link is enhanced by buffering and framing multiple agent messages in the transmissions (e.g., thereby reducing network chatter). In some embodiments, the traffic efficiency is further improved by controlling the transmission frequency and/or linking the transmission frequency to the rate of service usage or traffic usage. In some embodiments, one or more levels of security and/or encryption are used to secure the link against potential discovery, eavesdropping or compromise of communications on the link. In some embodiments, the service control server link 1638 also provides the communications link and heartbeat timing for the agent heartbeat function.

In some embodiments, the service control server link 1638 provides for securing, signing, encrypting and/or otherwise protecting the communications before sending such communications over the service control link 1653. For example, the service control server link 1638 can send to the transport layer or directly to the link layer for transmission. In another example, the service control server link 1638 further secures the communications with transport layer encryption, such as TCP TLS or another secure transport layer protocol. As another example, the service control server link 1638 can encrypt at the link layer, such as using IPSEC, various possible VPN services, other forms of IP layer encryption and/or another link layer encryption technique.

As shown in FIG. 3, the service controller 122 includes an access control integrity server 1654 (e.g., service policy security server). In some embodiments, the access control integrity server 1654 collects device information on service policy, service usage, agent configuration, and/or agent behavior. For example, the access control integrity server 1654 can cross check this information to identify integrity breaches in the service policy implementation and control system. In another example, the access control integrity server 1654 can initiate action when a service policy violation or a system integrity breach is suspected.

In some embodiments, the access control integrity server 1654 (e.g., and/or some other agent of service controller 122) acts on access control integrity agent 1694 (e.g., service policy security agent) reports and error conditions. Many of the access control integrity agent 1654 checks can be accomplished by the server. For example, the access control integrity agent 1654 checks include one or more of the following: service usage measure against usage range consistent with policies (e.g., usage measure from the network and/or from the device); configuration of agents; operation of the agents; and/or dynamic agent download.

In some embodiments, the access control integrity server 1654 (e.g., and/or some other agent of service controller 122) verifies device service policy implementations by comparing various service usage measures (e.g., based on network monitored information, such as by using IPDRs or CDRs, and/or local service usage monitoring information) against expected service usage behavior given the policies that are intended to be in place. For example, device service policy implementations can include measuring total QoS data passed, QoS data passed in a period of time, IP addresses, data per IP address, and/or other measures such as location, downloads, email accessed, URLs, and comparing such measures expected service usage behavior given the policies that are intended to be in place.

In some embodiments, the access control integrity server 1654 (and/or some other agent of service controller 122) verifies device service policy, and the verification error conditions that can indicate a mismatch in QoS service measure and QoS service policy include one or more of the following: unauthorized network access (e.g., access beyond ambient service policy limits); unauthorized network speed (e.g., average speed beyond service policy limit); network data amount does not match QoS policy limit (e.g., device not stop at limit without re-up/revising service policy); unauthorized network address; unauthorized service usage (e.g., VOIP, email, and/or web browsing); unauthorized application usage (e.g., email, VOIP, email, and/or web); service usage rate too high for plan, and policy controller not controlling/throttling it down; and/or any other mismatch in service measure and service policy. Accordingly, in some embodiments, the access control integrity server 1654 (and/or some other agent of service controller 122) provides a policy/service control integrity service to continually (e.g., periodically and/or based on trigger events) verify that the service control of the device has not been compromised and/or is not behaving out of policy.

As shown in FIG. 3, service controller 122 includes a service history server 1650 (e.g., charging server). In some embodiments, the service history server 1650 collects and records service usage or service activity reports from the Access Network AAA Server 1621 and the Service Monitor Agent 1696. For example, although service usage history from the network elements can in certain embodiments be less detailed than service history from the device, the service history from the network can provide a valuable source for verification of device service policy implementation, because, for example, it is extremely difficult for a device error or compromise event on the device to compromise the network based equipment and software. For example, service history reports from the device can include various service tracking information, as similarly described above. In some embodiments, the service history server 1650 provides the service history on request to other servers and/or one or more agents. In some embodiments, the service history server 1650 provides the service usage history to the device service history 1618 (e.g., CDR feed and CDR mediation). In some embodiments, for purposes of facilitating the activation tracking service functions (described below), the service history server 1650 maintains a history of which networks the device has connected to. For example, this network activity summary can include a summary of the networks accessed, activity versus time per connection, and/or traffic versus time per connection. As another example, this activity summary can further be analyzed or reported to estimate the type of service plan associated with the traffic activity for the purpose of bill sharing reconciliation.

As shown in FIG. 3, service controller 122 includes a QoS policy management server 1652 (e.g., policy decision point (PDP) server). In some embodiments, the QoS policy management server 1652 transmits policies to the service processor 115 via the service control link 1653. In some embodiments, the policy management server 1652 manages policy settings on the device (e.g., various policy settings as described herein with respect to various embodiments) in accordance with a device service profile. In some embodiments, the policy management server 1652 sets instantaneous policies on policy implementation agents (e.g., policy implementation agent 1690). For example, the policy management server 1652 can issue policy settings, monitor service usage and, if necessary, modify policy settings. For example, in the case of a user who prefers for the network to manage their service usage costs, or in the case of any adaptive policy management needs, the policy management server 1652 can maintain a relatively high frequency of communication with the device to collect traffic and/or service measures and issue new policy settings. In this example, device monitored service measures and any user service policy preference changes are reported, periodically and/or based on various triggers/events/requests, to the policy management server 1652. In this example, user privacy settings generally require secure communication with the network (e.g., a secure service control link 1653), such as with the policy management server 1652, to ensure that various aspects of user privacy are properly maintained during such configuration requests/policy settings transmitted over the network. For example, information can be compartmentalized to service policy management and not communicated to other databases used for CRM for maintaining user privacy.

In some embodiments, the policy management server 1652 provides adaptive policy management on the device. For example, the policy management server 1652 can issue policy settings and objectives and rely on the device based policy management (e.g., service processor 115) for some or all of the policy adaptation. This approach can require less interaction with the device thereby reducing network chatter on the service control link 1653 for purposes of device policy management (e.g., network chatter is reduced relative to various server/network based policy management approaches described above). This approach can also provide robust user privacy embodiments by allowing the user to configure the device policy for user privacy preferences/settings so that, for example, sensitive information (e.g., geo-location data, website history) is not communicated to the network without the user's approval. In some embodiments, the policy management server 1652 adjusts service policy based on time of day. In some embodiments, the policy management server 1652 receives, requests or otherwise obtains a measure of network availability and adjusts traffic shaping policy and/or other policy settings based on available network capacity.

As shown in FIG. 3, service controller 122 includes a network traffic analysis server 1656. In some embodiments, the network traffic analysis server 1656 collects/receives service usage history for devices and/or groups of devices and analyzes the service usage. In some embodiments, the network traffic analysis server 1656 presents service usage statistics in various formats to identify improvements in network service quality and/or service profitability. In some embodiments, the network traffic analysis server 1656 estimates the service quality and/or service usage for the network under variable settings on potential service policies. In some embodiments, the network traffic analysis server 1656 identifies actual or potential service behaviors by one or more devices that are causing problems for overall network service quality or service cost.

As shown in FIG. 3, Service Analysis, & Test & Download 122B includes a beta test server 1658 (e.g., policy creation point and beta test server). In some embodiments, the beta test server 1658 publishes candidate service plan policy settings to one or more devices. In some embodiments, the beta test server 1658 provides summary reports of network service usage or user feedback information for one or more candidate service plan policy settings. In some embodiments, the beta test server 1658 provides a mechanism to compare the beta test results for different candidate service plan policy settings or select the optimum candidates for further policy settings optimization.

As shown in FIG. 3, service controller 122 includes a service download control server 1660 (e.g., a service software download control server). In some embodiments, the service download control server 1660 provides a download function to install and/or update service software elements (e.g., the service processor 115 and/or agents/components of the service processor 115) on the device, as described herein.

As shown in FIG. 3 service controller 122 includes a billing event server 1662 (e.g., micro-CDR server). In some embodiments, the billing event server 1662 collects billing events, provides service plan information to the service processor 115, provides service usage updates to the service processor 115, serves as interface between device and central billing server 1619, and/or provides trusted third party function for certain ecommerce billing transactions.

As shown in FIG. 3, the Access Network HLR AAA server 1621 is in network communication with the access network 1610. In some embodiments, the Access Network AAA server 1621 provides the necessary access network AAA services (e.g., access control and authorization functions for the device access layer) to allow the devices onto the central provider access network and the service provider network. In some embodiments, another layer of access control is required for the device to gain access to other networks, such as the Internet, a corporate network and/or a machine to machine network. This additional layer of access control can be implemented, for example, by the service processor 115 on the device. In some embodiments, the Access Network AAA server 1621 also provides the ability to suspend service for a device and resume service for a device based on communications received from the service controller 122. In some embodiments, the Access Network AAA server 1621 also provides the ability to direct routing for device traffic to a quarantine network or to restrict or limit network access when a device quarantine condition is invoked. In some embodiments, the Access Network AAA server 1621 also records and reports device network service usage (e.g., device network service usage can be reported to the device service history 1618).

As shown in FIG. 3, the device service history 1618 is in network communication with the access network 1610. In some embodiments, the device service history 1618 provides service usage data records used for various purposes in various embodiments. In some embodiments, the device service history 1618 is used to assist in verifying service policy implementation. In some embodiments, the device service history 1618 is used to verify service monitoring. In some embodiments, the device service history 1618 is used to verify billing records and/or billing policy implementation. In some embodiments, the device service history 1618 is used to synchronize and/or verify the local service usage counter.

As shown in FIG. 3, the central billing 1619 (e.g., central provider billing server) is in network communication with the access network 1610. In some embodiments, the central provider billing server 1619 provides a mediation function for central provider billing events. For example, the central provider billing server 1619 can accept service plan changes. In some embodiments, the central provider billing server 1619 provides updates on device service usage, service plan limits and/or service policies. In some embodiments, the central provider billing server 1619 collects billing events, formulates bills, bills service users, provides certain billing event data and service plan information to the service controller 122 and/or device 100.

As shown in FIG. 3, in some embodiments, modem selection and control 1811 (e.g., in communication with connection manager 1804 as shown) selects the access network connection and is in communication with the modem firewall 1655, and modem drivers 1831, 1815, 1814, 1813, 1812 convert data traffic into modem bus traffic for one or more modems and are in communication with the modem selection and control 1811. In some embodiments, different profiles are selected based on the selected network connection (e.g., different service profiles/policies for WWAN, WLAN, WPAN, Ethernet and/or DSL network connections), which is also referred to herein as multimode profile setting. For example, service profile settings can be based on the actual access network (e.g., home DSL/cable or work network) behind the Wi-Fi not the fact that it is Wi-Fi (e.g., or any other network, such as DSL/cable, satellite, or T-1), which is viewed as different than accessing a Wi-Fi network at the coffee shop. For example, in a Wi-Fi hotspot situation in which there are a significant number of users on a DSL or T-1 backhaul, the service controller can sit in a service provider cloud or an MVNO cloud, the service controls can be provided by a VSP capability offered by the service provider or the service controller can be owned by the hotspot service provider that uses the service controller on their own without any association with an access network service provider. For example, the service processors can be controlled by the service controller to divide up the available bandwidth at the hotspot according to QoS or user sharing rules (e.g., with some users having higher differentiated priority (e.g., potentially for higher service payments) than other users). As another example, ambient services (e.g., as similarly described herein) can be provided for the hotspot for verified service processors.

In some embodiments, the service processor 115 and service controller 122 are capable of assigning multiple service profiles associated with multiple service plans that the user chooses individually or in combination as a package. For example, a device 100 starts with ambient services that include free transaction services wherein the user pays for transactions or events rather than the basic service (e.g., a news service, eReader, PND service, pay as you go session Internet) in which each service is supported with a bill by account capability to correctly account for any subsidized partner billing to provide the transaction services (e.g., Barnes and Noble may pay for the eReader service and offer a revenue share to the service provider for any book or magazine transactions purchased from the device 100). In some embodiments, the bill by account service can also track the transactions and, in some embodiments, advertisements for the purpose of revenue sharing, all using the service monitoring capabilities disclosed herein. After initiating services with the free ambient service discussed above, the user may later choose a post-pay monthly Internet, email and SMS service. In this case, the service controller 122 would obtain from the billing system 123 in the case of network based billing (e.g., or the service controller 122 billing event server 1622 in the case of device based billing) the billing plan code for the new Internet, email and SMS service. In some embodiments, this code is cross referenced in a database (e.g., the policy management server 1652) to find the appropriate service profile for the new service in combination with the initial ambient service. The new superset service profile is then applied so that the user maintains free access to the ambient services, and the billing partners continue to subsidize those services, the user also gets access to Internet services and may choose the service control profile (e.g., from one of the embodiments disclosed herein). The superset profile is the profile that provides the combined capabilities of two or more service profiles when the profiles are applied to the same device 100 service processor. In some embodiments, the device 100 (service processor 115) can determine the superset profile rather than the service controller 122 when more than one "stackable" service is selected by the user or otherwise applied to the device. The flexibility of the service processor 115 and service controller 122 embodiments described herein allow for a large variety of service profiles to be defined and applied individually or as a superset to achieve the desired device 100 service features.

As shown in FIG. 3, an agent communication bus 1630 represents a functional description for providing communication for the various service processor 115 agents and functions. In some embodiments, as represented in the functional diagram illustrated in FIG. 3, the architecture of the bus is generally multipoint to multipoint so that any agent can communicate with any other agent, the service controller or in some cases other components of the device, such user interface 1697 and/or modem components. As described below, the architecture can also be point to point for certain agents or communication transactions, or point to multipoint within the agent framework so that all agent communication can be concentrated, or secured, or controlled, or restricted, or logged or reported. In some embodiments, the agent communication bus is secured, signed, encrypted, hidden, partitioned, and/or otherwise protected from unauthorized monitoring or usage. In some embodiments, an application interface agent (not shown) is used to literally tag or virtually tag application layer traffic so that the policy implementation agent(s) 1690 has the necessary information to implement selected traffic shaping solutions. In some embodiments, an application interface agent (not shown) is in communication with various applications, including a TCP application 1604, an IP application 1605, and a voice application 1602.

As shown in FIG. 3, service processor 115 includes a QoS API and OS stack interface 1693. In some embodiments, QoS API and OS stack interface 1693 provides the QoS API functionality as similarly described herein with respect to various embodiments. In some embodiments, the QoS API is used to report back QOS availability to applications. As shown, service processor 115 also includes a QoS router 1698 (e.g., a QoS router agent/function) and a policy decision point (PDP) agent 1692. In some embodiments, QoS router 1698 provides the QoS router functionality as similarly described herein with respect to various embodiments. In some embodiments, the QoS router supports multiple QoS channels (e.g., one or more provisioned/allocated QoS links forming a QoS channel between the device and the desired end point, such as an access point/BTS/gateway/network for a single ended QoS channel or other communication device for an end to end QoS channel, depending on the QoS connection/network support/availability/etc.). In some embodiments, the QoS router supports multiple QoS channels, which can each have different QoS classes/levels. In some embodiments, the QoS router routes application/service usage traffic to an appropriate QoS channel. In some embodiments, the QoS router determines the routing/mapping based on, for example, one or more of the following: a QoS API request, a QoS activity map, a user request, a service plan, a service profile, service policy settings, network capacity, service controller or other intermediate QoS network element/function/device, and/or any other criteria/measure, as similarly described herein with respect to various embodiments. In some embodiments, multiple different applications/services are routed to a particular QoS channel using various techniques described herein. In some embodiments, different applications/services are routed to different QoS channels using various techniques described herein. In some embodiments, the QoS router assists in managing and/or optimizing QoS usage for the communications device. In some embodiments, the QoS router assists in managing and/or optimizing QoS usage across multiple communications devices (e.g., based on network capacity for a given cell area/base station or other access point). In some embodiments, PDP agent 1692 provides the PDP agent functionality as similarly described herein with respect to various embodiments. As shown, QoS for DAS architecture 300 also includes a suspend resume interface 320, network QoS provisioning interfaces 330; and an activation/suspend resume server 340 and billing interface server 350 in the service controller 122A; and a suspend/resume interface 320 and network QoS provisioning interfaces 330 for providing the various QoS techniques described herein.

In some embodiments, device assisted services (DAS) techniques for providing an activity map for classifying or categorizing service usage activities to associate various monitored activities (e.g., by URL, by network domain, by website, by network traffic type, by application or application type, and/or any other service usage activity categorization/classification) with associated IP addresses are provided. In some embodiments, a policy control agent (not shown), service monitor agent 1696 (e.g., charging agent), or another agent or function (or combinations thereof) of the service processor 115 provides a DAS activity map. In some embodiments, a policy control agent (not shown), service monitor agent, or another agent or function (or combinations thereof) of the service processor provides an activity map for classifying or categorizing service usage activities to associate various monitored activities (e.g., by Uniform Resource Locator (URL), by network domain, by website, by network traffic type, by application or application type, and/or any other service usage activity classification/categorization) with associated IP addresses. In some embodiments, a policy control agent, service monitor agent, or another agent or function (or combinations thereof) of the service processor determines the associated IP addresses for monitored service usage activities using various techniques to snoop the DNS request(s) (e.g., by performing such snooping techniques on the device 100 the associated IP addresses can be determined without the need for a network request for a reverse DNS lookup). In some embodiments, a policy control agent, service monitor agent, or another agent or function (or combinations thereof) of the service processor records and reports IP addresses or includes a DNS lookup function to report IP addresses or IP addresses and associated URLs for monitored service usage activities. For example, a policy control agent, service monitor agent, or another agent or function (or combinations thereof) of the service processor can determine the associated IP addresses for monitored service usage activities using various techniques to perform a DNS lookup function (e.g., using a local DNS cache on the monitored device 100). In some embodiments, one or more of these techniques are used to dynamically build and maintain a DAS activity map that maps, for example, URLs to IP addresses, applications to IP addresses, content types to IP addresses, and/or any other categorization/classification to IP addresses as applicable. In some embodiments, the DAS activity map is used for various DAS traffic control and/or throttling techniques as described herein with respect to various embodiments. In some embodiments, the DAS activity map is used to provide the user various UI related information and notification techniques related to service usage as described herein with respect to various embodiments. In some embodiments, the DAS activity map is used to provide service usage monitoring, prediction/estimation of future service usage, service usage billing (e.g., bill by account and/or any other service usage/billing categorization techniques), DAS techniques for ambient services usage monitoring, DAS techniques for generating micro-CDRs, and/or any of the various other DAS related techniques as described herein with respect to various embodiments.

In some embodiments, all or a portion of the service processor 115 functions disclosed herein are implemented in software. In some embodiments, all or a portion of the service processor 115 functions are implemented in hardware. In some embodiments, all or substantially all of the service processor 115 functionality (e.g., as discussed herein) is implemented and stored in software that can be performed on (e.g., executed by) various components in device 100. In some embodiments, it is advantageous to store or implement certain portions or all of service processor 115 in protected or secure memory so that other undesired programs (e.g., and/or unauthorized users) have difficulty accessing the functions or software in service processor 115. In some embodiments, service processor 115, at least in part, is implemented in and/or stored on secure non-volatile memory (e.g., non volatile memory can be secure non-volatile memory) that is not accessible without pass keys and/or other security mechanisms. In some embodiments, the ability to load at least a portion of service processor 115 software into protected non-volatile memory also requires a secure key and/or signature and/or requires that the service processor 115 software components being loaded into non-volatile memory are also securely encrypted and appropriately signed by an authority that is trusted by a secure software downloader function, such as service downloader 1663 as shown in FIG. 3. In some embodiments, a secure software download embodiment also uses a secure non-volatile memory. Those of ordinary skill in the art will also appreciate that all memory can be on-chip, off-chip, on-board, and/or off-board.

Figure 4A:
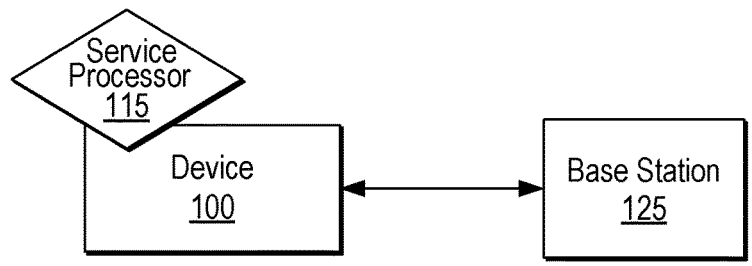
FIGS. 4A through 4C illustrate a functional diagram for providing quality of service (QoS) for device assisted services (DAS) in accordance with some embodiments.
Figure 4B:
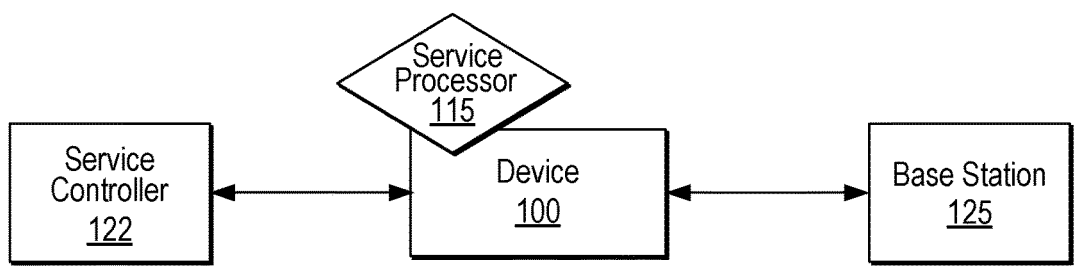
Figure 4C:
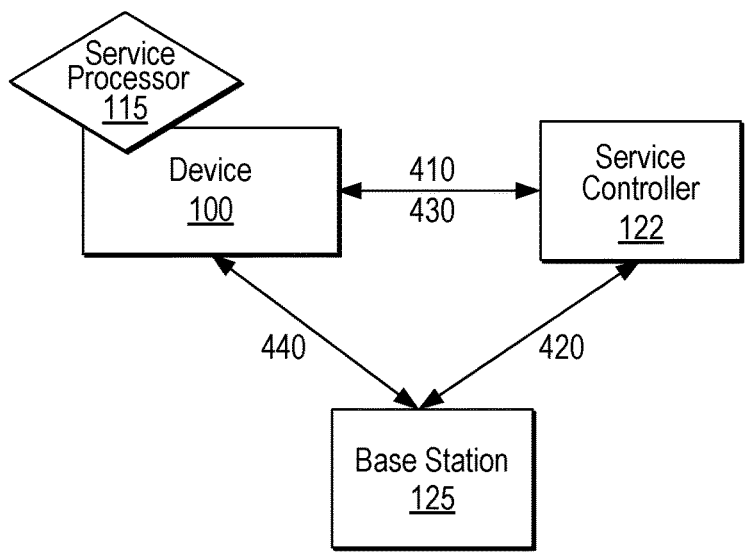

FIGS. 4A through 4C illustrate a functional diagram for providing quality of service (QoS) for device assisted services (DAS) in accordance with some embodiments. In some embodiments, QoS for DAS techniques described herein are implemented using the network architecture shown in FIGS. 4A through 4C.

Referring to FIG. 4A, in some embodiments, QoS functionality is performed at the communications device 100 using service processor 115 as similarly described herein. For example, the service processor 115 determines whether or not a QoS request is authorized (e.g., based on the associated service plan and/or other criteria/measures). If the QoS request is authorized, then the service processor 115 communicates with the base station (BTS) 125 to send the QoS request (e.g., a RAB or multi-RAB reservation request) to the local BTS. The BTS determines whether to accept or deny the QoS request (e.g., based on network capacity, such as using a first come first service QoS/network bandwidth or best effort access policy or other techniques, and/or other criteria/measures). The BTS responds to the QoS request accordingly. If the QoS request is granted, the QoS session can be initiated as similarly described herein. In some embodiments, the service processor 115 also performs various QoS charging functions using various techniques described herein, and the service processor 115 periodically sends QoS charging records or reports to the service controller 122. In some embodiments, the service processor 115 and the QoS related functions performed by the service processor 115 are periodically verified using the various techniques described herein.

Referring to FIG. 4B, FIG. 4B is similar to FIG. 4A except that the service controller 122 is also shown to be in communication with the service processor 115 of the communications device 100, which can provide for the download and periodically updating of the QoS rules and/or other service plan/profile/policy information that can include QoS related information. In some embodiments, the service processor 115 also performs various QoS charging functions using various techniques described herein, and the service processor 115 periodically sends QoS charging records or reports to the service controller 122. In some embodiments, the service processor 115 and the QoS related functions performed by the service processor 115 are periodically verified using the various techniques described herein.

Referring to FIG. 4C, at 410, the service processor 115 sends a QoS request to the service controller 122 (e.g., the service processor can also (at least in part) determine whether the QoS request is authorized as similarly described with respect to FIG. 4A). At 420, the service controller 122 sends the QoS request to the BTS 125 if it is determined that the QoS request is authorized using various techniques described herein and/or whether the BTS 125 has network capacity for the QoS request. For example, the service controller can provide a central policy decision point function for QoS related activities (e.g., based on QoS prioritization, network capacity, and/or other criteria/measures/policies). At 430, the service controller 122 communicates the response to the QoS request accordingly. At 440, if the QoS request was approved, the device 100 initiates the QoS session (e.g., using a RAB or multi-RAB reservation) via the BTS 125. In some embodiments, the service processor 115 also performs various QoS charging functions using various techniques described herein, and the service processor 115 periodically sends QoS charging records or reports to the service controller 122. In some embodiments, the service processor 115 and the QoS related functions performed by the service processor 115 are periodically verified using the various techniques described herein.

In some embodiments, QoS techniques as described herein are implemented in the device (e.g., using the service processor 115) and one or more other network elements/functions, such as the BTS 125, service controller 125, RAN, SGSN/GGSN/other gateways and/or other network elements/functions, in which various of the QoS related functions can be distributed or allocated to such network elements/functions based on various design/network architecture approaches as will now be apparent to one of ordinary skill in the art, in which QoS related activities and/or functions at the device 100 are verified using various verification techniques described herein.

In some embodiments, the device determines QoS availability by directly querying QoS link reservation equipment in the network (e.g., an access point, such as the BTS 125). In some embodiments, the device determines QoS availability based on an intermediate network function that coordinates QoS requests with one or more network QoS link resources. In some embodiments, the device requests a QoS reservation in advance of QoS link establishment with one or more QoS network link resources. In some embodiments, in response to a QoS request, a QoS channel is reported as available only if/after it is determined that the necessary one or more QoS links required to create the QoS channel are available, and, for example, the QoS channel can then be reserved based on a confirmation or automatically be reserved in response to the QoS request.

Figure 5:
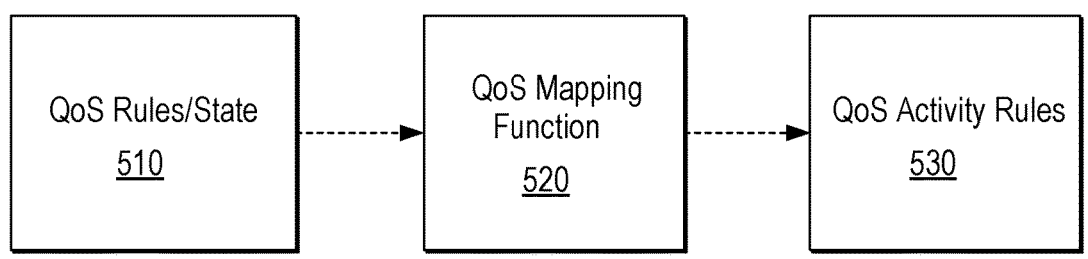
FIG. 5 illustrates a functional diagram for generating a QoS activity map for quality of service (QoS) for device assisted services (DAS) in accordance with some embodiments.

FIG. 5 illustrates a functional diagram for generating a QoS activity map for quality of service (QoS) for device assisted services (DAS) in accordance with some embodiments. In particular, FIG. 5 illustrates techniques for mapping a service plan or a set of service plan policies/rules for QoS 510 to a set of QoS activity rules 530. As shown, a set of QoS rules/QoS related device state information 510 (e.g., a set of associated service plan, service plan usage, other state such as network capacity or forecasted demand or time of day/day of week, activity usage, QoS level, and/or user preferences) is mapped using a QoS mapping function to a set of QoS activity rules 530 using various techniques described herein. At 530, activity rules (e.g., activity policy rules instructions) 530 are determined using the mapping function 520.

In some embodiments, the service plan includes a list of activity policies, and each activity policy in the service plan specifies how the activity policy is modified by rules state information. In some embodiments, each activity policy then becomes the instruction for the engine (e.g., QoS mapping function 520) that maps the activity policy to QoS activity rules 530. In some embodiments, service controller 122 downloads QoS mapping function 520, which is implemented by service processor 115.

In some embodiments, the service processor determines (e.g., and classifies) application/service usage activity demand with or without granular application/service usage activity (e.g., depending on various user/service plan/service provider/network/legal and/or other privacy restrictions and/or any other related requirements or settings). For example, policies (e.g., service policy settings and/or service profile settings) can be downloaded to provide such application/service usage activity monitoring rules and a QoS activity map for assigning such monitored activities to various QoS classes or priorities, and, in some embodiments, such monitoring and the QoS activity map can also be implemented using various verification techniques described herein (e.g., periodically audited, tested, compared with network service usage information). In some embodiments, the QoS activity map is based on a service plan, service profile, and/or service policy settings associated with the communications device. In some embodiments, the QoS activity map is based on a device group and/or user group. In some embodiments, the QoS activity map is based on user input (e.g., a user of the communications device can identify QoS classes/service levels for various applications and/or service activities, in response to requests for user input, based on user configurations, user defined rules (e.g., to eliminate or mitigate privacy and/or net neutrality concerns/issues), and/or confirmed monitored user behavior QoS related patterns or preferences). In some embodiments, the QoS activity map includes mappings/associations based on one or more of the following: a user preference for a given destination, destination class, application, application class (e.g., by application class instead of with respect to a specific application can also eliminate or mitigate privacy and/or net neutrality concerns/issues), flow, traffic or flow class, time period, time of day, location, network busy state (e.g., provide QoS when you can, then charge more when busy, notify user of busy state), device type, user type, user plan, user group, user standing, partner service, tokens, service type, and/or other criteria or measures.

In some embodiments, various techniques described herein are managed for device 100 for incoming and/or outgoing QoS requests. In some embodiments, as shown in FIG. 6, QoS for DAS includes establishing an end to end coordinated QoS service channel control.

Figure 6:
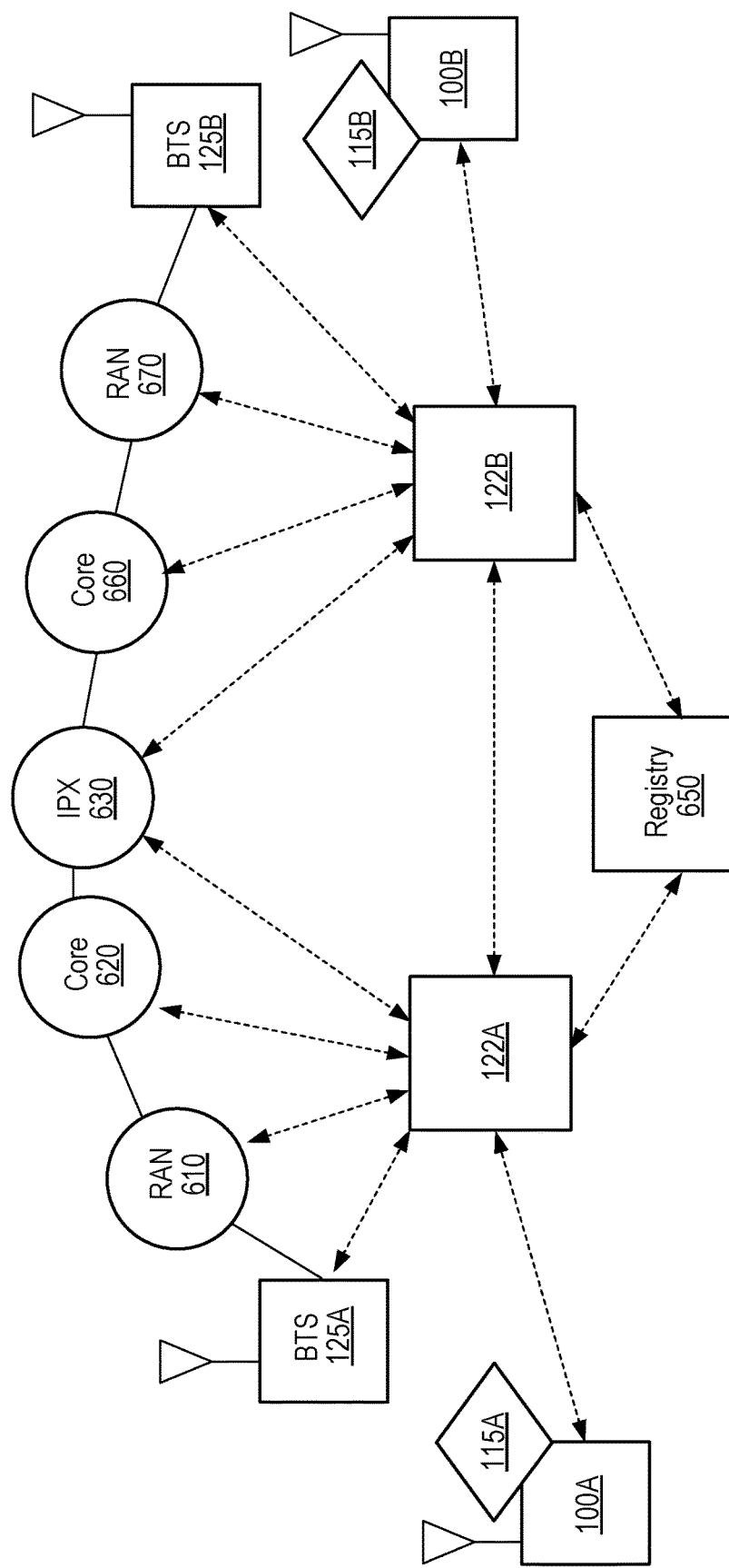
FIG. 6 illustrates a functional diagram for quality of service (QoS) for device assisted services for an end to end coordinated QoS service channel control in accordance with some embodiments.

FIG. 6 illustrates a functional diagram for quality of service (QoS) for device assisted services for an end to end coordinated QoS service channel control in accordance with some embodiments. As shown in FIG. 6, a wireless communications device 100A includes a service processor 115A in secure communication with service controller 122A. A wireless communications device 100B includes a service processor 115B in secure communication with service controller 122B. In some embodiments, when, for example, device 100A initiates a QoS request for a QoS class session in communication with device 100B (e.g., a VOIP call or another application service requiring or possibly using a QoS class/level session, such as a conversational or other QoS type of class/level), as sequence of actions are performed using service controller 122A and service controller 122B to facilitate/setup an end to end coordinated QoS service channel control. In some embodiments, as similarly described herein, assuming that service processor 115A and service controller 122A determine that the QoS request from device 100A is authorized for that device, then the service controller 122A contacts registry 650 (e.g., a device registry, such as an HLR, mobile services center, or other central database or registry including, for example, service controller mappings by device/IP address/other) to determine the service controller associated with/responsible for managing QoS/service control for device 100B. The registry 650 provides the service controller 122B information (e.g., IP address/other address) based on this lookup determination. In some embodiments, service controller 122A then initiates the QoS request with service controller 122B to determine if the device 100B is authorized and/or available for the QoS session requested by device 100A. In some embodiments, service controllers 122A and 122B communicate with BTSs 125A/B to determine whether the QoS request can be facilitated (e.g., based on network capacity) as similarly described herein. In some embodiments, the service controllers 122A and 122B provide the central QoS coordination function and can request appropriate QoS channels directly from the respective local BTSs. In some embodiments, the service controllers 122A and 122B also communicate with one or more of the following network elements/functions as shown in FIG. 6 in order to facilitate an end to end coordinated QoS service channel control: RAN 610/670, Core Network 620/660, and IPX network 630. In some embodiments, service controllers 122A and 122B communicate with various necessary network elements for provisioning to facilitate session provisioning through the carrier core network as similarly discussed above. In some embodiments, service controllers 122A and 122B communicate with various necessary network elements for provisioning to facilitate session provisioning through the IPX network as similarly discussed above. As will be apparent to one of ordinary skill in the art, QoS for DAS techniques as described herein can be similarly implemented using these or similar techniques to various other network architectures.

Figure 7:
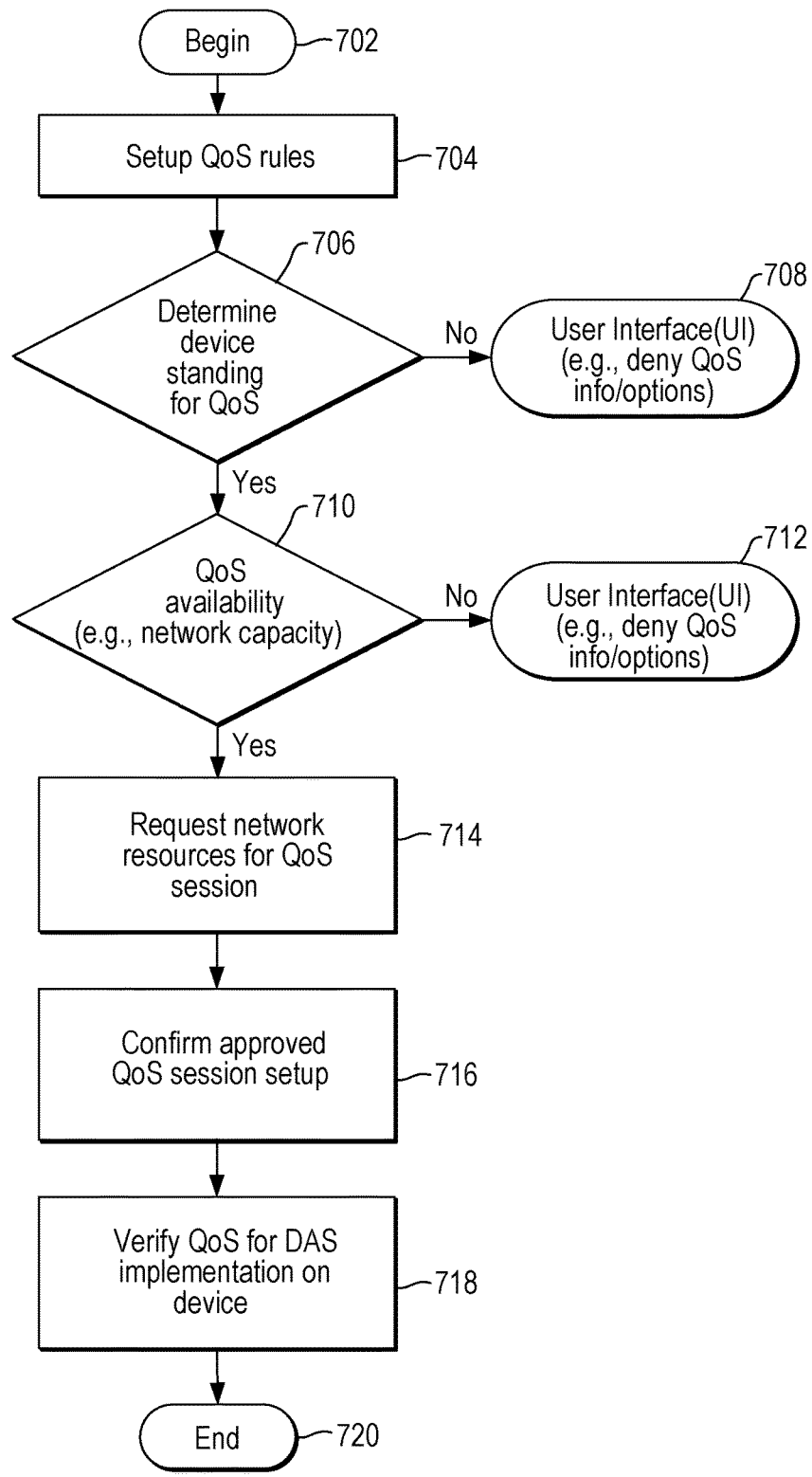
FIG. 7 illustrates a flow diagram for quality of service (QoS) for device assisted services (DAS) in accordance with some embodiments.

FIG. 7 illustrates a flow diagram for quality of service (QoS) for device assisted services (DAS) in accordance with some embodiments. At 702, the process begins. At 704, QoS rules are received or determined (e.g., a service processor receives or requests the QoS rules, which may be included in service plan, service profile, and/or service policy settings associated with the communications device). In some embodiments, the QoS rules are verified using various techniques as described herein (e.g., periodically updated, replaced, downloaded, obfuscated, and/or tested using by a service controller and/or using other verification techniques). In some embodiments, a QoS API is also used by various applications to initiate a QoS request, as described herein with respect to various embodiments. In some embodiments, the QoS rules are implemented in the form of a QoS activity map in accordance with various embodiments described herein. At 706, the communications device's standing for QoS is determined using various techniques described herein (e.g., based on the service plan, service profile, service policy settings, QoS rules, based on QoS class, current service usage, current billing standing, and/or any other criteria/measure). In some embodiments, in addition to verifying the device/user standing for the QoS request, whether the device is following or in compliance with an assigned QoS reservation request policy is also verified using various techniques described herein. If the device is determined to not be eligible for QoS, then at 708, the device User Interface (UI) provides information concerning the denial/ineligibility for QoS session(s) (e.g., denial/ineligibility explanation and/or options for providing for one or more QoS options, such as a service plan upgrade or payment for a certain/set of/period of time for QoS session(s) access). If the device is determined to be eligible for QoS, then at 710, QoS availability is determined (e.g., based on network capacity, which may be determined at the device, via communication with the service controller, via communication with the BTS, and/or any combination thereof, using the various techniques described herein). If QoS is determined to not be available, then at 712, the UI provides information and/or options concerning the QoS availability (e.g., unavailability explanation and/or options for providing for one or more QoS options, such as a service plan upgrade or payment for a certain/set of/period of time for QoS session(s) access). If QoS is determined to be available, then at 714, a request for network resources for the QoS session is sent to one or more network resources (e.g., service controller, BTS, gateway, core/transport network, IPX/GRX networks, and/or other network elements/functions/resources). At 716, a confirmation of the approved QoS session is received to close the loop for the QoS for DAS (e.g., a QoS schedule is received that provides the QoS session confirmation information, such as a scheduled RAB/multi-RAB and/or other reserved network resource(s) by schedule/other criteria). At 718, one or more verification techniques are performed to verify the QoS for DAS implementation on the device using various verification techniques described herein (e.g., comparing QoS service usage reports from a network source with the associated device policy; comparing QoS service usage reports from a network source with the QoS service usage reports from the device, and/or using other verification techniques as similarly described herein). At 720, the process is completed.

Figure 8A:
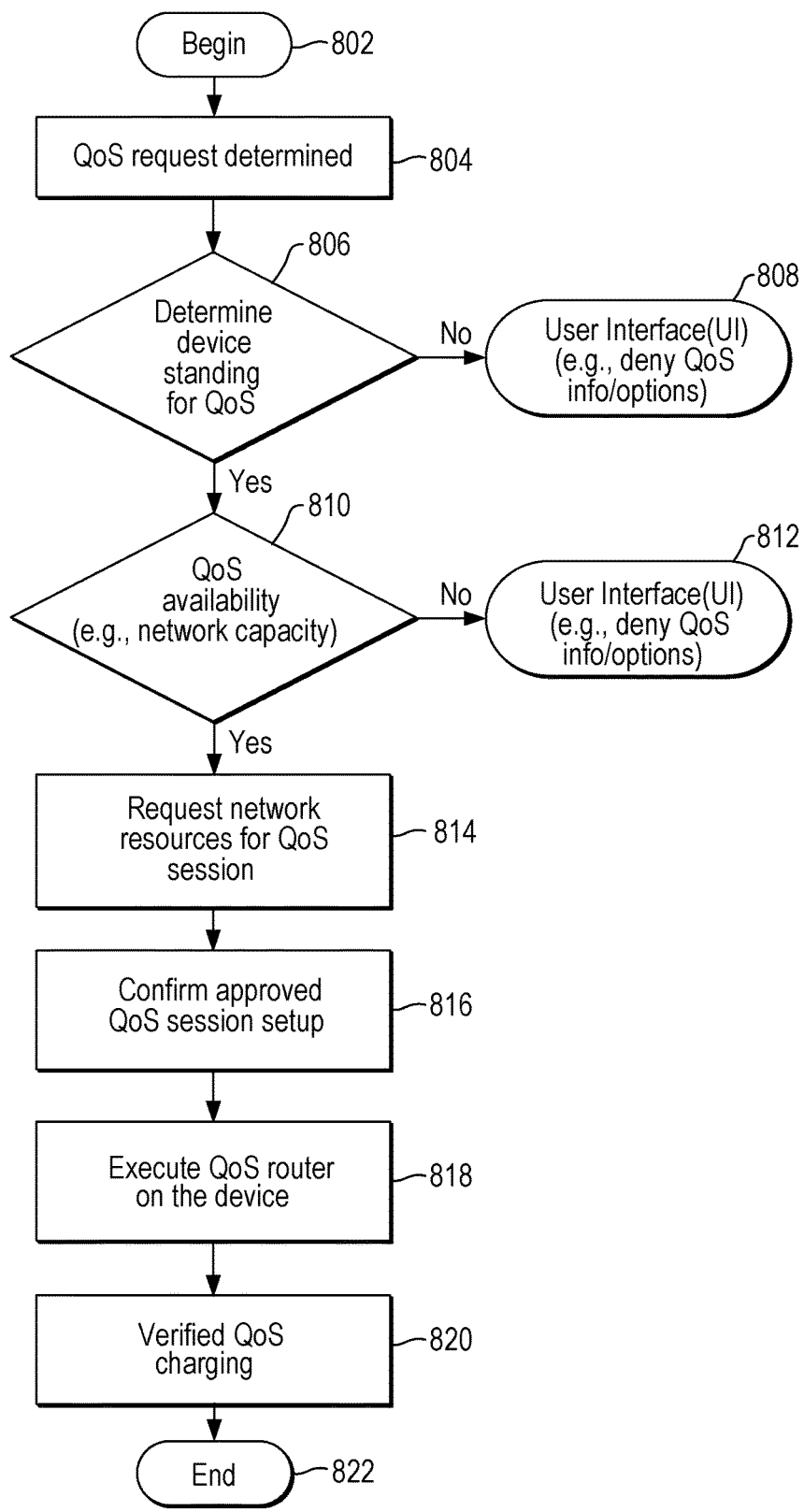
FIGS. 8A through 8C each illustrate another flow diagram for quality of service (QoS) for device assisted services (DAS) in accordance with some embodiments.
Figure 8B:
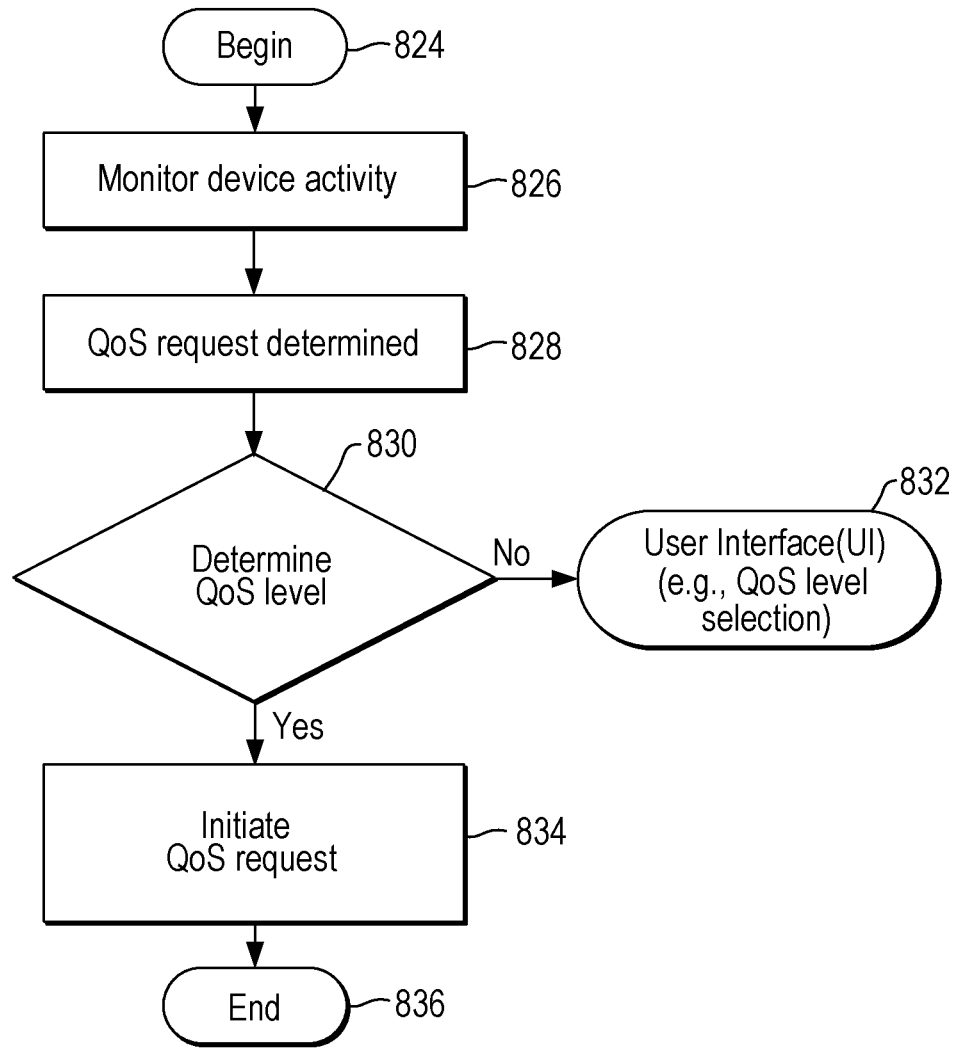
Figure 8C:
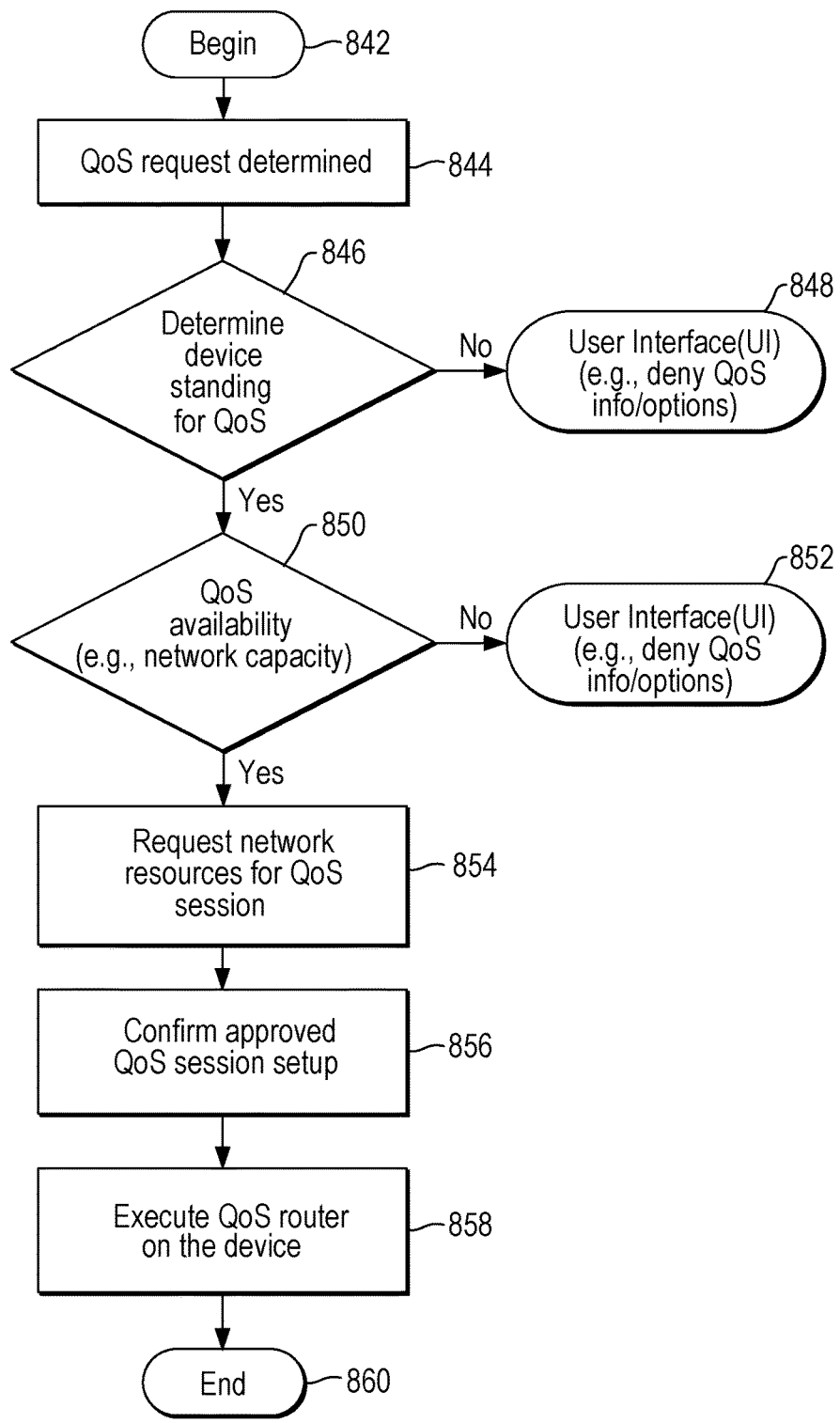

FIGS. 8A through 8C each illustrate another flow diagram for quality of service (QoS) for device assisted services (DAS) in accordance with some embodiments. FIG. 8A illustrates another flow diagram for quality of service (QoS) for device assisted services (DAS) in accordance with some embodiments. At 802, the process begins. In some embodiments, the QoS policies are implemented on the device (e.g., service processor collects/receives an associated service plan that defines/specifies basic policies for QoS, which can include a QoS activity map, which, for example, maps QoS classes based on application, service usage, flow type, destination, time of day, network capacity, and/or other criteria/measures, as similarly described herein). In some embodiments, a QoS API is also used by various applications to initiate a QoS request, as described herein with respect to various embodiments. In some embodiments, the QoS rules are implemented in the form of a verified QoS activity map in accordance with various embodiments described herein. At 804, a QoS request is determined (e.g., by QoS class for a particular associated service/application). In some embodiments, the QoS request is determined at least in part by using the QoS activity map using various techniques described herein, for example, based on service/application usage monitoring on the device (e.g., by the service processor service usage monitoring agent). In some embodiments, the QoS request is determined based on the QoS API. In some embodiments, the QoS request is determined to be associated with an outgoing connection or an incoming connection. At 806, whether the QoS request is authorized is determined (e.g., whether the QoS request supported by the service plan, sufficient charging credit exists for this QoS request, and/or other criteria/measures). If not, then at 808, the UI provides a responsive notification and/or option as similarly described herein. If the QoS request is approved, then at 810, a request for network resources for the QoS session is sent to one or more network resources (e.g., service controller, BTS, gateway, core/transport network, IPX/GRX networks, a/another service controller in communication with another communications device such as for setting up a conversational class QoS connection with the other communications device, and/or other network elements/functions/resources). If the device is determined to be eligible for QoS, then at 810, QoS availability is determined (e.g., based on network capacity, which may be determined at the device, via communication with the service controller, via communication with the BTS, and/or any combination thereof, using the various techniques described herein). If QoS is determined to not be available, then at 812, the UI provides information and/or options concerning the QoS availability (e.g., unavailability explanation and/or options for providing for one or more QoS options, such as a service plan upgrade or payment for a certain/set of/period of time for QoS session(s) access). If QoS is determined to be available, then at 814, a request for network resources for the QoS session is sent to one or more network resources (e.g., service controller, BTS, gateway, core/transport network, IPX/GRX networks, and/or other network elements/functions/resources, to setup, for example, a QoS end to end connection—coordinate all resources end to end for the approved and verified QoS flow). At 816, a confirmation of the approved QoS session is received to close the loop for the QoS for DAS (e.g., a QoS schedule is received that provides the QoS session confirmation information, such as a scheduled RAB/multi-RAB and/or other reserved network resource(s) by schedule/other criteria). At 818, a QoS router is executed/performed on the communications device to assist in implementing QoS for DAS using various verification techniques described herein (e.g., to perform QoS queuing, throttling, and/or other QoS router related functions as described herein). At 820, verified QoS charging is performed (e.g., at least in part) on the device using various techniques described herein (e.g., using the service processor, such as the charging/service usage monitoring and/or other agents as described herein). In some embodiments, QoS charging records and/or reports are provided to one or more network elements for managing QoS billing and/or other QoS management/billing related service control functions (e.g., to the service controller and/or the billing interface or billing server). In some embodiments, QoS for DAS also facilitates reestablishing the QoS session/connection/channel/stream if the QoS session/connection/channel/stream is lost or goes down, using similar techniques to those described herein as would be apparent to one of ordinary skill in the art. At 822, the process is completed. In some embodiments, the QoS provisioning channel is closed when the device session is over to, for example, free up various resources.

FIG. 8B illustrates another flow diagram for quality of service (QoS) for device assisted services (DAS) in accordance with some embodiments. In some embodiments, QoS for DAS includes identifying the QoS requirements (e.g., QoS level or QoS class) for a service activity. At 824, the process begins. In some embodiments, the QoS policies are implemented on the device (e.g., service processor collects/receives an associated service plan that defines/specifies basic policies for QoS, which can include a QoS activity map, which, for example, maps QoS classes based on application, service usage, flow type, destination, time of day, network capacity, and/or other criteria/measures, as similarly described herein). In some embodiments, the QoS rules are implemented in the form of a verified QoS activity map in accordance with various embodiments described herein. At 826, the device monitors device activity, such as service/application usage activities. In some embodiments, the device detects the relevant activities based on various service usage monitoring techniques described herein. At 828, a QoS request is determined, for example, using various techniques described herein. At 830, a QoS level is determined based on the application associated with the QoS request using various techniques described herein. For example, the QoS level can be determined using the QoS activity map, which provides a QoS policy defined by a table associating various QoS levels with a variety of activities that include various device monitored service usage/application activities. In some embodiments, the QoS activity map includes QoS level mappings based on one or more of the following: application, destination/source, traffic type, connection type, content type, time of day/day of week, network capacity, activity usage, service plan selection, current standing, user class, device class, home/roaming, network capabilities, and/or other criteria/measures as similarly described herein. In some embodiments, at 832, if the QoS level cannot be determined and/or in order to confirm a QoS level or selection among multiple potential appropriate/approved QoS levels, the UI presents options for a user to select the QoS level. At 834, the QoS request is initiated for the determined QoS level (e.g., QoS class). At 836, the process is completed.

FIG. 8C illustrates another flow diagram for quality of service (QoS) for device assisted services (DAS) in accordance with some embodiments. In some embodiments, QoS for DAS includes determining whether the network should grant the QoS request for a given device activity. At 842, the process begins. At 844, QoS request is determined. At 846, the communications device's standing for QoS is determined using various techniques described herein (e.g., a service processor in combination with a service controller or based on a communication for authorization of the QoS request sent to the service controller determines whether the QoS request is authorized, which can be based on the service plan, service profile, service policy settings, QoS rules, based on QoS class, current service usage, current billing standing, and/or any other criteria/measure). If the device is determined to not be eligible for QoS, then at 848, the device User Interface (UI) provides information concerning the denial/ineligibility for QoS session(s) (e.g., denial/ineligibility explanation and/or options for providing for one or more QoS options, such as a service plan upgrade or payment for a certain/set of/period of time for QoS session(s) access). If the device is determined to be eligible for QoS, then at 850, QoS availability is determined (e.g., based on network capacity, which may be determined at the device, via communication with the service controller, via communication with the BTS, and/or any combination thereof, using the various techniques described herein). If QoS is determined to not be available, then at 852, the UI provides information and/or options concerning the QoS availability (e.g., unavailability explanation and/or options for providing for one or more QoS options, such as a service plan upgrade or payment for a certain/set of/period of time for QoS session(s) access). If QoS is determined to be available, then at 854, a request for network resources for the QoS session is sent to one or more network resources (e.g., service controller, BTS, gateway, core/transport network, IPX/GRX networks, and/or other network elements/functions/resources can be queried directly and/or a centralized QoS resource/network function/element/database can be queried for determining such network resources and coordinating such scheduling). At 856, a confirmation of the approved QoS session is received to close the loop for the QoS for DAS (e.g., a QoS schedule is received that provides the QoS session confirmation information, such as a scheduled RAB/multi-RAB and/or other reserved network resource(s) by schedule/other criteria). At 858, a QoS router is performed. In some embodiments, the QoS router is performed on the device (e.g., service processor), on a network element/function (e.g., service controller), and/or in combinations thereof. In some embodiments, the QoS router prioritizes multiple QoS requests across a given communications device. In some embodiments, the QoS router prioritizes multiple QoS requests across multiple communications devices and/or across multiple BTSs. In some embodiments, the QoS router performs various QoS class degradation, promotion, and/or other throttling related techniques as similarly described herein (e.g., based on session priority, network capacity, workload balancing, QoS priority rules, and/or other criteria/measures/rules). At 860, the process is completed.

Figure 9:
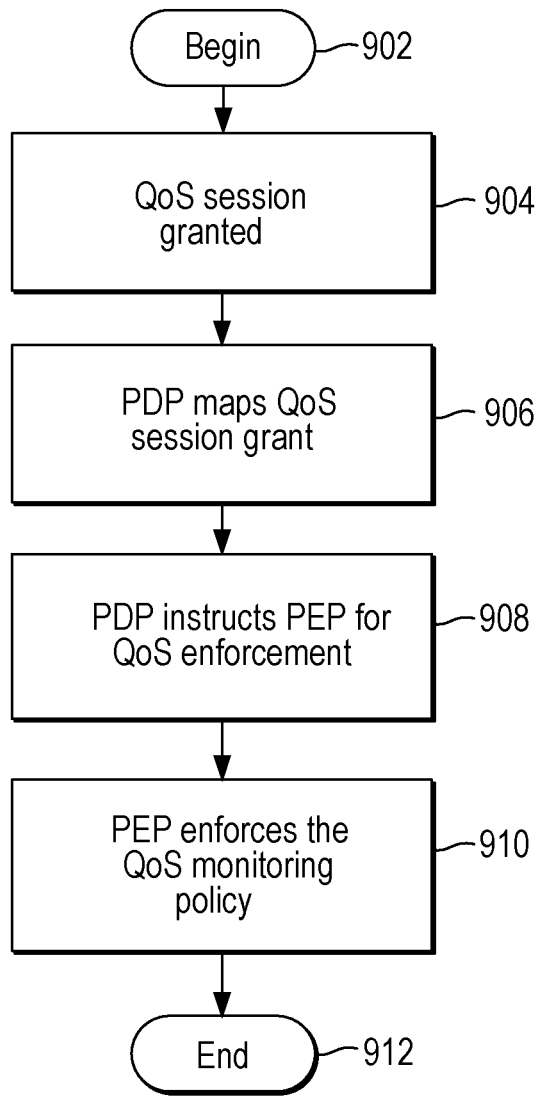
FIG. 9 illustrates another flow diagram for quality of service (QoS) for device assisted services (DAS) in accordance with some embodiments.

FIG. 9 illustrates another flow diagram for quality of service (QoS) for device assisted services (DAS) in accordance with some embodiments. In some embodiments, QoS for DAS includes QoS session provision for a service activity. At 902, the process begins. At 904, a new QoS session is granted and/or confirmed. At 906, a device service processor (e.g., policy decision point (PDP) agent, also referred to herein as a policy control agent) maps the QoS session grant to a QoS monitoring policy (e.g., based on a service controller provided QoS related policy, based on a service plan associated with the device, user, device/user group, and/or other criteria/measures, as similarly described herein). At 908, the QoS monitoring policy provides commands/instructions to a policy enforcement point (PEP) (e.g., PEP agent, also referred to herein as a policy implementation agent) for managing/enforcing the new QoS priorities/sessions. At 910, the PEP determines whether to allow, block, throttle, and/or queue priority a session based on the QoS monitoring policy. At 912, the process is completed.

Figure 10:
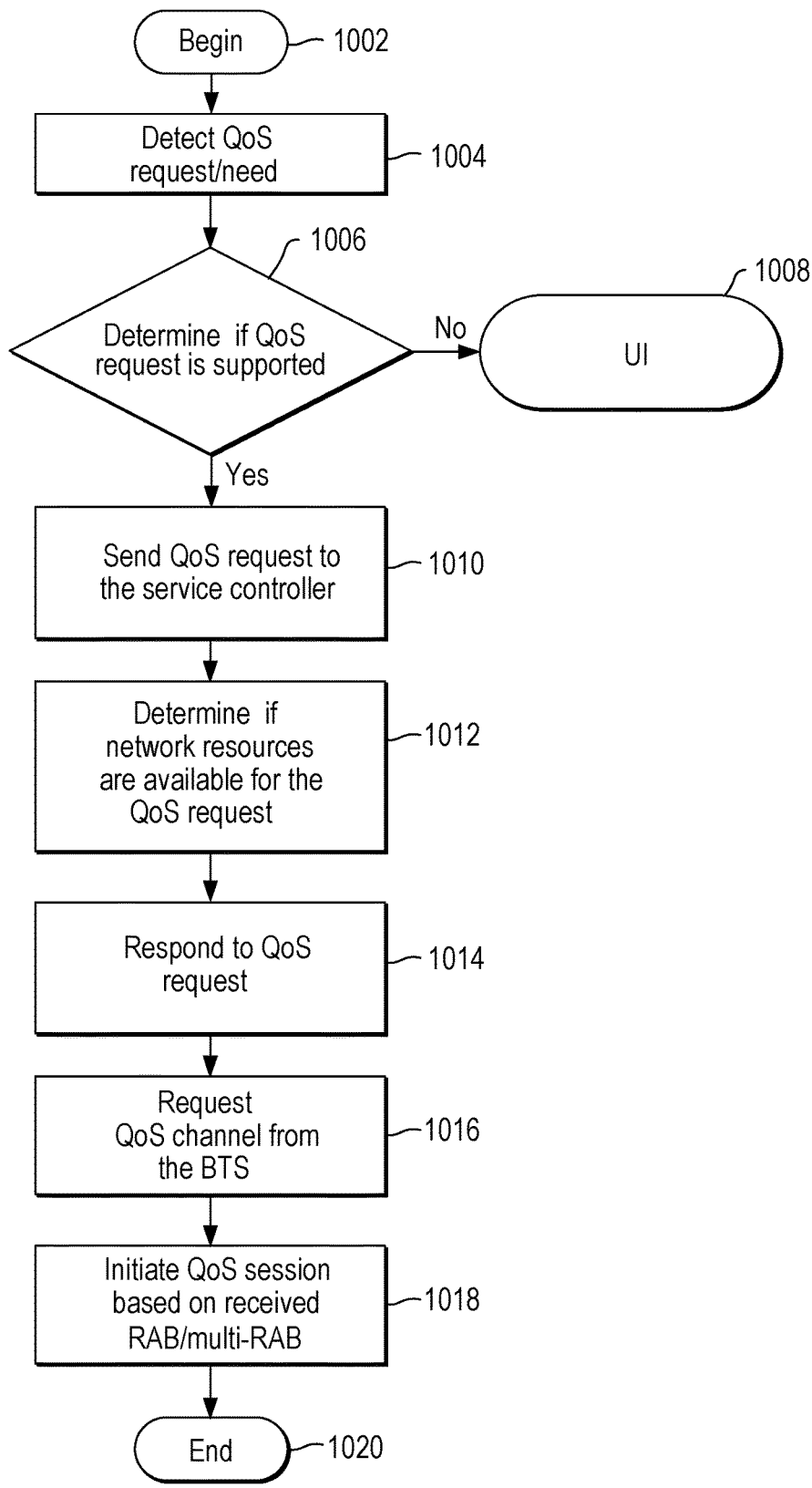
FIG. 10 illustrates another flow diagram for quality of service (QoS) for device assisted services (DAS) in accordance with some embodiments.

FIG. 10 illustrates another flow diagram for quality of service (QoS) for device assisted services (DAS) in accordance with some embodiments. In some embodiments, Radio Access Bearer (RAB) support is available, and the following process is performed in accordance with some embodiments. At 1002, the process begins. At 1004, the device service processor detects a QoS request or QoS need (e.g., a QoS API request, a QoS request or need/benefit of QoS session based on service usage monitoring, such as by application, or other service usage measure/activity). At 1006, the service processor and/or the service processor in communication with the service controller determines if the service plan allows/supports the requested QoS. If not, then at 1008, a UI event is generated (e.g., notifying the device user that such QoS/QoS level/class is not available, and potentially offering a QoS/service plan upgrade/purchase for that QoS/QoS level/class). At 1010, the service processor communicates the QoS request to the service controller (e.g., using a secure service control link or secure communication channel, as similarly described herein) to request the QoS level/class. At 1012, the service controller determines whether network resources are available using various techniques as described herein. In some embodiments, network capacity is determined using various techniques, such as local device measurements; dedicated local device measurement reports; BTS reports; other network element reports; by assessing, for example, a combination of one or more of available bandwidth, traffic delay or latency, available QoS level, variability in available bandwidth, variability in latency, and/or variability in available QoS level; and/or other techniques as described herein. At 1014, the service controller responds to the QoS request (e.g., grants or denies the QoS request). In some embodiments, another UI event is generated if the QoS request is denied as similarly described herein. At 1016 (assuming the QoS request is granted), the device requests a QoS channel from the BTS. In some embodiments, the request includes a QoS request authorization code received from the service controller. In some embodiments, the service controller provides a notification of the QoS request approval for the communications device to the BTS, so that the BTS can verify the approval of the QoS request. In some embodiments, the BTS confirms the device QoS channel request directly with the service controller. For example, various other techniques for verifying the QoS channel request can also be used as similarly described herein and as would be apparent to one of ordinary skill in the art. In some embodiments, the device service processor and/or service controller provides QoS related reports informing the BTS of how many QoS channels (e.g., RABs) to provision and how many best effort resources to provision based on device demand projections. At 1018 (assuming the QoS channel request is verified), the QoS session is initiated based on an allocated RAB or multi-RAB reservation received from the BTS (e.g., and/or other network elements as similarly described herein). At 1020, the process is completed.

Figure 11:
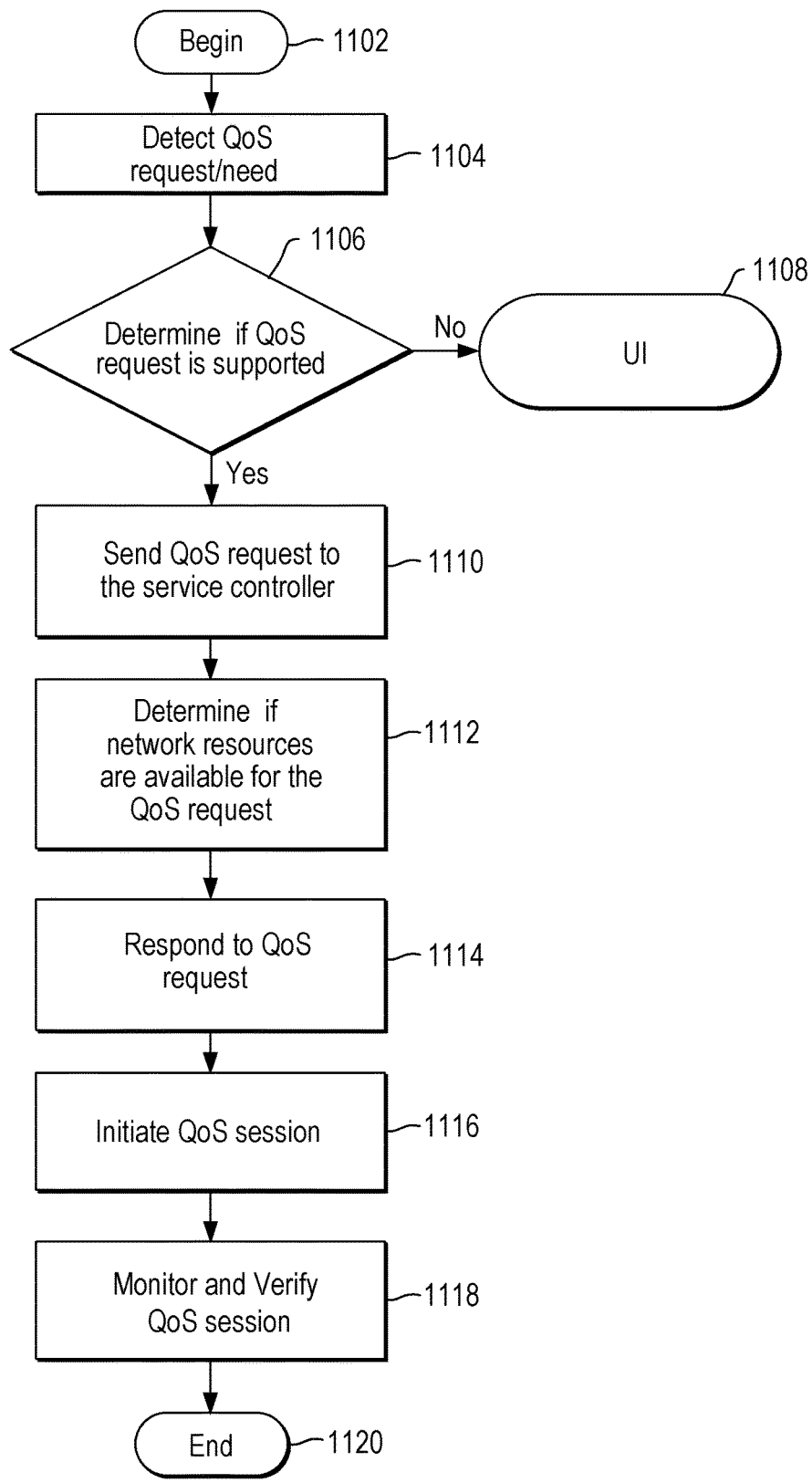
FIG. 11 illustrates another flow diagram for quality of service (QoS) for device assisted services (DAS) in accordance with some embodiments.

FIG. 11 illustrates another flow diagram for quality of service (QoS) for device assisted services (DAS) in accordance with some embodiments. In some embodiments, RAB support is not available, and the following process is performed in accordance with some embodiments. At 1102, the process begins. At 1104, the device service processor detects a QoS request or QoS need (e.g., a QoS API request, a QoS request or need/benefit of QoS session based on service usage monitoring, such as by application, or other service usage measure/activity). At 1106, the service processor and/or the service processor in communication with the service controller determines if the service plan allows/ supports the requested QoS. If not, then at 1108, a UI event is generated (e.g., notifying the device user that such QoS/ QoS level/class is not available, and potentially offering a QoS/service plan upgrade/purchase for that QoS/QoS level/ class). At 1110, the service processor communicates the QoS request to the service controller (e.g., using a secure service control link or secure communication channel, as similarly described herein) to request the QoS level/class. At 1112, the service controller determines whether network resources are available using various techniques as described herein. In some embodiments, network capacity is determined using various techniques, such as local device measurements, BTS reports, other network element reports, and/or other techniques as described herein. In some embodiments, the service controller throttles other devices on the link so that the requested QoS level can be achieved (e.g., as RAB support is not available). In some embodiments, the service controller time slots traffic from the device end in synchronization with a BTS clock or absolute clock to facilitate the requested QoS level and to achieve necessary network capacity to support/facilitate the requested QoS level (e.g., minimizing jitter/inter-packet delay variation) based on current/forecasted network capacity on the link. At 1114, the service controller responds to the QoS request (e.g., grants or denies the QoS request). In some embodiments, another UI event is generated if the QoS request is denied as similarly described herein. At 1116 (assuming the QoS request is granted), the device initiates the QoS session. At 1118, the device service processor and/or the device service processor in secure communication with the service controller monitors and verifies the QoS session using various monitoring and verification techniques described herein (e.g., checks CDRs to determine if the QoS channel is properly implemented by the device). In some embodiments, a UI event is generated to notify the device user if there are potential problems with the QoS session implementation, to periodically inform the user of QoS charging, and/or other events/information related to QoS activities. At 1120, the process is completed.

Figure 12:
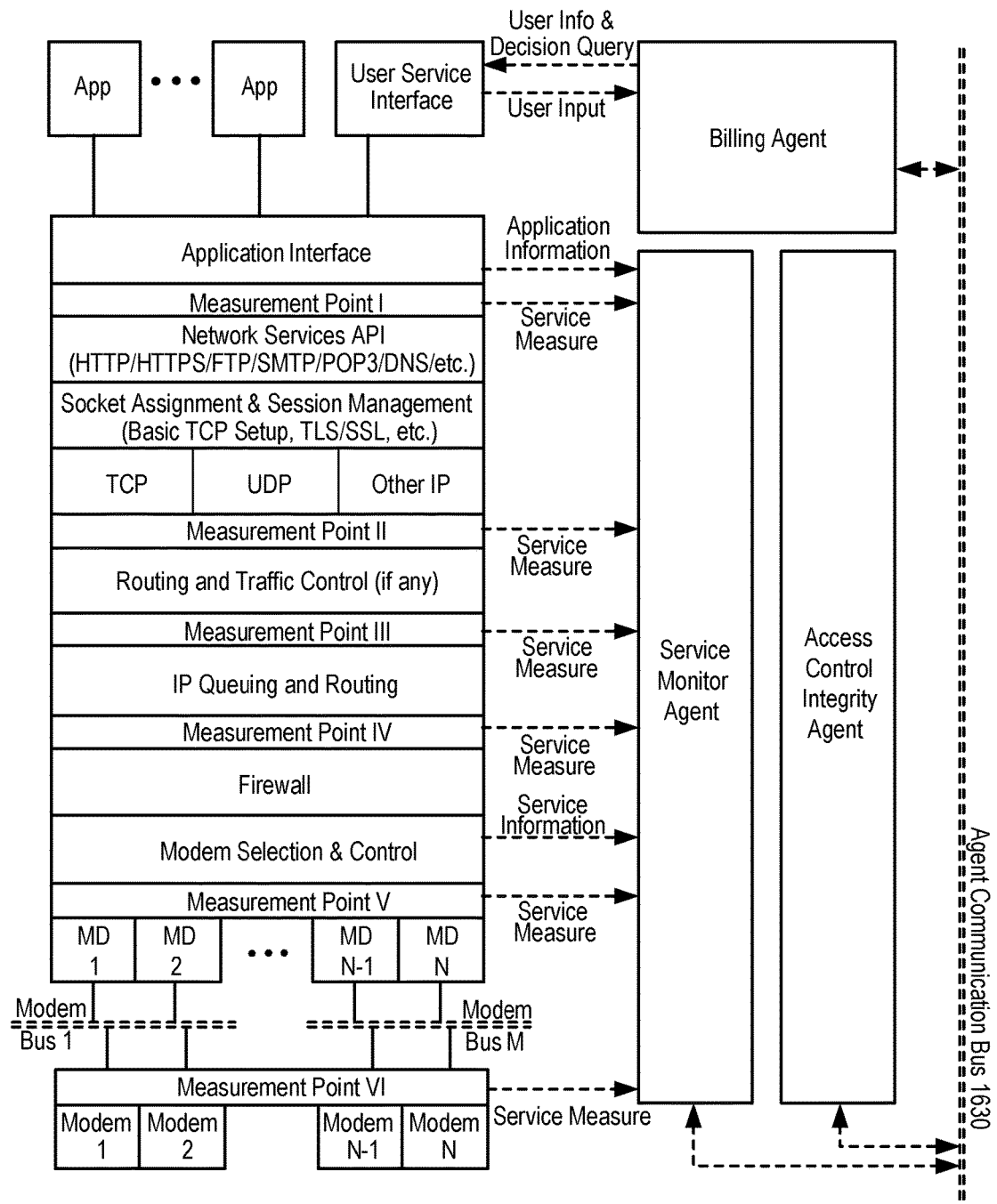
FIG. 12 illustrates a device stack for providing various service usage measurement techniques in accordance with some embodiments.

FIG. 12 illustrates a device stack for providing various service usage measurement techniques in accordance with some embodiments. FIG. 12 illustrates a device stack providing various service usage measurement from various points in the networking stack for a service monitor agent (e.g., for monitoring QoS related activities as described herein), a billing agent, and an access control integrity agent to assist in verifying the service usage measures, QoS related activities and functions, and billing reports in accordance with some embodiments. As shown in FIG. 12, several service agents take part in data path operations to achieve various data path improvements, and, for example, several other service agents can manage the policy settings for the data path service, implement billing for the data path service, manage one or more modem selection and settings for access network connection, interface with the user and/or provide service policy implementation verification. Additionally, in some embodiments, several agents perform functions to assist in verifying that the service control or monitoring policies intended to be in place are properly implemented, the service control or monitoring policies are being properly adhered to, that the service processor or one or more service agents are operating properly, to prevent unintended errors in policy implementation or control, and/ or to prevent tampering with the service policies or control. As shown, the service measurement points labeled I through VI represent various service measurement points for service monitor agent 1696 and/or other agents to perform various service monitoring activities. Each of these measurement points can have a useful purpose in various embodiments described herein. For example, each of the traffic measurement points that is employed in a given design can be used by a monitoring agent to track application layer traffic through the communication stack to assist policy implementation functions, such as the policy implementation driver/ agent 1690 (e.g., policy enforcement point driver/agent), or in some embodiments the modem firewall agent 1655 or the application interface agent, in making a determination regarding the traffic parameters or type once the traffic is farther down in the communication stack where it is sometimes difficult or impossible to make a complete determination of traffic parameters. The particular locations for the measurement points provided in these figures are intended as instructional examples, and other measurement points can be used for different embodiments, as will be apparent to one of ordinary skill in the art in view of the embodiments described herein. Generally, in some embodiments, one or more measurement points within the device can be used to assist in service control verification and/or device or service troubleshooting.

In some embodiments, the service monitor agent and/or other agents implement virtual traffic tagging by tracking or tracing packet flows through the various communication stack formatting, processing and encryption steps, and providing the virtual tag information to the various agents that monitor, control, shape, throttle or otherwise observe, manipulate or modify the traffic. This tagging approach is referred to herein as virtual tagging, because there is not a literal data flow, traffic flow or packet tag that is attached to flows or packets, and the book-keeping to tag the packet is done through tracking or tracing the flow or packet through the stack instead. In some embodiments, the application interface and/or other agents identify a traffic flow, associate it with a service usage activity and cause a literal tag to be attached to the traffic or packets associated with the activity. This tagging approach is referred to herein as literal tagging. There are various advantages with both the virtual tagging and the literal tagging approaches. For example, it can be preferable in some embodiments to reduce the inter-agent communication required to track or trace a packet through the stack processing by assigning a literal tag so that each flow or packet has its own activity association embedded in the data. As another example, it can be preferable in some embodiments to re-use portions of standard communication stack software or components, enhancing the verifiable traffic control or service control capabilities of the standard stack by inserting additional processing steps associated with the various service agents and monitoring points rather than re-writing the entire stack to correctly process literal tagging information, and in such cases, a virtual tagging scheme may be desired. As yet another example, some standard communication stacks provide for unused, unspecified or otherwise available bit fields in a packet frame or flow, and these unused, unspecified or otherwise available bit fields can be used to literally tag traffic without the need to re-write all of the standard communication stack software, with only the portions of the stack that are added to enhance the verifiable traffic control or service control capabilities of the standard stack needing to decode and use the literal tagging information encapsulated in the available bit fields. In the case of literal tagging, in some embodiments, the tags are removed prior to passing the packets or flows to the network or to the applications utilizing the stack. In some embodiments, the manner in which the virtual or literal tagging is implemented can be developed into a communication standard specification so that various device or service product developers can independently develop the communication stack and/or service processor hardware and/or software in a manner that is compatible with the service controller specifications and the products of other device or service product developers.

It will be appreciated that although the implementation/use of any or all of the measurement points illustrated in FIG. 12 is not required to have an effective implementation, such as was similarly shown with respect to various embodiments described herein, various embodiments can benefit from these and/or similar measurement points. It will also be appreciated that the exact measurement points can be moved to different locations in the traffic processing stack, just as the various embodiments described herein can have the agents affecting policy implementation moved to different points in the traffic processing stack while still maintaining effective operation. In some embodiments, one or more measurement points are provided deeper in the modem stack where, for example, it is more difficult to circumvent and can be more difficult to access for tampering purposes if the modem is designed with the proper software and/or hardware security to protect the integrity of the modem stack and measurement point(s).

Referring to FIG. 12, describing the device communications stack from the bottom to the top of the stack as shown, the device communications stack provides a communication layer for each of the modems of the device at the bottom of the device communications stack. Example measurement point VI resides within or just above the modem driver layer. For example, the modem driver performs modem bus communications, data protocol translations, modem control and configuration to interface the networking stack traffic to the modem. As shown, measurement point VI is common to all modem drivers and modems, and it is advantageous for certain embodiments to differentiate the traffic or service activity taking place through one modem from that of one or more of the other modems. In some embodiments, measurement point VI, or another measurement point, is located over, within or below one or more of the individual modem drivers. The respective modem buses for each modem reside between example measurement points V and VI. In the next higher layer, a modem selection & control layer for multi-mode device based communication is provided. In some embodiments, this layer is controlled by a network decision policy that selects the most desirable network modem for some or all of the data traffic, and when the most desirable network is not available the policy reverts to the next most desirable network until a connection is established provided that one of the networks is available. In some embodiments, certain network traffic, such as verification, control, redundant or secure traffic, is routed to one of the networks even when some or all of the data traffic is routed to another network. This dual routing capability provides for a variety of enhanced security, enhanced reliability or enhanced manageability devices, services or applications. In the next higher layer, a modem firewall is provided. For example, the modem firewall provides for traditional firewall functions, but unlike traditional firewalls, in order to rely on the firewall for verifiable service usage control, such as access control and security protection from unwanted networking traffic or applications, the various service verification techniques and agents described herein are added to the firewall function to verify compliance with service policy and prevent tampering of the service controls. In some embodiments, the modem firewall is implemented farther up the stack, possibly in combination with other layers as indicated in other figures and described herein. In some embodiments, a dedicated firewall function or layer is provided that is independent of the other processing layers, such as the policy implementation layer, the packet forwarding layer and/or the application layer. In some embodiments, the modem firewall is implemented farther down the stack, such as within the modem drivers, below the modem drivers, or in the modem itself. Example measurement point IV resides between the modem firewall layer and an IP queuing and routing layer (e.g., QoS IP queuing and routing layer). As shown, an IP queuing and routing layer is separate from the policy implementation layer where the policy implementation agent implements a portion of the traffic control and/or service usage control policies. As described herein, in some embodiments, these functions are separated so that a standard network stack function can be used for QoS IP queuing and routing, and the modifications necessary to implement the policy implementation agent functions can be provided in a new layer inserted into the standard stack. In some embodiments, the IP queuing and routing layer is combined with the traffic or service usage control layer. For example, a combined routing and policy implementation layer embodiment can also be used with the other embodiments, such as shown in FIG. 12. Measurement point III resides between the IP queuing and routing layer and a policy implementation agent layer. Measurement point II resides between the policy implementation agent layer and the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Measurement point I resides between the network services API layer and an application layer, shown as application service interface agent in the device communications stack of FIG. 12.

As shown in FIG. 12, the application service interface layer (e.g., QoS application service interface layer) is above the standard networking stack API and, in some embodiments, its function is to monitor and in some cases intercept and process the traffic between the applications and the standard networking stack API. In some embodiments, the application service interface layer identifies application traffic flows before the application traffic flows are more difficult or practically impossible to identify farther down in the stack. In some embodiments, the application service interface layer in this way assists application layer tagging in both the virtual and literal tagging cases. In the case of upstream traffic, the application layer tagging is straight forward, because the traffic originates at the application layer. In some downstream embodiments, where the traffic or service activity classification relies on traffic attributes that are readily obtainable, such as source address or URL, application socket address, IP destination address, time of day or any other readily obtained parameter, the traffic type can be identified and tagged for processing by the firewall agent or another agent as it initially arrives. In other embodiments, as described herein, in the downstream case, the solution is generally more sophisticated when a traffic parameter that is needed to classify the manner in which the traffic flow is to be controlled or throttled is not readily available at the lower levels of the stack, such as association with an aspect of an application, type of content, something contained within TLS, IPSEC or other secure format, or other information associated with the traffic. Accordingly, in some embodiments the networking stack identifies the traffic flow before it is fully characterized, categorized or associated with a service activity, and then passes the traffic through to the application interface layer where the final classification is completed. In such embodiments, the application interface layer then communicates the traffic flow ID with the proper classification so that after an initial short traffic burst or time period the policy implementation agents can properly control the traffic. In some embodiments, there is also a policy for tagging and setting service control policies for traffic that cannot be fully identified with all sources of tagging including application layer tagging.

As shown in FIG. 12, a service monitor agent, which is also in communication with the agent communication bus 1630, communicates with various layers of the device communications stack. For example, the service monitor agent, performs monitoring at each of measurement points I through VI, receiving information including application information, service usage and other service related information, and assignment information. An access control integrity agent is in communication with the service monitor agent via the agent communications bus 1630, as also shown.

Figure 13:
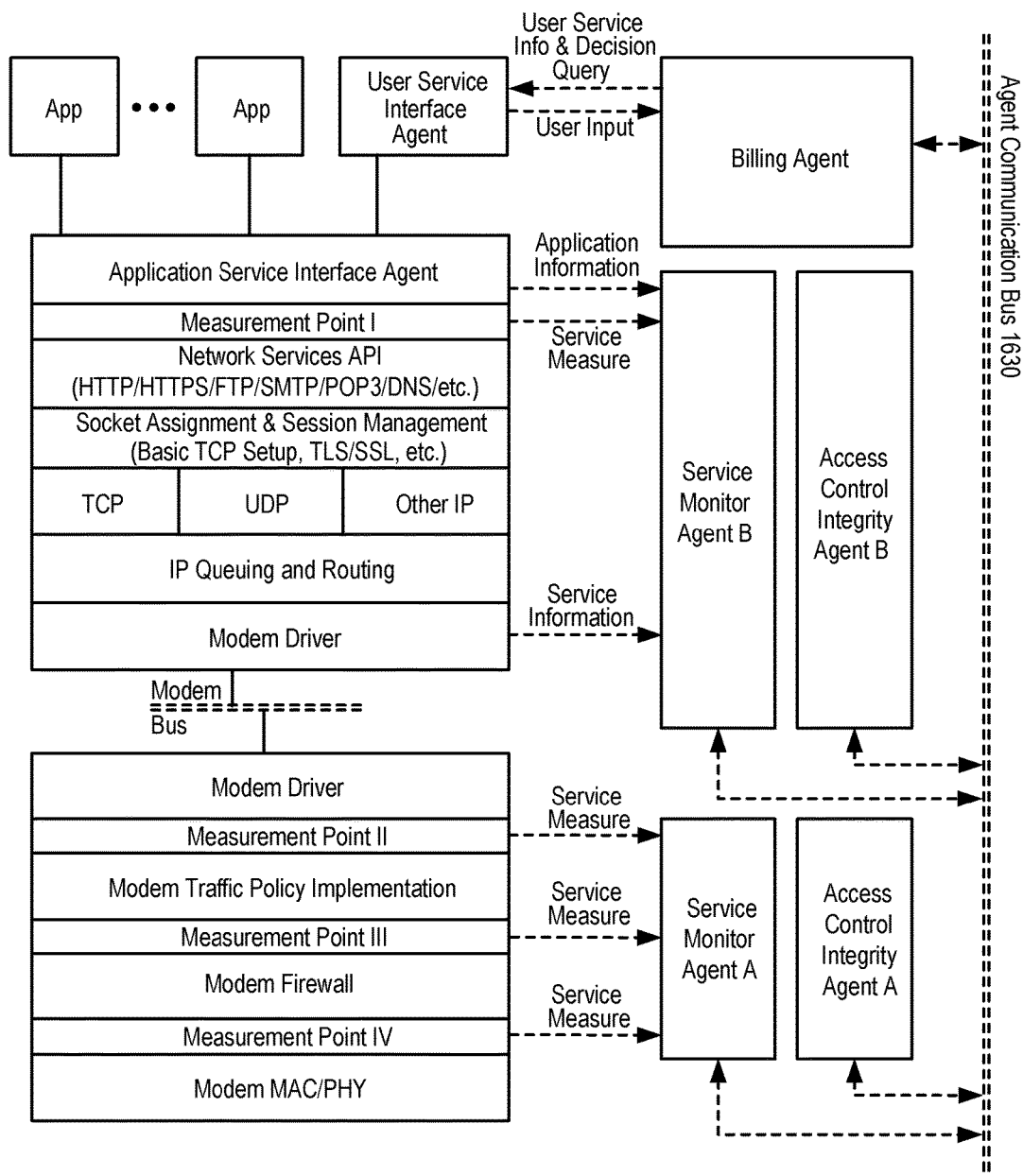
FIG. 13 illustrates another device stack for providing various service usage measurement techniques in accordance with some embodiments.

FIG. 13 illustrates another device stack for providing various service usage measurement techniques in accordance with some embodiments. FIG. 13 illustrates an embodiment similar to FIG. 12 in which some of the service processor is implemented on the modem and some of the service processor is implemented on the device application processor in accordance with some embodiments. In some embodiments, a portion of the service processor is implemented on the modem (e.g., on modem module hardware or modem chipset) and a portion of the service processor is implemented on the device application processor subsystem. It will be apparent to one of ordinary skill in the art that variations of the embodiment depicted in FIG. 13 are possible where more or less of the service processor functionality is moved onto the modem subsystem or onto the device application processor subsystem. For example, such embodiments similar to that depicted in FIG. 13 can be motivated by the advantages of including some or all of the service processor network communication stack processing and/or some or all of the other service agent functions on the modem subsystem (e.g., and such an approach can be applied to one or more modems). For example, the service processor can be distributed as a standard feature set contained in a modem chipset hardware of software package or modem module hardware or software package, and such a configuration can provide for easier adoption or development by device OEMs, a higher level of differentiation for the chipset or modem module manufacturer, higher levels of performance or service usage control implementation integrity or security, specification or interoperability standardization, and/or other benefits.

Referring to FIG. 13, describing the device communications stack from the bottom to the top of the stack as shown, the device communications stack provides a communication layer for modem MAC/PHY layer at the bottom of the device communications stack. Measurement point IV resides above the modem MAC/PHY layer. The modem firewall layer resides between measurement points IV and III. In the next higher layer, the policy implementation agent is provided, in which the policy implementation agent is implemented on the modem (e.g., on modem hardware). Measurement point II resides between the policy implementation agent and the modem driver layer, which is then shown below a modem bus layer. The next higher layer is shown as the IP queuing and routing layer, followed by the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS)

resides above the session layer. Measurement point I resides between the network services API layer and an application layer, shown as application service interface agent in the device communications stack of FIG. 13.

Although the foregoing embodiments have been described in some detail for purposes of clarity of understanding, the invention is not limited to the details provided. There are many alternative ways of implementing the invention. The disclosed embodiments are illustrative and not restrictive.

INCORPORATION BY REFERENCE

This application incorporates by reference for all purposes the following U.S. patent applications: application Ser. No. 13/718,917, now U.S. Pat. No. 9,247,450, entitled QUALITY OF SERVICE FOR DEVICE ASSISTED SERVICES, filed Dec. 18, 2012; Application Ser. No. 12/695,021, now U.S. Pat. No. 8,346,225, entitled QUALITY OF SERVICE FOR DEVICE ASSISTED SERVICES, filed Jan. 27, 2010; Application Ser. No. 12/380,780, entitled AUTOMATED DEVICE PROVISIONING AND ACTIVATION, filed Mar. 2, 2009; provisional Application No. 61/206,354, entitled SERVICES POLICY COMMUNICATION SYSTEM AND METHOD, filed Jan. 28, 2009; provisional Application No. 61/206,944, entitled SERVICES POLICY COMMUNICATION SYSTEM AND METHOD, filed Feb. 4, 2009; provisional Application No. 61/207,393, entitled SERVICES POLICY COMMUNICATION SYSTEM AND METHOD, filed Feb. 10, 2009; provisional Application No. 61/207,739, entitled SERVICES POLICY COMMUNICATION SYSTEM AND METHOD, filed Feb. 13, 2009; provisional Application No. 61/252,151, entitled SECURITY TECHNIQUES FOR DEVICE ASSISTED SERVICES, filed Oct. 15, 2009; and provisional Application No. 61/252,153, entitled DEVICE GROUP PARTITIONS AND SETTLEMENT PLATFORM, filed Oct. 15, 2009.

What is claimed is:

1. A wireless end-user device comprising:
   a wireless modem configured to connect the wireless end-user device to a selected network, the network selected from one or more networks of a home wireless network type and one or more networks of a roaming wireless network type;
   a processor configured to:
      maintain a quality of service (QoS) activity map, the QoS activity map indicating a respective QoS policy applicable to each of a plurality of wireless network service usage activities, wherein the QoS policy indicated as applicable to a particular wireless network service usage activity is based on both a device application associated with the wireless network service usage activity and a wireless network type for a current selected wireless network;
      identify, for a given wireless network service usage activity, the device application associated with the given wireless network service usage activity;
      determine an applicable QoS policy for the given wireless network service usage activity from the QoS activity map, based on the identified device application and on an indication of wireless network type for the current selected wireless network; and
      apply the applicable QoS policy from the QoS activity map to the given wireless network service usage activity.

2. The wireless end-user device of claim 1, wherein the processor is further configured to obtain, from a user interface (UI) of the wireless end-user device, at least one setting affecting a QoS policy of the QoS activity map.

3. The wireless end-user device of claim 1, wherein the processor is further configured to obtain, from a service controller network element, at least one setting affecting a QoS policy of the QoS activity map.

4. The wireless end-user device of claim 1, wherein the processor configured to apply the applicable QoS policy comprises the processor configured to control interactive access to the current selected wireless network by the given wireless network service usage activity in accordance with the applicable QoS policy.

5. The wireless end-user device of claim 1, wherein the processor configured to apply the applicable QoS policy comprises the processor configured to selectively control background access to the current selected wireless network by the given wireless network service usage activity in accordance with the applicable QoS policy.

6. The wireless end-user device of claim 1, wherein the processor configured to determine an applicable QoS policy comprises the processor further configured to base a determination of the applicable QoS policy on a policy criterion selected from the group consisting of a time period, a time window, network capacity, and a combination of these.

7. The wireless end-user device of claim 1, wherein the processor configured to determine an applicable QoS policy comprises the processor further configured to base a determination of the applicable QoS policy on a policy criterion selected from the group consisting of a network performance level, a network QoS availability level, and a combination of these.

8. The wireless end-user device of claim 1, wherein the processor is further configured to:
   establish a secure link to a network element;
   obtain the QoS activity map over the secure link; and
   store the QoS activity map in a secure memory on the wireless end-user device.

9. The wireless end-user device of claim 1, wherein the processor is further configured to provide a QoS application programming interface (API) configured to communicate application wireless network access QoS policy information to and from device applications executing on the wireless end-user device, wherein the application wireless network access QoS policy information includes a message intended to cause one or more of the device applications to assist in implementing a QoS priority for the given wireless network service usage activity.

10. The wireless end-user device of claim 1, wherein the processor configured to apply the applicable QoS policy comprises the processor configured to allow, prioritize, or restrict wireless network access associated with the given wireless network service usage activity in accordance with the applicable QoS policy.

11. The wireless end-user device of claim 1, wherein the processor configured to apply the applicable QoS policy comprises the processor configured to block, reduce traffic control priority, reduce queuing priority, throttle, delay, reduce access allowance, turn off, reduce for a group of devices, traffic control according to an adaptive throttling policy, and/or reduce transmission control protocol (TCP) acknowledgement return rate.

12. The wireless end-user device of claim 1, wherein the processor configured to apply the applicable QoS policy comprises the processor configured to direct wireless network traffic associated with the given wireless network service usage activity to a QoS channel in accordance with the applicable QoS policy.

\* \* \* \* \*